US006944662B2

(12) United States Patent
Devine et al.

(10) Patent No.: US 6,944,662 B2
(45) Date of Patent: Sep. 13, 2005

(54) SYSTEM AND METHODS PROVIDING AUTOMATIC DISTRIBUTED DATA RETRIEVAL, ANALYSIS AND REPORTING SERVICES

(75) Inventors: Robert L. S. Devine, Falkirk (GB); Robert J. Stoner, Duxbury, MA (US)

(73) Assignee: Vinestone Corporation, Duxbury, MA (US)

( * ) Notice: Subject to any disclaimer, the term of this patent is extended or adjusted under 35 U.S.C. 154(b) by 688 days.

(21) Appl. No.: 09/849,061

(22) Filed: May 4, 2001

(65) Prior Publication Data

US 2002/0095399 A1 Jul. 18, 2002

Related U.S. Application Data

(60) Provisional application No. 60/267,245, filed on Feb. 8, 2001, provisional application No. 60/256,028, filed on Dec. 15, 2000, provisional application No. 60/243,154, filed on Oct. 25, 2000, and provisional application No. 60/222,979, filed on Aug. 4, 2000.

(51) Int. Cl.[7] .............................................. G06F 13/00
(52) U.S. Cl. ...................... 709/225; 709/226; 709/229; 719/318
(58) Field of Search ................................ 709/203, 206, 709/213, 217, 219, 223, 225, 226, 238, 229; 719/318

(56) References Cited

U.S. PATENT DOCUMENTS

| | | | | | |
|---|---|---|---|---|---|
| 5,907,837 | A | * | 5/1999 | Ferrel et al. ................... | 707/3 |
| 6,021,443 | A | * | 2/2000 | Bracho et al. ................. | 709/241 |
| 6,138,143 | A | * | 10/2000 | Gigliotti et al. .............. | 709/203 |
| 6,154,781 | A | * | 11/2000 | Bolam et al. ................. | 709/238 |
| 6,704,785 | B1 | * | 3/2004 | Koo et al. ..................... | 709/227 |
| 6,748,455 | B1 | * | 6/2004 | Hinson et al. ................ | 719/318 |
| 6,772,418 | B1 | * | 8/2004 | Morris .......................... | 719/318 |

* cited by examiner

Primary Examiner—Viet D. Vu
(74) Attorney, Agent, or Firm—Harrington & Smith, LLP

(57) ABSTRACT

A data processing system includes a network containing of a set of connected devices, where individual ones of the connected devices include a data processor that executes a program for connecting to and disconnecting from the network and for maintaining a first list descriptive of other connected devices and a second list descriptive of at least some user-defined services published by individual ones of publisher connected devices that form a first sub-set of the connected devices. Individual ones of the publisher connected devices maintain a third list descriptive of an individual one or individual ones of registered service subscriber connected devices that form a second sub-set of connected devices. The publisher connected devices provide a service output to registered service subscriber connected devices upon an occurrence of at least one predetermined triggering event, which may be a push trigger, a pull trigger, or a combination of push and pull triggers. A given one of the connected devices may be a member of only the first sub-set of connected devices, or may be a member of only the second sub-set of connected devices, or may be a member of both the first sub-set of connected devices and the second sub-set of connected devices. The set of connected devices are logically organized into a plurality of clusters each having a top level connected device (TLCD), where the plurality of TLCDs are coupled together in a ring for propagating system administration information between the plurality of clusters. Services remain operative even after the connected device on which they initially reside becomes inoperative. This is accomplished by migrating the publication function to at least one other connected device when a current publisher's connected device becomes inoperative for any reason. A backup of last resort is referred to as a persistent connected device.

79 Claims, 15 Drawing Sheets

|   | A | B | C | D | E | F | G | H |
|---|---|---|---|---|---|---|---|---|
| 1 |   |   |   |   |   |   |   |   |
| 2 | [0]-> | [0]=WORKBOOK NAME |   |   |   |   |   |   |
| 3 |   | [1] -> | [0] -> | [0]=WORKSHEET1 NAME |   |   |   |   |
| 4 |   |   | [1] | [1] -> | [0] | [0]=TYPE[0] | [1]=TYPE[1] | ... |
| 5 |   |   |   |   | [1] -> | [0]=DESCRIPTION[0] | [1]=DESCRIPTION[1] | ... |
| 6 |   |   |   |   | [2] -> | [0]=DATA[0] | [1]=DATA[1] | ... |
| 7 |   |   |   |   |   |   |   |   |
| 8 |   |   |   |   |   |   |   |   |
| 9 |   |   |   |   |   |   |   |   |
| 10 |   |   |   |   |   |   |   |   |
| 11 |   |   |   |   |   |   |   |   |
| 12 |   |   | [1] -> | [0]=WORKSHEET2 NAME |   |   |   |   |
| 13 |   |   |   | [1] -> |   |   |   |   |
| 14 |   |   |   |   |   |   |   |   |
| 15 |   |   |   |   |   |   |   |   |
| 16 |   |   |   |   |   |   |   |   |
| 17 |   |   |   |   |   |   |   |   |
| 18 |   |   |   |   |   |   |   |   |
| 19 |   |   |   |   |   |   |   |   |
| 20 |   |   |   |   |   |   |   |   |
| 21 |   |   | [2] -> | [0]=WORKSHEET3 NAME |   |   |   |   |
| 22 |   |   |   | [1] -> |   |   |   |   |
| 23 |   |   |   |   |   |   |   |   |
| 24 |   |   |   |   |   |   |   |   |

FIG. 12

902, Application Tabs

| Specifications | Check Lists | Yield Data | Project Set Up |
|---|---|---|---|
| Summary | Experiment | SPC | Electrical |

Change Impeller H2So4 pump to Teflon

Current Status: Approved by Factory Executive Team
Pre-implementation
3 pending action items
2 unread emails (J.Hyde, D.Zook)

Originator: Jack Hyde ▼     Functional Group: Wet Chemistry ▼

Origination Date: 05-JUNE-2000

Sponsors: Add to List ▼     View List ▼

Coauthors:

Project Attributes:

Content Area, 904

- Based on Project: H2O2 Filter Recycling ▼
- WorkFlow Type: Equipment Mod ▼
- Impact Level: Global High Risk ▼
- Sharing: View External List ▼  Public ▼

Long Text Description:
Nylon Impeller has been observed to disintegrate in strong H2SO4 solution, shedding particles on wafers exposed to resist strip. The proposed change is intended to solve this problem.
Impacts all Type 6 wet clean station in all factories running the S3003 process.

Meet Online   Email   Forum   Whiteboard   Meeting Minutes   Schedule   Action Item 903, Communication Tools

FIG.13B

SYSTEM AND METHODS PROVIDING AUTOMATIC DISTRIBUTED DATA RETRIEVAL, ANALYSIS AND REPORTING SERVICES

CLAIM OF PRIORITY FROM COPENDING PROVISIONAL PATENT APPLICATIONS

This patent application claims priority under 35 U.S.C. 119(e) and 120 from the following Provisional Patent application Nos. 60/222,979, filed Aug. 4, 2000; 60/243,154, filed Oct. 25, 2000; 60/256,028, filed Dec. 15, 2000 and 60/267,245, filed Feb. 8, 2001, the contents of which are incorporated by reference herein in their entireties.

FIELD OF THE INVENTION

These teachings pertain to a system and methods for providing automatic data retrieval, analysis and reporting (RAR) services to interconnected desktop and mobile computer users, wherein the provision and receipt of the RAR services does not depend on central administration or processing.

BACKGROUND

A number of companies in numerous industries obtain, generate and store large amounts of information (data) which relates to the current and past performance of their operations. For example, in manufacturing industries it is common to characterize work pieces at various stages of production by manual or automatic means, and then store any characterization data in a database. Based on an analysis of this data it may be possible for workers to discover, for example, that corrective actions are required at a certain manufacturing step. By taking such corrective actions, these workers are often able to prevent the loss of valuable finished parts. Such data analysis, and or provision of status indicators, warning messages, or other forms of reporting may be carried out manually or automatically depending, among other things, on factors such as (a) the complexity of the analysis, (b) the ease of delivering the report to the intended worker, as well as (c) the number and complexity of steps which must be taken to retrieve and organize the input data prior to carrying out any analysis. Under very favorable conditions it may be possible to perform all aspects of the data retrieval, analysis and reporting sequence entirely automatically under computer control, and thus to effect any corrective changes automatically by using the report information within a feedback loop whose function is to adjust the operating conditions of one or more manufacturing systems. Under unfavorable conditions, all steps must be performed manually. The labor costs for a company associated with the latter may be considerable.

As a general problem, sequences which may be characterized as data retrieval, analysis and reporting (RAR) operations are not limited to manufacturing. Examples may be found in numerous service industries (for instance, financial services, health care, and legal services), government administration, and the military. Most RAR operations are carried out in large measure by manual means. As a means to control labor costs, and improve the efficiency of their operations, there is currently a great need among employers in all of these industries for computerized systems and methods for automating their RAR operations. A requirement for any such system is that it must be implemented in a manner which has low inherent operational risk, low cost, high scalability, and a minimal requirement for training of system users.

It is very common for companies and other organizations to use a combination of large scale, highly integrated computer systems in their daily operations. One common system is an Enterprise Resource Planning (ERP) system. ERP systems are used to provide a means of entering, manipulating and viewing records relating to many aspects of a complex organization B for example financial records, payroll records, inventory records, purchasing records, etc. The records may be stored in one or several databases to which the ERP system has access, and among other things, it is an inherent and critical function of the ERP system to coordinate the movement and updating of database information in order to minimize duplication of effort, and to provide accurate record keeping. For example, a change to an inventory record may require changes to be made to certain financial records, or a change to an inventory record may require a change to be made to an ordering record.

A further commonly used system is known as MES, or Manufacturing Execution System. The MES is used to track and control the movement of work pieces in a factory. In addition to transmitting instructions and characterization data between users and databases, the MES also generally controls one or more databases used to store historical records relating to (among other things) work piece characterization, machine maintenance, and manufacturing history, and is operative to use these records so as to provide a high standard of manufacturing history, and to ensure that work pieces are manufactured in a repeatable manner, and that they exhibit measured characteristics and performance falling within predetermined acceptable limits.

Both the MES and ERP systems typically provide a variety of data query and retrieval, analysis and reporting services. Specifically, it is common for many MES systems to feature an analytical subsystem for statistical process control (SPC) whose function is to automatically apply certain statistical tests to characterization and other test data, and make a statistical determination of the condition of a work piece under test, and the machines used to manufacture it. Based on such a determination the SPC subsystem may effect a warning message, or may otherwise alert a worker connected to the MES computer system to an occurrence of a production discrepancy. However, the analytical and messaging functionality found in ERP, MES and other so-called enterprise scale computer systems is generally limited in scope to what the vendor of such a system anticipates his intended typical customer may require.

To the extent that all organizations are unique to some extent, and may therefore have different methods and requirements, it has become apparent that many enterprise class software systems do not provide adequate functionality to meet the particular needs of many of their users. In other words, the lack of customizability inherent in these systems forces their users to carry out many RAR operations manually.

An important characteristic of enterprise software systems, such as the ERP system and the MES, is that they are based upon the so-called client-server architecture. Important characteristics of client-server systems include centralized administration, and the use of specialized server computers running specialized software, that is typically not found on machines such as desktop computers, to analyze and store data, and that functions to perform operations on behalf of connected system users (or clients). It is common for a large organization to have numerous servers dedicated to performing certain types of procedures or transactions having similar data access needs, or a similar group of clients. It is also common for servers to be required to exchange data, results and signals amongst one another automatically, and to have access to various databases.

Numerous integration techniques and protocols exist for creating the necessary linkages between such systems (including, for example, CORBA and DCOM). Adding software, communication linkages and storage capacity, as well as additional server capacity to such a complex system requires expert knowledge, and careful planning and administration. This makes the cost of installing and maintaining client-server based enterprise systems very high, and acts as a disincentive for many organizations to modernize and extend the RAR aspects of their computing systems.

Further, although enterprise software systems typically manage the exchange of data between databases, and provide users (clients) with access to that data by means of embedded reporting and query tools, they do not provide the clients with general access to those databases. Such access is usually available only to a small number of individuals with special permissions (for example, the vendor, or information technology (IT) professionals with special maintenance responsibilities). This is a significant characteristic and limitation of such client-server enterprise systems, the effect of which is to place data in locations where is it cannot be accessed by ordinary users with unforeseen interests. These and other disadvantages thus greatly diminish the potential value of critical stored data to organizations of all types.

Recently there has been considerable interest in so-called peer-to-peer file sharing systems. These systems purport to allow users to share information with each other that is stored locally in files on their systems. The principle behind all such systems is that two users may communicate with one another (i.e., exchange digital data) in an unmediated fashion. That is, they need not each connect, as in a client-server system, to a common central server whose role is to effect the exchange. Rather, they connect "directly" to each other. In fact, the connection may be indirect in the sense that the data passes through any number of routers and servers along its way, but these may be considered to be network nodes, and the specific path is not predetermined or fixed. The manner of establishing such connections and transmitting data across them is well known in the art of internet protocol (IP) technology.

A number of peer-to-peer methodologies and systems have received much publicity. In one system offered by Groove Networks Inc., peer users may create collections of files on their workstations, and then invite or allow others to view those files via a peer-to-peer connection. In certain business environments, especially those in which data are stored on desktop work stations in file form, this offers the potential benefit of allowing users to share selected files with each other. For example, the users may share files relating to a particular work project, without a requirement for a common server connection, or access to a common file server. In another system, known as Napster, users access a common server containing the names of songs indexed by the name and IP address of one or more individuals who may currently have digital copies of the songs stored on their workstations that may be accessed via peer-to-peer connections. An individual seeking a song file therefore carries out a search using the central server to process a query, and then downloads the song file via a peer-to-peer connection from one of the peers identified by the Napster server. This system provides a means for large numbers of users to exchange data files from among a very large collection of files. In yet another system, known as Gnutella, users agree to store files containing text or other content in a common, predetermined folder available to other users via a peer-to-peer connection. Each user then has an identical copy of the Gnutella system running on his workstation, and may issue search commands which are relayed from user-to-user via peer-to-peer connections. The result is a search on each peer contacted for content matching the search string, and the results of the search are presented to the searcher in the form of a list. The searcher may then download the content of interest via a peer-to-peer connection. In yet another class of peer-to-peer systems, known as distributing processing systems (an example of which is SETI@(home), users agree to install certain predefined analysis software on their workstations, and to permit their workstations to download data via a peer-to-peer connection, and subsequently process the data using the analysis software at certain times of the day, or when the software determines that the workstation is not in use. After completing the analysis of the data, the system transmits the result to a central collection point via an IP connection. In yet another system, known as Engenia, users (usually within a single company, and therefore isolated from unauthorized users) agree to expose some or all of the files on their computers to each other via peer-to-peer connections. The purported benefit of this system is that it enables users to search for "knowledge" among company experts on a subject related to a user's work. The method of operation of the system is comparable to the Gnutella system in that the searching process may involve the transmission from one peer to another of the original query string.

None of the above peer-to-peer systems effectively address the need among corporate users for RAR services, and do not provide access to information (records) stored in databases, nor do they allow users to automate the exchange of information between their workstations and such databases. The Groove system permits the grouping of files, and also permits many groups to be created and shared among many individuals. However, it does not enable users to establish database connections, nor automatically analyze and distribute reports to other users based on such analysis, and as such it has little value for enhancing corporate RAR functionality. Distributed computing solutions such as SETI@home and United Devices provide for users to automatically receive data, locally analyze, and then report the results of their analysis to a central computer; however, such systems are directed at dividing up the processing of large amounts of data using the distributed computing capacity of many users. As such, the users receive data from a central originating point (the fact that it is via an IP connection does not make this a peer-to-peer exchange), they agree only to receive the data, and they do not specify what data is to be received. Indeed, the data they receive has no significance for them, and may have no value to them in isolation from the input and output of the other processors. The local processing is carried out using an analysis program which is provided to them in toto and which they cannot modify locally in any substantial way, and the results are returned in a way they cannot change to a central server (again via an IP connection, but to a central server, not a peer) largely outside of their control and to a predefined location which they cannot change. This again has no value as a means for providing RAR services within a corporate environment. Engenia and Gnutella offer no local data processing capabilities, and they assume that all data are stored locally and in files exposed generally to the peer-to-peer network.

A number of systems also presently exist whose purpose is to provide executive and expert reporting services within corporate computing environments. Two providers of such systems are Cognos Inc., and SAS Institute Inc. These systems are based on client-server architectures, i.e., all query, analysis and report formation and distribution is carried out on one or more large servers, which would not be considered as "peers" in a network using peer-to-peer exchange. These systems are expensive to install and maintain, they are limited in processing capacity to a large degree, and the result is that they are made available only to a small number of workers. This greatly limits their value as RAR systems because they do not help companies to automate RAR operations and thereby reduce labor costs. Moreover, they also suffer from the problems generally associated with client-server enterprise systems, including poor scalability and low flexibility.

Another problem inherent in all such conventional data processing systems and techniques is that they are not readily amenable to the inclusion of "non-standard" devices within their respective networks. Such "non-standard" devices can include measuring, sensing and process control systems found in a manufacturing environment, point-of-sale (POS) devices, portable data processors such as personal data assistants (PDAs) having rather more limited memory and processing capabilities, as well as mobile devices that connect to and disconnect from the network using wireless links, such as radio frequency (RF) and infrared (IR) links.

As such, it can be realized that a long-felt need exists to provide a system and methods that give organizations a capability to realize an efficient and cost-effective implementation of RAR services.

SUMMARY OF THE INVENTION

These teachings provide a system for providing automated data retrieval, analysis and reporting (RAR) services utilizing an exchange of data in which mediation and processing are accomplished by one connected device (CD) per service who acts as a service publisher, and in which an arbitrary number of connected devices may act as service subscribers. The service publisher controls which users may subscribe to publisher's service. A publisher may create compound services which may themselves subscribe to other services. The number of connected devices is substantially unconstrained by eliminating a consideration of the processing or storage capacity of a central mediating server. The number of publishers, subscribers, services and subscriptions may thus be very large. In response to a connected device applying to a publisher connected device for a subscription, the publisher connected device may selectively grant the subscription based on some criteria, or it may grant the subscription automatically.

The analysis of data is carried out automatically using procedures specified by the publisher of a service and then reported to subscribers upon trigger events specified by the publisher and/or by the subscriber(s).

A feature of these teachings is that services remain operative even after the CD on which they initially reside becomes inoperative. This is accomplished by migrating the publication function to at least one other CD when a current publisher's CD becomes inoperative for any reason. A backup of last resort is referred to as a persistent CD.

Services may be created by the publisher by obtaining data automatically from databases, files, input devices or sensors, which may or may not reside on the publisher's system.

Subscription methods for RAR services are defined which may be operated from fixed or from mobile devices. Any number of mobile devices may be operated solely as subscribers to RAR services. Preferably the RAR services are provided to subscribers via IP protocols which may involve transmission over a private or a public network. Data retrieval may involve the use of commands native to Enterprise Resource Planning (ERP), MRP (Material Requirements Planning) and MES (Manufacturing Execution System), or other server-based software programs, or the use of commands native to desktop applications present on the publisher's Connected Device (CD).

A RAR publishing and subscription service is described in which an administrator controls who may belong to the network and what services each system user may access, or not access as the case may be.

In the preferred embodiment of these teachings the CDs use middleware which has both client (subscriber) and server (publisher) aspects, although a given CD may function only as a publisher, or only as a subscriber.

The data analysis may include a scripted use of executables and commands from other programs, and the RAR system may make use of desktop COM objects, including COM-compliant spreadsheet programs and models. The output format of a service is specified by the publisher, and the delivered data may be altered by the subscriber at the point of delivery, such as by discarding unwanted data. The subscribers and publisher interact directly through apply/accept-reject procedures, and the exchange of data between users, machines and databases is automated. The triggering of a RAR service is specified by the service owner (push trigger) and/or by the subscriber (pull trigger). For some services both the push and pull trigger conditions must be satisfied before the subscriber receives the service output. All reporting is preferably provided via substantially unmediated or direct connections.

The system provides a distributed searching capability, a distributed data processing capability, and a distributed administration capability.

Reports may be used to provide feedback for manual or automatic control systems, and custom database retrieval and reporting services may be created. The system further provides for the creation of scripted database retrieval services using legacy enterprise functions (i.e., use of ERP, MES, MRP reports may form an input to the RAR services.) Also provided is an ability to create scripted analysis services using legacy desktop executables, an ability to create scripted analysis services using a built-in scripting engine, and the creation of non-scripted analysis services using a spreadsheet engine and its associated functionality.

An aspect of these teachings is an ability to provide data warehouse creation methods using database services and secondary storage, analysis services using warehoused or database service data, and reporting services using warehoused or database service data for use as, by example, feedback for control systems. Distributed database searching is another aspect of these teachings, as is distributed query result processing.

A feature of the system is an ability to provide connected device (CD) cluster formation and migration of services amongst cluster members and persistent backups.

Over-subscribed services may be reported using a fan-out technique, wherein the responsibility for reporting the output(s) of a service falls on the subscribers to the service.

A data warehouse may be created from database retrieval services, and subscribers to the data warehouse service may receive pre-processed query results, of the processing may be performed by the subscriber, or by another CD in accordance with load-balancing considerations.

Mapped storage (i.e, file servers) may be employed as well by the CDs.

Project services are definable that provide subscription access to files, and which can themselves subscribe to reporting services.

These teachings beneficially provide a system in which the constituent connected devices are able to register their presence on the network with other connected devices without intervention from users or administrators, and in which the self-registration can be achieved on a LAN or WAN without prior knowledge of any IP Addresses. The connection status may be updated through a series of permanent connections between connected devices, and in which backup connected devices can be managed through a series of permanent connections between the connected devices.

In the preferred embodiments of the system services can be delivered without requiring permanent connection between the publisher and the subscriber, and publish-subscribe services can be based on a spreadsheet engine. Database services may be based on the operation of a connected device as a database middleware server.

It is a feature of the system that the users themselves can customize and extend the functionality of the system by developing their own publish-subscribe services, rather than requiring the skills of a professional software developer.

The present teachings provide a system and methods for creating and operating a computer network capable of providing data management and computing services such as, but not limited to, file sharing (e.g., static files and executables), data retrieval, data analysis, data reporting, and project management. Services provided by the system include application functionality and event-driven services. The system may be used alone, that is, separate from existing computer hardware, database, and software. The system may also be used in conjunction, though not dependant on, one or more databases and/or non-network devices (either data storage or processing device such as, for example, a database or an enterprise server).

An aspect of the system is to provide the above services, some in the context of existing client-server based Enterprise Resource Planning (ERP), MRP (Material Requirements Planning) and MES (Manufacturing Execution System) systems without substantially increasing the computational or storage burden for existing client-server devices. Accordingly, the system provides users, including users of existing client-server based processing systems, additional processing capabilities reliably, at low cost, and without taxing or substantially degrading the performance of existing systems.

A data processing system includes a network containing of a set of connected devices, where individual ones of the connected devices include a data processor that executes a program for connecting to and disconnecting from the network and for maintaining a first list descriptive of other connected devices and a second list descriptive of user-defined services published by individual ones of publisher connected devices that form a first sub-set of the connected devices. Individual ones of the publisher connected devices maintain a third list descriptive of an individual one or individual ones of registered service subscriber connected devices that form a second sub-set of connected devices. The publisher connected devices provide a service output to registered service subscriber connected devices upon an occurrence of at least one predetermined triggering event, which may be a push trigger, a pull trigger, or a combination of push and pull triggers. A given one of the connected devices may be a member of only the first sub-set of connected devices, or may be a member of only the second sub-set of connected devices, or may be a member of both the first sub-set of connected devices and the second sub-set of connected devices. The set of connected devices are logically organized into a plurality of clusters each having a top level connected device (TLCD), where the plurality of TLCDs are coupled together in a ring for propagating system administration information between the plurality of clusters.

BRIEF DESCRIPTION OF THE DRAWINGS

The above and other features of these teachings will be understood by reference to following description and drawings, wherein:

FIG. 12 is an example of a spreadsheet-based hierarchical data format; and

DETAILED DESCRIPTION OF THE PREFERRED EMBODIMENTS

Figure 1:
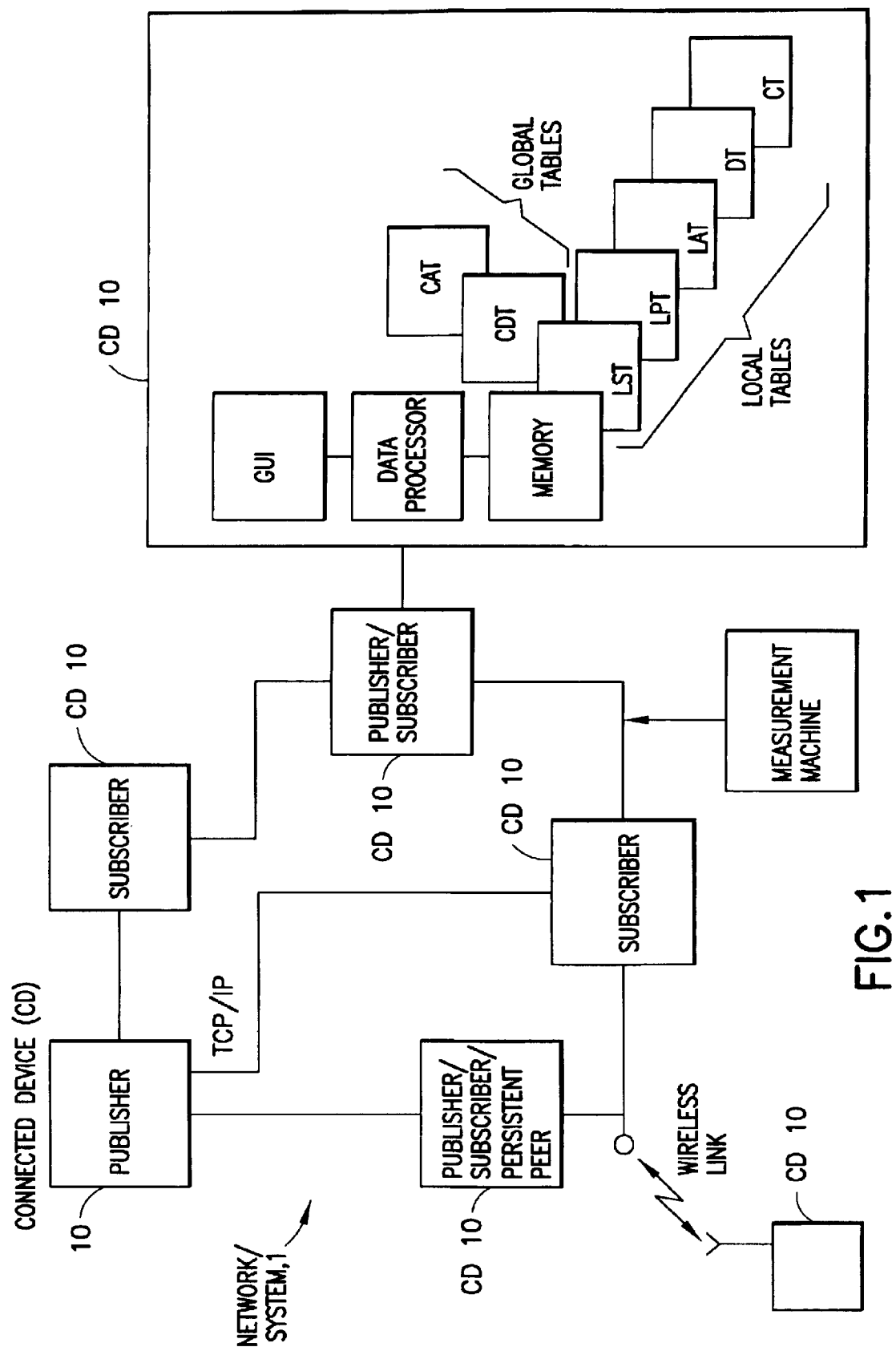
FIG. 1 is a simplified schematic diagram of a data processing network containing a plurality of connected devices in accordance with the teachings herein.

By way of introduction, and referring to FIG. 1, these teachings provide a system and methods for providing data retrieval, analysis and reporting (RAR) services within a distributed computer network or system 1 containing servers, databases and connected devices (CDs). The CDs 10 may include any suitable type of data processors including, but not limited to, mainframe computers, supercomputers, workstations, personal computers, portable computers and hand-held computers, as well as measuring systems, sensors and various types of mobile devices having some type of embedded data processor and memory. Connected devices 10 may act as servers, capable of creating and providing (i.e., hosting) data RAR services for other connected devices 10. To avoid confusion with conventional central servers, in the ensuing description the term "publisher" will be henceforth used to refer to any connected device 10 that functions as a server. Other connected devices 10 may act as clients, capable of receiving and optionally modifying reports that they receive from publishers. Further to avoid confusion between (a) connected devices 10 acting as clients with respect to services hosted by publishers and (b) devices connected to central servers, the term "subscriber" will henceforth be used to refer to the former, i.e., those connected devices 10 acting as clients with respect to services hosted by publishers. Connected devices 10 may also function both as servers (publishers) and as clients (subscribers). The system uses direct connections to allow connected devices 10 to exchange data with each other, and client-server connections to allow data exchange between workstations, central file servers and databases.

These teachings further provide methods which users of individual workstations may use to deploy data Retrieval, Analysis and Report distribution applications (or services). The functionality of these services resides substantially on the workstation of a service provider who initially creates and publishes a service, except that some aspects of the retrieval, analysis or reporting may be carried out on other computers (by example, on other workstations or central servers) under the control of the service residing on the publisher's workstation.

The Retrieve, Analyze and Report services are separately provided in the system 1 by one or several publishers, and they may be grouped to form Compound services. For example, an Analysis service may use the output of one or more Retrieval services for input, and likewise a Reporting Service may incorporate the output of one or more Analysis services in its output. It is also contemplated that a Reporting service may use the output of one or more Retrieval services in combination with, or in the absence of, output from one or more Analysis services. All such combinations may be referred to hereafter as RAR services, where it should be appreciated that a multiplicity of services may be present of any one type, or that one or more types of service may be absent or of a trivial nature.

The methods and system 1 in accordance with these teachings may be deployed on a network in which workstations and servers are connected together via an Internet Protocol (IP), such as TCP/IP, and where some number of workstations are substantially alike in computing power, storage capacity and speed. The system 1 is operative to identify at least one such computer in the network, and to designate this, and possibly other workstations, to serve as "primary backups", such that in the event of failure or loss of power to a workstation functioning as the publisher of a service, control and ongoing provision of the service is automatically transferred to the primary backup workstation, which then assumes the role of publisher for e the service or services provided by the workstation that is no longer available. In certain cases a suitable workstation maybe provided, referred to for convenience as a persistent CD, and this workstation is so equipped as to have the capacity to act as the primary backup for one or more workstations and services.

The system 1 is preferably administered by a distributed administrator, rather than a central administrator. The role of the distributed administrator is to maintain a special service operative to perform special functions such as, for example, system software upgrades and the maintenance of permitted user lists, access permissions, allowed users and connected devices 10. In the event that the distributed administrator's workstation becomes inoperative, then the administration service (including any associated data and authorities) is transmitted to a primary backup, which may be the persistent CD 10.

It is also within the scope of these teachings for the administrative service to reside on a central server, although in most cases this is a more expensive, and therefore less desirable, mode of operation.

In a simplest instance the system 1 may run on a plurality of substantially alike (i.e., in processor speed, memory, and non-volatile storage) connected workstation devices. To install the system 1 on such a network (it being assumed that all workstations are previously connected via a network protocol, such as TCP/IP), the workstations or other computing devices (i.e., the connected devices) are first loaded with identical system-level software, or with a sub-set of the system-level software. The software executes automatically upon installation and registers each connected device 10 by adding it to a list of valid connected devices on the network, which list is preferably stored on each connected device 10, along with information describing the processing characteristics of each connected device 10. Those devices so connected, having substantially similar processing power, may be considered to be "peers"; however, there is no requirement that all connected devices 10 should fall into this category. For example, their processing power may be greater (as in the case of a super computer), or less than (as in the case of a mobile device) that of the typical connected device 10. Therefore, not all connected devices 10 may be suitable primary backup devices. Moreover, not all connected devices 10 may have the capability to operate as service publishers, but rather only as subscribers. An important characteristic of the system 1 is that the automatic assignment of primary backup machines by the publisher systems takes into account the known computing power, and loading (i.e., the number of services published, and subscription rate) of other connected devices 10 which may be candidate backup machines.

In the simplest installation of the system 1 there need be no external sources of data, i.e., all data in the system 1 originates from files or keyboard input sourced from publishing devices in the network of connected devices 10. To create a simple instance of a RAR service in this case a publisher uses system 1 commands to specify that a service S1 is operative to accept keyboard input and store it in a memory location with an assigned name M1. The publisher may optionally specify a "push trigger" for the service, such that when M1 changes, its contents are transmitted via a connection to any subscribers to the service S1. Other types of trigger events can include, by example, timing events, "buffer full" events, "specified value" events and many other possible events, as well as combination of logical combinations of events. In this simple case, Retrieval means "obtained from a keyboard buffer", there is no Analysis, and Report means transmit the buffer contents. Similarly, Retrieval may include obtaining some or all of the data contained in a text or other file, Analysis may mean "load into a spreadsheet and prepare a chart", and Report may mean "transmit the chart each time it is updated to all subscribers". As another example of a simple RAR service, Retrieve may mean "obtain a named file from the local disk drive", Analyze may mean "no processing", and Report may mean "transmit a copy of the file to any subscriber requesting the file", the latter being an example of a file sharing service. A variety of such services may thus be created and published by suitable connected devices 10. The "no processing" events may be specified for any Retrieve, Analyze or Report step, so that a service may only Retrieve, or only Analyze, or only Report, or specify any other combination (e.g., RA, RR, AR) meaningfully.

In the system 1 there are two classes of triggers which may be applied to any service type, including compound services. A "push" trigger is specified by a publisher, and is any event (such as, by example, a time, a change in the contents of a file, or a change in the status of a variable) which the publisher can sense and specify, which initiates the RAR service, and that causes the publisher's service to execute. A "pull" trigger is specified by a subscriber, and is any event which the subscriber can sense to initiate the RAR service and cause the service to be executed. Combined triggers may also be used, such that both a push and pull trigger must be TRUE in order for a transfer of data to be effected. One important class of triggers uses COM events generated by COM compliant desktop software applications (by example, Microsoft Excel, Word, or PowerPoint), or COM compliant enterprise software applications running on a server.

Other techniques for introducing data to the connected devices 10 from an external source may involve the use of at least three types of Data Retrieval Services. The three presently preferred Data Retrieval Service modes are (a) direct database query services, (b) indirect query services, (c) sensor data services. To effect mode (a), a connected device 10, such as a workstation connected to an existing database, creates a suitable database query. Such queries may be simple or complex. An example of a simple query is "download a specified data record"; another example is "download any newly created record of a certain type". Many other such queries are possible. In such cases, the specified data records are downloaded to the publisher's device and stored in a file or memory buffer. To effect mode (b) a publisher with a suitable connected device 10, which is also connected to a second computer network running an enterprise system such as a MES or an ERP system, creates a service which executes one or a sequence of commands using the native instruction set of the MES or ERP system. This causes the system 1 to retrieve and download certain records (e.g., a report) generated by the MES or ERP system to the publisher (acting as a client with respect to the ERP or MES). The Indirect Query Service may then optionally extract certain parts of the downloaded report, and subsequently store these locally for later transmission to subscribers to the Retrieval service. To effect mode (c), the sensor is registered as a valid connected device 10, and is the publisher of a "sensor service" that continuously or periodically updates a simple report containing a digitized measurement result (e.g., the temperature of an oven or the speed of a conveyor belt). A Sensor Data Service then subscribes to this sensor service, providing a pull trigger which causes the output of the Sensor Service to be transferred to local storage on the connected device 10 publishing the Sensor Data Service, where it may be further processed and combined with Sensor Service data from other sensors, and which may then form part of a complex Sensor Data Service report to which other connected devices 10 may subscribe. This mode of operation thus provides, by example, the basis for a large scale environmental monitoring system.

The foregoing relates to actions taken by the publisher of a data Retrieval service. As explained, the publisher may or may not elect to specify a trigger event which causes the service to execute (i.e., download and store data). The subscriber to a data Retrieval service generally has the option to choose to use some, or all of the data made available by the publisher. It is noted that in the preferred implementation all data specified in the service output is delivered to the subscriber. The subscriber then decides what data to use and what to ignore. The service metadata describes the data provided by the service, and the subscriber uses an interface to this metadata to specify what should be used.

The subscriber may also specify a trigger event (for example, a time of day), the occurrence of which causes the data to be transferred to the subscriber. If the service was specified by the publisher to be a "push" service, then the transfer is effected only when the subscriber trigger is TRUE and the publisher trigger is TRUE. Otherwise (in the absence of a push trigger), the transfer is effected when the subscriber's trigger is TRUE. This logic governing such compound trigger events applies also to Analysis and Report services.

In any of the services considered herein, the term "local storage" of data may include storage on local media (e.g., a disk drive), or on "mapped remote storage devices" such as a file server.

Data transferred to a Retrieval service subscriber is preferably analyzed using one or more analysis programs resident on the connected device 10 of the publisher or the subscriber, and processing preferably takes place substantially on the publisher's, or the subscriber's connected device 10 in order to avoid taxing the processing capability of a central server or processor. Thus, for example, the publisher may create an Analysis service which effects processing of certain data on the publisher's connected device, with the output of the service (e.g., a text or spreadsheet file) being stored locally or on a mapped storage device. Alternatively, the publisher may specify that the processing is to take place on some other connected device, for example, that of the subscriber.

All nontrivial data Analysis services include steps of obtaining input data (the output of a data Retrieval service to which the Analysis service publisher is a subscriber), processing the data, and creating an output object (e.g., a text or graphic file, or a spreadsheet) stored on the connected device 10 of the publisher (or on a mapped file server to which the publisher has read and write access).

Analysis Services may be effected preferably in one of two ways, as governed by the manner of processing. In one mode the service uses a COM compliant software program for processing, and in one preferred implementation the system 1 is made to be COM compliant. It is in the nature of COM compliant software programs that one COM compliant program may exchange data with another COM compliant program in a flexible manner that is well-known in the art of application programming. It is further in the nature of COM compliant programs that one COM compliant program may cause another to execute certain of its native functions. Using these features of COM compliant programs, a publisher may automatically transfer data from an output of a data Retrieval service (or other data source) directly into a COM compliant application, such as a spread sheet (by example, a spreadsheet created by means of MS-Excel). By transferring some or all of the subject data into specified cells of the spreadsheet, the Analysis service (via the processing specified in the spreadsheet) causes a result (such as a value, chart, or message) to be generated. This generated result may then be stored and viewed in the spreadsheet, and may subsequently be used by a Reporting service for output. Note that this is not equivalent to outputting the entire spreadsheet, but rather provides a means to selectively output certain values (such as cell values) or embedded objects (such as charts), or some combination thereof.

In a second mode of operation, the publisher of the Analysis service may use an executable application that is not necessarily COM compliant. In this mode the publisher takes certain steps using a "recorder" feature of the system 1 to create a sequence of steps, preferably in the form of a "script". Execution of the script then generally operates by: (a) Starting the executable analysis application (for example, a program written in Fortran, and stored in executable form, or a Windows application featuring a Graphical User Interface GUI)); (b) Loading the subject data into the application; and (c) Operating on the data in some way in order to produce an analysis result. The manner of data input and result output employs files which may be transferred in toto. Although this manner of transfer of data and output is less flexible than in the COM compliant mode described previously, it may be preferable in cases where it is desired to use an existing analytical procedure which is not COM compliant, thereby realizing one of the cost saving benefits that accrue from the use of these teachings. The Analysis service may be triggered to run automatically using one or a combination of push and pull triggers as discussed previously.

The system 1 features several presently preferred modes for providing data Reporting services. The function of all such services is to effect an automatic transfer of information between a connected device 10 controlled by a publisher and a connected device 10 controlled by at least one subscriber subject to a trigger event. The information is assumed to be in the form of digital data prepared by a data Retrieval or Analysis service. Trigger events may be specified by the publisher (push trigger) or subscriber (pull trigger), or both (AND or OR). For example, a trigger event may be specified to be one of the following: (a) a change in a computer file on either the publisher or subscriber device, (b) the occurrence of a date, or time of day, (c) a request made by a subscriber to a publisher, (d) a change in a database record, (e) a change in the state of a sensor, (f) and the prior execution of a Retrieval or Analysis service on either the publisher or subscriber's connected device.

One aspect of the system 1 is that a subscriber to a Reporting service may select all, or only a part of the report information exposed by the publisher of the service to transfer to subscriber's connected device. Thus, by example, if the publisher prepares a Reporting service exposing a spreadsheet file for output, then the subscriber may specify that the entire spreadsheet, or that only certain spreadsheet cells, are to be transferred to the subscriber's device upon execution of the service.

These teachings also provide methods for automatically creating data warehouses. For the purposes of these teachings a data warehouse is a collection of data automatically culled or compiled from one or more data sources, such as, by example, databases, or a collection of computer files, or from one or more sensors. The data warehouse then provides a convenient and secure source of data for certain specialized analysis and reporting applications. The culling (i.e., selection based on specified criteria) and compilation (i.e., the joining, or reorganization of culled data) may be best effected by means of one or a multiplicity of data Retrieval services to obtain data meeting specified criteria, and then directing the data thereby retrieved to a database. The organization of the database is controlled by the data Retrieval service subscriber (who may also be the service publisher), hereinafter referred to as a "warehouse publisher". The system 1 provides methods well known in the art of database technology whereby the warehouse publisher may specify the organization ("schema") of the warehouse.

The warehouse publisher has permission to write data to, and optionally to read data from the warehouse database. Either the publisher, or the distributed network administrator, controls a list of permissions whereby third parties have read and write access to the warehouse database. It is not required that those with such access subscribe to, or operate within the system 1.

The system 1 may be used to effect automatic Statistical Process Control (SPC) by combining data Retrieval, Analysis and Reporting services. The implementation of such an SPC system may be in such a manner that all required RAR services reside on a single connected device 10, or on many connected devices 10. In some situations, the amount of data generated over time by one or more sources may be very large. In such cases it may be advantageous to distribute the RAR service among several connected devices 10 in order to effect timely processing.

The system 1 further features Project Management service methods whereby groups of individuals may work collaboratively on one or more common tasks involving the ongoing analysis and reporting of data and results in a particularly effective manner. To create such a service using the system 1 the user of a suitable connected device 10 prepares a compound data Reporting service which, like any Reporting service, specifies certain files, records and other information that the user wishes to publish. The user may also specify one or more other RAR services. Subscribers to the Project Management service may receive both the specified files, as well as the information associated with any of the specified other services. In this way, a group of individuals may be automatically provided with a common information concerning a project in which they are participants. Further, the system 1 features methods whereby the Project Management service subscribers may exchange email, tasks, schedule events and instant messages with their co-subscribers which are automatically added to a Project database residing on the publisher's connected device, or another connected device 10 acting as a primary backup for the Project Management service.

A feature of the system 1 is the ability to ensure that all CDs 10 have up-to-date information regarding the status of all other CDs 10. This is achieved through the use of fixed connections within and between clusters 11 of CDs 10 (see FIG. 2A). These connections are based on Client and Server Sockets (e.g., using AstaClientSocket and AstaServerSocket components), i.e. they use sockets and TCP/IP. Client and Server Sockets and the details of their use are well known in the art of network connection technology.

The creation of the clusters 11 is based on the concept of a group of Top-Level CDs (TLCD). Each CD 10 can operate as both a client and a server and the clusters 11 operate on the basis of configuring the TLCDs as servers with all other CDs 10 operating as clients. This partitioning of CD 10 operation is for the purpose of system management, and does not imply that the "client" CDs 10 are restricted in functionality.

If one has a network of N computers, then the number of TLCDs is dependent on a parameter D that can be changed by the system administrator, where D is the number of CDs 10 per cluster 11. If Nc is the number of clusters 11 then:

$$Nc=\text{Round}(N/D).$$

A default value for D may be specified at startup as a feature of the system 1 design.

Another parameter that is pre-defined in the system 1, but that can be altered by the administrator, is the default number of TLCDs, NT.

After the system 1 has been established the number of TLCDs is equal to Nc.

An extreme example has D=N, giving one large cluster 11. Multiple clusters 11 provide a greater level of redundancy, minimizing the amount of re-connection activity if a cluster server goes off-line. It also provides a possible starting point for organizing backups for services, that is, for the migration of services within the system 1, as described in further detail below, and for re-connection strategies that minimize network activity.

Figure 2A:
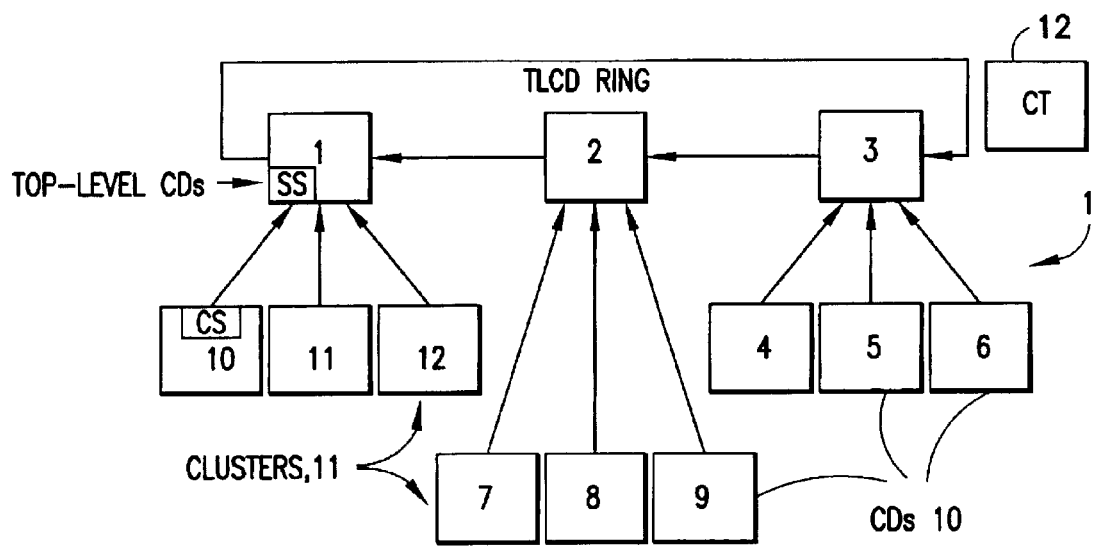
FIG. 2A depicts a steady-state configuration of the system for an example network of connected device clusters through top level connected devices (TLCDs), the network having a total of 12 connected devices (CDs)

The preferred steady-state configuration of the system 1 is shown in FIG. 2A, for an example network with 12 CDs. In this case a ClientSocket (CS) on CD#10 connects to a ServerSocket (SS) on CD#1. The key functionality of the Client and Server Sockets that is used to maintain the connection status is:

ServerSocket: Client Connect and Disconnect events

ClientSocket: Disconnect event (i.e. when the Server forces a disconnect)

The detailed use of these Sockets in maintaining the global status is described in the following sections.

It should be noted that there is no requirement for an equal number of CDs 10 in each cluster 11. Assuming that all CDs 10 are on-line, typically there will be one cluster 11 with a CD count not equal to D. For example, if there are 100 connected devices 10 on the network, and a specified cluster 11 size of 7, then there will be 14 clusters, 13 of which will have 7 members with the 14th having 9 members.

The cluster 11 configuration based on system 1 status monitoring provides a possible means of organizing backups for published services, although it is not a requirement.

There are a number of ways to organize the assignment of the client CDs 10 to each cluster 11. The example depicted in FIG. 2A shows the lowest CDs in the hierarchy being assigned to the highest-ranking TLCD.

This section describes (i) the actions taken on connection and disconnection of individual CDs 10 and (ii) the actions taken to organize the CDs 10 into the previously described cluster 11 architecture.

An important aspect of the system 1 is that a newly-connected CD 10 should, without user intervention, be able to (i) detect the presence of other CDs 10 and (ii) to register its own presence with those other CDs. Two distinct network scenarios exist (i) a network composed of computers connected together without the presence of a mediating central server and (ii) a network composed of computers connected together through a central server.

The preferred transport protocol of the system 1 is TCP/IP and, in order for the CDs 10 to communicate, this requires that each CD have access to the IP addresses of all other CDs. A complication is that the IP address of a workstation on a Local Area Network (LAN) is normally dynamically allocated when the workstation logs onto the LAN server.

On a Windows network there exists functionality to allow computers to gain information on other computers on the network without having pre-existing knowledge of any IP addresses. Specifically, on a Windows network, the system 1 uses Mailslots and Named Pipes (well known in the art of network technology) to allow CDs 10 to locate each other on the network.

Another important aspect of the system 1 is that the CDs 10 can locate each other, and the system 1 can auto-configure, without requiring any IP address information to be supplied by a user or administrator. Similar functionality exists for networks based on Unix-type servers (i.e., UDP and Named Pipes).

A Mailslot is created within each CD 10 as it starts up. An ALMailslot Delphi component is an example of a component that can be used for this purpose. ALMailslot includes a Broadcast function that takes a simple string of characters as an argument, and an OnNewMessage event which fires when a new Mailslot message is received.

The string of characters, i.e. the text, which is broadcast in the startup Mailslot message contains the following key items:

(i) an identifier (message-type identifier) indicating that the message is a request for status information;
(ii) the local IP Address;
(iii) the operating system of the sending computer (9x or NT);
(iv) the number of records in the local CDT; and
(v) the install Date and Time.

The text message is built by converting any non-string-type parameters to strings and concatenating them into a single larger string that forms the message to be sent, with each sub-string being separated by a colon (":") or similar character. For example, the string "1:195.10.1.2:9x:0:2001-4-4 14:30:00" contains information that this is a request for status information (i.e. the "1") from a CD 10 that is online at IP Address 195.10.1.2, that the operating system is Windows 9x (i.e. 95/98/ME), that there are no entries in the local CDT and that the install date and time is Apr. 4, 2001 at 14:30.

The OnNewMessage event procedure in the Mailslot passes the following parameters:

(i) the ComputerName of the computer that sent the message;
(ii) the UserName of the logged on user on that computer; and
(iii) the message text itself.

This information is sufficient to identify the remote computer on the network.

A feature of Mailslot messages is that the sending CD 10 receives its own message. The CD 10 includes the ability to distinguish these from messages sent by remote CDs, as described below.

When a CD 10 is first installed and started it has no records in its local CDT of any other CDs 10 on the network. The following pseudo-code describes the steps taken during initial startup:

```
Procedure Startup
    Create Mailslot
    If Operating System = Windows NT or Windows 2000 then Create
      Named Pipe Server
    Start CD Timer (see next section)
    Retrieve record count from CDT
    If recordcount = then do the following
        Determine the local IP Address
        Build Mailslot message (see section A above)
        Broadcast the Mailslot message
    End of recordcount conditional section
End of Startup procedure
```

A description of the use of Named Pipes within the system 1 is described below.

When a Mailslot message is received by a CD 10, it is handled in the OnNewMessage event procedure as follows:

```
Procedure OnNewMessage
    Read message text
    Extract the message-type identifier (MTI)
    Extract the IP Address
```

```
If extracted IP Address = local IP Address then exit (i.e.
    message origin = local)
If MTI = request for online status information then do the following
    Create new Mailslot message with MTI = "Reply from
        online CD"
    Add local IP address, operating system etc to the new Mailslot
        message
    Extract Computer and User Name from received message
    Check local CDT for the Computer Name
    If Computer Name not present then
        Add a new record to the local CDT and update the IP
            Address, ComputerName etc
    Else if Computer Name present then
        Update the IP Address
    End of Computer Name conditional
End of new CD online conditional If MTI = Reply from online CD then do the following
    Extract Computer and User Names from message
    Add a new record to the local CDT and update the IP Address,
        ComputerName etc
    End of online CD reply conditional
End of OnNewMessage procedure
```

Using the above procedures, each new CD 10 provides information on its IP Address and Computer Name to all other online CDs 10, thereby allowing them to register the new CD 10 in their local CDT. Each of the online CDs 10 in turn sends a reply Mailslot message to the new CD 10 with the equivalent parameter settings. In this way local CDTs with a record of all CDs 10 on the network are created without there being a need for any initial knowledge of IP Addresses.

At least two startup management sequences may be employed by the system 1:
(i) the above steps are carried out during the launch of the CD 10 application; or
(ii) a timer-based approach is used, where the CD 10 is launched and a timer is created within the CD 10. This timer controls the broadcast event, launching a broadcast at regular pre-defined intervals. The presently preferred embodiment is that where the broadcast is carried out as the CD 10 is started up.

Each CD 10 has an associated timer that starts when the CD 10 is launched, hereafter referred to as the StartupTimer. A suitable timer component is the TTimer component that is supplied with Delphi. The function of a timer in general is to carry out a specified action at regular, pre-specified intervals. The StartupTimer is configured to trigger X milliseconds after startup, and every Y milliseconds thereafter, where Y>X.

The use of the StartupTimer for start-up management when a CD 10 is first installed is described in further detail below with regard to initial startup when there are no replies from other CDs 10.

When a CD 10 is first installed and started it has no knowledge of any other CDs 10 on the network, and other CDs 10 have no knowledge of it. After the initial Mailslot broadcast there is the possibility that there will be no reply from another CD 10. This can occur due to the following two scenarios:
(i) the CD 10 is the first to be installed on the network; or
(ii) there are other CDs 10 on the network, but they are all off-line.

The number of replies is checked within a StartupTimer OnTimer procedure. This triggers X milliseconds after the CD 10 has started up. The sequence of actions is described in the following pseudocode:

```
Procedure OnStartupTimer for Time = X
    Count number of records in CDT
    If count = 0 then do the following
        Set local Rank = 1
        Enumerate the domains on the network
        Add domain names to the Domains Table (DT)
        Enumerate the computers on the network
        Add the computer names to the CDT with Active = false
        Reset the StartupTimer interval to Y
    End of count = 0 conditional
End of OnStartupTimer procedure
```

The new timer interval Y is preferably configurable by the system administrator.

The aim of the above sequence of actions is to provide a basis for the new CD 10 to continue querying the network using individual Mailslot messages, rather than using global broadcasts at regular intervals, and thus beneficially minimizes the amount of network traffic.

The functions used to enumerate the domains and computers are described below. The enumerated computers, which are computers that are on the network but which do not have the software installed or running, are added to the CDT with Active=false, i.e. they are initially configured for the case where there is no CD 10 installed on them (in other words, these computers are not yet "connected devices").

The system 1 therefore configures the new CD 10 to continue querying the network to establish its registration, rather than have existing CDs search for new CDs.

Mailslot messages can be transmitted using a number of different formats. As well as the broadcast format used in the new CD 10 startup procedure, a format exists to transmit to a specific computer name on a specific domain name. The following pseudocode describes the actions associated with the ongoing network queries:

```
Procedure OnStartupTimer for Time=Y
    Retrieve B (the cycle size)
    Cycle through B computers in the list of enumerated
        computers
    For each of the B computers transmit the Mailslot mes-
        sage requesting status update
    End of OnStartupTimer procedure
```

The cycle size B is the number of computers the new CD 10 will transmit the Mailslot message to every time the timer triggers. For example, if there are 100 computers listed in the CDT and B=10, then the CD 10 will start with the first 10 computers and transmit the Mailslot message to each in turn. When the timer next triggers the Mailslot message is sent to the next 10 computers in the CDT, and so forth until completed.

The parameters B and Y can be set to cover a wide range of querying strategies, with the two extremes being:
(i) B=N (where N=Number of computers) and Y is relatively long; or
(ii) B=1 and Y is relatively short.

The first of these cases is similar to the broadcast case, where the timer triggers relatively infrequently and all computers on the network have the Mailslot message transmitted to them. The preferred implementation is the second case, where single Mailslot messages are transmitted relatively frequently.

The sequential Mailslot transmissions are continued until
(i) a reply message is received from an established CD 10 or
(ii) a status request Mailslot message is received from another CD 10.

The presence of a licencing sub-system provides a convenient way of establishing the maximum possible size of the system 1 on a network, i.e., the maximum number of CDs 10. A set of Delphi components providing suitable licence control functionality is OnGuard from Turbopower software.

A typical implementation of licencing technology such as OnGuardJ involves a hidden key within the compiled software application, together with a serial number and an associated modifier, such as the company name. For the licencing condition to be met, the combination of key, serial number and modifier must match. Restrictions can be included in the software application that come into force if the licencing condition is not met. Examples include preventing the software from running, or restricting the functionality.

Within the context of the system 1, an additional modifier can be added—the maximum allowed number of CDs 10. As additional CDs 10 beyond the permitted number are detected, they are added to the CDT, but are marked as Active=False. This prevents connections between unlicenced CDs and any other CD 10, but ensures that if the licence count is increased then the re-configuration of the system 1 will be achieved more rapidly.

With regard to establishing the CD 10 configuration, consider first the situation where the system 1 is being installed on a network for the first time. The steps described assume that a CD 10 remains on-line after start-up and as the other CDs 10 are installed and started up.

The cluster 11 configuration shown in FIG. 2A contains a ring of TLCDs, with each TLCD forming the primary server in a series of client-server clusters 11. Each CD in the system can be viewed as having a "parent" CD, and this parent is recorded in the CDT. The establishment of this topology is presently preferred, as it provides an efficient connection strategy for immediate notification of any connect/disconnect events.

The first task during startup of the system 1 is the establishment of the TLCD ring. The following steps describe the establishment of connections between CDs 10 as they start up (NT is the
pre-specified number of TLCDs):
CD1 Starts up—no reply to Mailslot broadcast, set CD1 Rank=1
Update CDT (Cluster ID=Rank, Rank)
CD2 Starts up—reply from CD1, CD1 receives CD2 Mailslot message. Set CD2 Rank=2.
CD2 Client Socket (CS) connects to CD1 Server Socket (SS)
Update CDT (ParentIdentifier field, Cluster ID=Rank, Rank)
CD3 Starts up—replies from 1 and 2. Set CD3 Rank=3.
If NT>=3 then CD3 Client Socket connects to CD2 Server Socket
CD1 Client Socket connects to CD3 Server Socket
As each TLCD is incorporated into the system 1 a new record is added to a Clusters Table 12.

At this stage the system 1 has formed into the first closed ring of CDs 10, i.e., 3 CDs, and any further TLCDs will be incorporated into this ring. The disconnect/connect sequence is as follows:

CD4 Starts up - replies from 1, 2 and 3. Set CD4 Rank = 4.
If NT >= 4 then do the following -continued CD4 Client Socket connects to CD3 Server Socket
CD1 Client Socket disconnects from CD3 Server Socket
CD1 Client Socket connects to CD4 Server Socket
End of NT conditional When the Nth CD starts up and N>NT then the sequence to attach CDs to the TLCDs begins:
CDN Starts up
If N>NT then CDN connects to TLCDn.
CDN+1 Starts up
If N+1>NT then CDN+1 connects to TLCDn+1.

This sequence demonstrates that the CDs 10 are attached to each TLCD in turn, i.e. the clusters 11 are constructed in parallel, thereby ensuring that the CD clusters 11 are formed in a balanced manner.

The construction of the system 1 is controlled by two parameters (i) the default number of TLCDs, NT and (ii) the cluster size D. As the system 1 is constructed the details of the connections are determined by NT. At some point the number of CDs in each cluster 11 will equal D and the number of clusters 11 will equal NT.

If a new CD 10 is added at this point two choices are available:
(i) add the CD 10 to an existing cluster 11; or
(ii) increase the number of TLCDs, i.e. insert the new CD 10 into the TLCD ring. The preferred implementation is the latter procedure.

An alternative method of building the system does not require the number of TLCDs to be specified, only the cluster size D. In this case CD1 is the first TLCD as before. Unlike the previous approach, CD2 is not the second TLCD, but the first cluster client attached to CD1. Subsequent CDs are added to the cluster until D is reached. The following CD is then the second TLCD, and so on. Therefore, each cluster is completed up to the maximum specified cluster size D before the next cluster is started.

The previous implementation is the preferred one. For the simple assignment of seniority based on installation time it automatically ensures that all TLCDs are in the central ring without having to disconnect and reconnect CDs 10.

As CDs 10 are installed on the system 1 it is possible for "orphan" groups of CDs to be established, unless a mechanism exists to prevent this. Orphan groups would be established if new CDs 10 are added to the network while all member CDs of the existing installed group are off-line.

To protect against this, the system 1 provides a low-network-load polling mechanism that uses either (i) Mailslot messages or (ii) Named Pipes (refer to the description on the Startup in a WAN for further details on Named Pipes).

The polling mechanism is based on:
(i) the list of enumerated domains and computers that is obtained by any CD 10 that starts up on a network, where no other CDs are on-line; and
(ii) the Startup timer that initializes when the CD 10 starts up.

The enumeration of the computers includes the retrieval of the operating system information. Only those computers currently marked as Active=False are polled, since this setting indicates that application has not been detected at that location.

The timer runs continuously while a CD 10 is on-line. Each time the timer event triggers the CD 10 sends a request for status information to at least one of the Active=False computers. Each time the timer fires the next computer on the list is used as the recipient. Two situations apply:

(i) if the computer is on the current broadcast domain then send a Mailslot message; or
(ii) if the computer is on a different broadcast domain, and its operating system is NT or 2000, then use the system Named Pipe to attempt a connection.

The system 1 also provides a feature whereby a user can browse for computers on the network and select one or more as message recipients. Such user intervention can be used as a last resort for situations where orphan groups have failed to be linked automatically.

In practice, the existence of such orphan groups is unlikely, since the start-up of a new CD 10, while at least one CD 10 from each group is on-line, triggers a synchronisation of the CDTs.

On a Windows network the operating system provides functions for enumerating domains and computers on the network. These functions include the WNetOpenEnum and WnetEnumResource functions.

The system 1 provides a means for an administrator to specify computers on the network which have the system software installed. This is provided during the installation in the form of a network browse dialog.

When a CD 10 re-starts, the event is registered as being a re-start by counting the number of records in the CDT (which should be greater than zero).

There are two possibilities that would lead to the re-start of a CD 10:
(i) the computer has been powered-down or the CD closed during the current 24 hr period; or
(Ii) the computer has been powered-down overnight (or longer).

With respect to fixed IP addresses, if each CD 10 has a permanently assigned IP Address then the re-connection steps are relatively simple, as the IP addresses stored in the CDT will still be valid. In this case the startup is described by the following pseudocode:
Retrieve ParentID from CDT
Retrieve IP Address of parent from CDT
Establish Connection With respect to Dynamic IP addresses, if the IP address of the CD 10 is allocated dynamically on startup then the re-start procedure is more complex, since the current IP addresses in the CDT might not be valid.

During start-up, the CD 10 retrieves the LastLogoffDateTime from the CDT. The connection actions initiated by the CD 10 during start-up are conditional on whether the LastLogoffDateTime is within the current day. This is described by the following pseudocode:

---

IfLastLogoffDateTime is within the current 24 hr period Then
    Attempt to re-start using connections
Else if LastLogoffDateTime is before the current 24 hr period Then
    Attempt to re-start using Mailslot messages
End of LastLogoffDateTime Conditional

---

If the CD's last logoff was within the current 24 hr period, then there will be a high probability that the IP Addresses currently in the CDT will still be valid. Therefore connection attempts are made on the basis of the existing IP addresses.

The pseudocode for re-starts using connections and Mailslots is given below.

As for the Initial Startup case, the Startup timer is initialized with a timer delay=X. A high-level view of the re-start sequence is as follows:
(i) Start the CD 10
(ii) Start the Timer
(iii) Attempt connections and/or mailslot messages
(v) During the Timer event check connection status
(vi) If no connection is made, then increment ClusterID and start again The details of this procedure are given in the following pseudocode examples:

---

Procedure ReStart with Connection
    Retrieve the local ClusterID
    Filter the CDT where ClusterID = local ClusterID and order by Rank
    Store the highest Rank value in MaxRankTable variable
    Start Loop
        Retrieve last known IP Address of first CD in list (i.e. highest rank)
        Attempt to connect using ClientSocket
        If Connection Error then
            Move to next ranking CD on list and repeat cycle
        End Connection Error Conditional
    End Loop when a connection is successful or all CDs have been attempted
End of Procedure ReStart with Connection

---

A failure to connect may be caused by either: (i) all other members of the cluster 11 are currently off-line, or (ii) all other members of the cluster 11 have new IP Addresses. If there is no successful connection during the above cycle, then the next step involves sequential Mailslot messages (within the cluster 11) as follows:

---

Procedure ReStart with Mailslot Messages
    Start Loop
        Retrieve ComputerName and DomainName of first CD in cluster list
        Send Mailslot to CD
        Move to next CD on list and repeat
    End Loop
End of Procedure ReStart with Mailslot Messages

---

The time delay X of the StartupTimer is selected to allow time for any Mailslot replies to be received. The Mailslot messages contain the Rank of the sending CD 10. The re-start CD 10 has a variable that holds the highest rank value obtained from Mailslot replies: this is initialized to MaxRank=0. In the Mailslot OnNewMessage event the following pseudocode applies:

---

Procedure OnNewMessage
    Check connection status
    If connected then exit
    Extract Rank value from message
    If Rank = MaxRankTable then connect to Rank using ClientSocket
    If Rank > MaxRank then MaxRank = Rank
    Wait for next Mailslot message
End Procedure OnNewMessage

---

As each message is received the CD 10 checks its current connection status. If an earlier Mailslot message has resulted in a successful connection then all other messages are ignored.

An alternative implementation omits the attempts to re-connect to each CD 10 using the Client and Server sockets and instead directly loops through the Mailslot messages.

After the time period X has elapsed, the timer OnTimer event triggers and the CD 10 checks its current connection status. If there is still no connection then the actions described in the following Cluster Re-Start are carried out.

With respect to CDT update, the following are fields that are updated when a CD 10 re-starts:

LastLogonDateTime

ParentID (i.e., the CD 10 that is acting as a server to the re-starting CD)

When a CD 10 re-starts, there exists the possibility that all other member CDs 10 of the cluster 11 are off-line. This will be detected when the timer event fires, as described in CD Re-Start section. In this case one strategy would be to re-start the re-connect actions, but targeted at the next cluster 11 in the Clusters table (CT). The preferred implementation is to have the re-connecting CD 10 act as the nucleus for re-establishing the original cluster 11.

Each cluster 11 can be viewed as both a "server cluster" and a "client cluster" within the main TLCD ring shown in FIG. 2A. The re-connecting CD 10 first retrieves the list of currently-connected TLCDs before determining where it should be inserted into the TLCD ring. The re-establishment of the cluster 11 is carried out within the timer OnTimer event, and the following pseudocode describes the actions which occur:

```
Procedure OnStartupTimer for Time = X
    Check connection status
    If connected = false then do the following
        Enumerate the TLCDs in the CDT
        Start Mailslot message Loop
            Send Mailslot message for status update to each TLCD
        End Mailslot message Loop
    End of connected = false conditional
End of OnStartupTimer procedure
```

The next stage of the process is handled within the Mailslot OnNewMessage event, and the following pseudocode applies:

Procedure OnNewMessage

Check connection status

If connected then exit

Extract Rank value from message

If Rank=MaxRankTable then connect to Rank using ClientSocket

If Rank>MaxRank then MaxRank=Rank

Wait for next Mailslot message

End Procedure OnNewMessage

If none of the primary TLSDs are currently on-line then the following sequence of actions is carried out:

(i) obtain the next cluster ID;

(ii) enumerate Computer Names in the cluster 11;

(iii) send status request Mailslot message to each computer name in the cluster 11; and (iv) from the reply messages determine the current main server for the cluster 11.

The above procedures are repeated until the current configuration of the TLCD ring is established. The details are similar to those outlined in the preceding pseudocode segments for the OnTimer event and the OnNewMessage event.

A situation commonly encountered is where all CDs 10 are powered-down, usually in the evening, and CD IP Addresses are provided dynamically by a Dynamic Host Configuration Protocol (DHCP) server (i.e., by a centralized method of managing IP Addresses that is well known in the art of network management). When the system is re-started, e.g., when users arrive in the morning and switch their computers on, the IP Address allocated to each CD 10 will differ from that stored in the CDT.

This situation differs from the initial start-up scenario in that each CD can obtain computer name information from the local CDT. Therefore, global Mailslot broadcasts are not necessary, and targeted Mailslots can be used instead. This is significant, as a global broadcast from every CD 10 as it started up in the morning could lead to a significant network load.

As with the other start-up scenarios described, there are two distinct stages in which the setup process is controlled:

(i) during the start-up phase of the CD; and (ii) in the OnTimer event procedure that fires X milliseconds after startup.

In a system re-start the assumption is made that there are no valid IP addresses for the first CD 10 started. Mailslot messages are therefore used to obtain connection information from each cluster 11 in turn.

The details of how this is done for individual CDs is described in the section that discusses CD Re-Start, described previously.

The permanent connection architecture based on the clusters 11 provides immediate notification of any changes in the status of any CD 10.

Figure 2B:
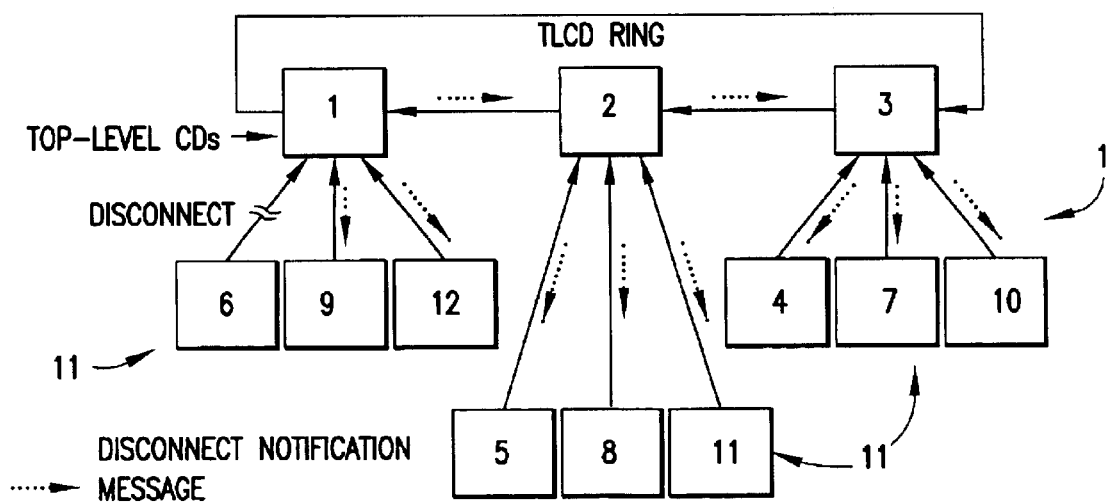
FIG. 2B illustrates a case where a client CD goes off-line.

With respect to the case where a client CD 10 within a cluster 11 disconnects, consider the case illustrated in FIG. 2B, where CD6, i.e. a Client CD, has gone off-line. Each Server Socket holds a list of currently connected Client Sockets. When CD6 disconnects the Client Disconnect event is triggered on the Server Socket on CD1. CD1 constructs a message with the following information:

Message Type (i.e. Disconnect Notification)

Disconnected CD Name

Source TLCD.

The topology shown in FIG. 2B can be viewed as a series of linked client-server clusters 11. When a disconnect event is detected by CD1 it notifies all of its remaining connected clients, in this case CD9, CD12 and CD2. Pseudocode describing the actions involved in updating all of the CDs 10 is given below:

```
Procedure OnClientDisconnect
    Create Disconnect Notification Message
    Start Send Loop
        Send Message to client CDs
        If all client CDs notified then End Loop
    End Procedure OnClientDisconnect
```

The actions taken by a client CD 10 when a client disconnect notification is received are described by the following pseudocode:

```
Procedure OnReceiveClientDisconnectMessage
    Retrieve disconnected CD Name and Source TLCD from message
    Update disconnected CD status in local CDT
    Check local status
    If this CD NOT a TLCD then Exit
    If this CD is a TLCD Then do the following
        Start Send Loop
            Check connected client Name
            If client = Source TLCD Then move to next client
            Send Disconnect message to client
        If all client CDs notified then End Loop
    End TLCD Conditional
End Procedure OnReceiveClientDisconnectMessage
```

The above pseudocode shows that the ClientDisconnect message cascades down the chain (i.e. moves around the TLCD ring) until it reaches the TLCD that acts as a server to the TLCD that originated the message. At this point the message is passed to all clients on the last TLCD (except the source TLCD) and then terminates. Upon receipt of the message, each CD 10 updates the relevant entry in its CDT.

Figure 2C:
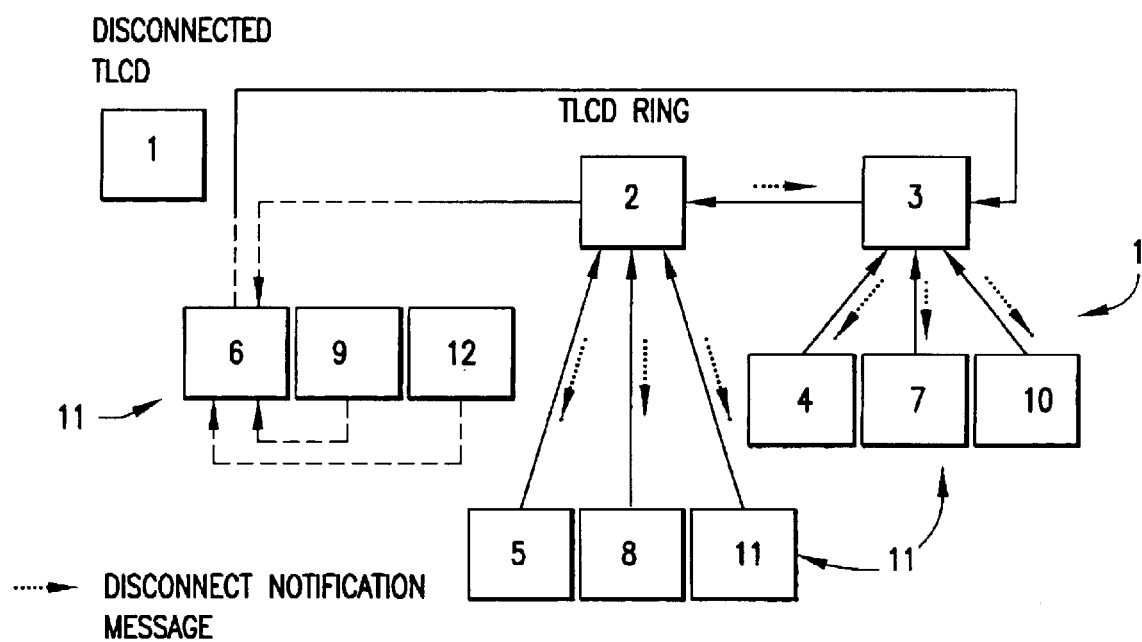
FIG. 2C illustrates a case where a TLCD goes off-line.

With respect to the case where a TLCD disconnects, consider the case illustrated in FIG. 2C, where CD1, i.e. a TLCD, has gone off-line. By definition, when a TLCD goes off-line it triggers a Server disconnect event and a Client disconnect event. The Client disconnect event in the example shown in FIG. 2C is detected by CD3, and the Server disconnect events occur on CD2 (a TLCD), CD6, CD9 and CD12. The Client disconnect causes CD3 to send a disconnect notification message to all other connected clients. This operates as described above.

CD2 receives notification of the CD1 disconnect through the Server disconnect event. This triggers a send of the disconnect notification message to all of its client CDs (in the above case, 5, 8, 11 and 3). When the message reaches CD3 it again notifies all of its client CDs. This duplication is acceptable and eliminates a requirement for further complexity in the message structure.

The server disconnect event has additional actions that lead to the re-building of the cluster 11 as shown above. This is described in the following pseudocode:

To avoid this possibility the preferred embodiment serializes the update sequence for administrative updates, that is, the updates progress in a definite order (e.g., for a change initiated by CD I the order could be (N−I), (N−(I−1)), (N−(I−2)), ... , (N−1),N,N+1, ... , N+(I−1)). Any CDs 10 in the loop who cannot be reached (e.g., they are off-line) are skipped automatically, and receive the updated files from their predecessors in the loop when they next come on line. To prevent this serial updating from becoming very time consuming in a large network, the CDs 10 are formed into the clusters 11 in the manner described above, such that the transfer proceeds from TLCD to TLCD around the TLCD loop, and each TLCD then has responsibility for updating the member CDs 10 of the TLCDs cluster 11, independently of the other CDs 10 in the network. The TLCD role passes from the current TLCD in each cluster 11 to another cluster member if the current TLCD goes offline. The order in which the passing of control occurs is established by the system 1 according to hierarchical rank within the cluster 11. As with the simple clusterless scheme, CDs 10 in the loop are skipped if unavailable at the time of an update. With regard to service provisioning, the value of clustering is much less since the possibility of instability arising from asynchronous updating from many CDs 10 vanishes (there being by definition only one point of origin for each service).

```
Procedure OnServerDisconnect
    Create Disconnect Notification Message
    If this CD is a TLCD Then do the following                              // e.g. CD2 in Fig. 2C
        Start Send to clients Loop
            Send Disconnect message to client
        If all client CDs notified then End Loop
        Read Name of newly disconnected TLCD from list
        Find disconnected TLCD in CDT
        Read ClusterID
        Filter CDT to obtain list of CDs in the cluster
        Read IP Address of highest ranking on-line CD and connect
    Else If this CD is NOT a TLCD Then do the following                    // e.g. CD6 in Fig. 2C
        Filter CDT to obtain list of CDs in the cluster
        Read IP Address of highest ranking on-line CD
        If highest-ranking CD = this CD then do the following
            Retrieve the ParentID for the disconnected TLCD from the CDT   // i.e. CD3
            Connect to the parent TLCD                                     // i.e. CD6 connects to CD3
        Else do the following
            Connect to highest-ranking CD in cluster
        End of highest-ranking conditional
    End TLCD Conditional
    Start Send Loop
        Send Message to client CDs
    If all client CDs notified then End Loop
End Procedure OnServerDisconnect
```

The above-described CD 10 clustering technique beneficially and significantly reduces the amount of network traffic associated with starting up the system 1, and carrying out administrative data and software updates. The administrative clusters 11 per se are not required for providing service subscription content, which may be accomplished by CD 10 connections without consideration of clustering. An important aspect of the administrative clustering teachings is this: In a network of N connected devices a simple change to an administrative file by one connected device would require (N−1) connected devices to be updated . It is thus not difficult to imagine that in a large network with many administrative changes occurring within a short span of time, a very large number of versions of the administrative files could be obtained; and the system 1 would then be required to somehow determine what version was the most current. This may be possible, but it is also possible that under some conditions the system 1 could become unstable.

These teachings further enable a CD 10 to locate services with certain attributes by means of a drill down procedure through information about the service provided by the publisher (such as service type (Retrieve, or Analyze, or Report), related data sources, output type, etc.) All such information is preferably stored on the publisher CD 10 and, optionally, may also be stored on the subscriber CDs 10. Another technique to locate services with certain attributes is to issue a query via a search engine contained within each CD's software, where the system 1 operates to pass the query to all TLCDs, and all TLCDs are effective to pass the query to all cluster members CDs 10, and all cluster member CDs 10 return their outputs (if any) directly to the querier in an unmediated fashion (i.e., independent of the TLCDs). It should be appreciated that a given CD 10 may searching for any information (i.e., not just service names) in this distributed query manner.

With regard to the synchronisation of the CDTs, the CDT stores the details of both the steady-state properties of each CD 10, as well as dynamic properties such as IP Address and ClusterID. The CDT is synchronized among all CDs 10 and any changes are automatically propagated together with the Connect and Disconnect messages.

As connect and disconnect events occur, the system 1 provides a means for such synchronization of the CDTs amongst the CDs 10. This does not require the CDT itself to be moved: only the relevant records need to be updated.

The synchronisation of the CDTs uses the messaging functionality of the Client and Server Socket components, rather than Mailslots. In the case of the Asta components, the SendCodedParamlist is the appropriate function to use.

Paramlist refers to an Asta Parameter List. ParamLists can hold a wide range of data. The SendCodedParamlist function has an associated message ID. In the subject system 1 this ID is used to denote connect/disconnect events. The updated parameters are held in the paramlist itself.

Each CD 10 has an associated Rank value that indicates its position in the CD 10 hierarchy. When first installed each CD 10 is assigned a Rank associated with its installation seniority. As system statistics are refined then more sophisticated methods of ranking the CDs come into play, as described below in regard to the Migration of Services.

On a LAN where there is no central server available, the configuration of the system 1 during start-up is solely based on the use of Mailslots. On other network types, e.g., Unix-based networks, a broadcast mechanism that provides equivalent functionality is known as the User Datagram Protocol (UDP). On a LAN where there is a central server available, then the system 1 can obtain certain information to control the flow of the connection actions.

When a CD 10 re-connects to a cluster 11, the startup procedure can loop through the computers in the cluster 11 and obtain their last Logon date and time from the server. For all CDs 10 where the last Logon time is prior to the last Logoff time of the currently re-connecting CD 10, the CD determines the IP Address of the CD with the highest Rank, and then connects directly to this CD.

This approach is feasible since the IP Address of the CD 10 will be unchanged since the currently re-connecting CD was last connected. It has the advantage of eliminating the need for looping through all CDs 10 in the cluster 11 and attempting to connect (as described in the section concerning CD Re-start), but requires the interrogation of the central server. As such, this is not the preferred implementation.

With respect to startup on a Wide Area Network (WAN), Mailslots are appropriate for use on a broadcast domain, but they are not routeable and will not pass between domains that are separated by routers. This is a common configuration for a WAN, where the goal is partly to reduce network load caused by excessive broadcast activity. To connect two CDs 10 across a router, without prior knowledge of the IP Address, the system 1 preferably uses a technology known as Named Pipes. Named Pipes are well known in the field of network technology and are commonly used for InterProcess Communication (IPC). To use a Named Pipe the system 1 creates at least one Named Pipe server. This is created by the CD 10 itself. In a Windows network environment only CDs 10 running on Windows NT or 2000 can create Named Pipe servers, while CDs 10 running on Windows 9x can act as Named Pipe clients, but cannot act as servers.

To provide auto-configuration on a WAN, the system 1 need only have one or more NT/2000-based CDs 10 on each broadcast domain.

While described above generally in the context of Windows and Unix-based operating systems, it should be appreciated that these teachings can be employed as well with other types of operating systems, such as, but not limited to, Novell and Linux-based systems and servers.

The use of various local and global tables stored on each connected device 10 facilitates the distributed administration of the system 1. The table files may be copied to another location to provide a means of backing up the connected device 10 so that a user may upgrade and/or retrieve his original settings.

A first type of Local Table is a Local Subscribers Table (LST), the contents of which, for each subscriber to a service, are as follows:
  Service Identifier
  Subscriber Identifier A second type of Local Table is Local Publication Table (LPT), the contents of which, for each service published, are as follows:
  Service Identifier
  Original Publisher
  Current Publisher of Service
  Backup Flag (TRUE means that the local CD 10 is acting as a backup device for this service, and is not the service originator)
  Active Flag (TRUE means the service is active on this CD 10)
  Type of Service (selected from Type List)
  Number of Subscribers
  If Compound, then List of Input Services
  List of Associated Files
  Locked to original publisher (TRUE or FALSE)
  Backup device specified (TRUE or FALSE)
  Number of Backups
  List of Backups
  Identity of Preferred Backup Device (if backup device specified flag=TRUE, or NONE)
  CreationDate Time
  AlwaysOnline (TRUE or FALSE)
  SebdAsXML (TRUE or FALSE)
  OnLine (TRUE or FALSE)
  AllowDownload (TRUE or FALSE)

The publisher may remove any subscriber by editing the LPT by means of a "Cancel Subscriber" Dialog. The system 1 automatically notifies the subscriber of the publisher's desire to terminate, and prompts the subscriber CD 10 to accept the cancellation. The reply is returned by the system 1 to the publisher and the appropriate change is made to the LPT and to the subscriber's LST, i.e., if YES, then remove the subscriber from the LPT and decrement the count. Any change in the LPT automatically causes the system 1 to send to the backup CD 10 a message containing an instruction to update the corresponding table entry.

A third type of Local Table is a Local Administration Table (LAT), the contents of which are as follows:
  User Name[1]
  User Password[1]
  Device Type
  Device Classification (Publisher, Subscriber, Publisher+Subscriber)
  Company Affiliation[1]
  Group Association[1]
  Site Location[1]
  GUID
  Disk Space Allocated for buffering service output[1]
  Disk Space Limit for storing service output[1]

[1] These parameters may be changed by the local user. Any parameters with corresponding entries in the CDT are automatically copied to the CDT and the CDT is then propagated to all users (e.g., User Name).

A fourth type of Local Table is a Domains Table (DT), the contents of which are as follows:
DomainID
DomainName A fifth type of Local Table is the Clusters Table (CT) 12 (see FIG. 2A), the contents of which are as follows:
ClusterID
ServerID
PersistentCDID
CurrentClusterSize In addition to the Local Tables described above, there are two Global Tables. The Distributed Administrator (DA) may change any of the local parameters of the CD 10 he is logged into, as well as the Connected Devices Table (CDT) entries and any of the Global Administrator Table (GAT) parameters listed below. The updated CDT and GAT tables propagate to all other CDs 10 automatically, so that all CDs 10 store identical copies of the most recently updated versions.

Log-on as the DA may be carried out at any connected device 10 of type WORKSTATION, and is carried out by a conventional logon dialog requesting the local user ID and password, followed by the DA ID and password. The DA may then change the DA ID and password—both of which are stored as hidden entries in the GAT. The system 1 features a mechanism whereby the DA ID and password may be reset to predefined default values. Any change to the GAT causes the updated version to be propagated to all CDs 10 automatically.

The global parameter entries of the Global Administration Table (GAT) as follows:
DA ID (hidden)
DA Password (hidden)
Number of backups required per publisher
Max number of services to be backed up per Connected Device
Min Short term score to host backup services
Use Persistent CD (TRUE or FALSE)

The global parameter entries of the Connected Devices Table (CDT) are as follows:
ComputerName
UserName
IP Address
DomainID
OnLine (TRUE or FALSE)
Active (TRUE or FALSE)
Persistent CD (TRUE or FALSE)
TopLevelCD (TRUE or FALSE)
Rank
ClusterID
UseAsBackup (TRUE or FALSE)
InstallDateTime
Device Type
Long Score
Long Rank
External (TRUE or FALSE)
Number of Services Currently backed up
Number of Backed up Services currently active It should be noted that if a CD 10 is marked as Active=False, then this indicates that it is no longer a valid CD. A function exists for an administrator to delete inactive CDs from the CDT. It should be further noted that if External=True, then this indicates that the CD 10 resides on an external network and is accessed through a gateway.

Procedures exist for modifying the Connected Devices Table (CDT). Those entries not automatically obtained by the system 1 and entered in the CDT by the system 1 may be edited by the DA (e.g., the Device Owner, Active, Persistent CD). The method of removing connected devices 10 from the system 1 is to set OnLine=FALSE. Any change to the CDT on any connected device 10 causes the CDT to be propagated to all CD's. The action of setting OnLine=FALSE triggers the transfer of all files and database tables to the specified backup device, which in some circumstances may be the persistent CD 10. This action can be triggered by the system 1, e.g., during closedown of the CD 10 or the workstation, or manually by the DA.

Notification of events, such as file updates, and the delivery of services to subscribers can be efficiently achieved through the connection topology shown in FIG. 2A. In this approach the delivery is carried out using the SendCodedParamList function call provided by Asta. This function requires two parameters (i) a message ID number and (ii) an Asta Parameter List. The meaning of the message is coded in the message ID and the actual service output is contained in the parameter list. For example, if a file is checked out from a project for modification, this event can be notified to all interested subscribers. When the message is received by a subscriber CD 10 the message ID identifies it as a file check-out event, and details such as the file name, project identifier, user identifier etc are obtained from the parameter list.

The parameter list also contains a list of all registered subscribers to the service. Referring to FIG. 2A, the technique for updating all of the subscribers is described by considering an example where a service output event is triggered on CD10. The following pseudocode describes the sequence of events:

CD10 sends service output message to TLCD1
TLCD1 compares the list of subscribers in the message with connected clients
TLCD1 removes its clients from the list of subscribers
TLCD1 sends the message to its client TLCD (i.e. TLCD2 in FIG. 2A)
TLCD1 sends the message to clients that are also subscribers
This process repeats until all subscribers are removed from the list, at which point the message is no longer sent.

The connection topology shown in FIG. 2A forms the framework for ensuring that all CDs 10 are notified of changes in the status of other CDs 10. However, connections between CDs 10 are not restricted to this topology. Users can initiate direct connections to any other CD 10. Such direct connections allow a subscriber CD 10 to, for example, obtain service output directly from a publisher CD 10. Similarly the system 1 will establish direct connections between a service publisher CD 10 and any backup CDs 10.

The system 1 includes a function that tests for an existing connection between two CDs 10. The system 1 also includes a capability to create two simultaneous connections between two CDs 10, for example with two ClientSockets on one CD 10 connected to a single ServerSocket on another CD.

The connection topology shown in FIG. 2A also forms an efficient topology for managing distributed searches. For example, if a search request originates on CD#11 in FIG. 2A then it is first passed to it's TLCD. The TLCD then distributes the search to all of its client CDs 10, one of which is the next TLCD in the loop. This process continues until all CDs 10 have received the search request.

When the result sets are complete, then there are two options for returning them to the search requester: (i) where the results are passed back up the chain through the TLCD loop or (ii) where each CD 10 with a relevant result set establishes a temporary connection with the requesting CD 10 and sends the results in the form of a message.

The system 1 includes a capability for restricting a search to, for example, particular CDs, projects etc.

An important feature of the system 1 is that service provision automatically transfers from one connected device 10 to another suitable connected device 10 (i.e., backup device) under several circumstances. Two such circumstances are: (1) the initial publisher of the system may fail or be powered down, or (2) the initial publisher's CD 10 may become too busy, for example, by publishing or subscribing to too many services. The presently preferred method for identification of suitable backup systems uses a Score computed by each CD 10 in the manner described below.

With regard to an automatic short and long term scoring and ranking of CD 10 capacity, each connected device 10 is operative to create a hierarchy of connected devices 10 based on a score computed from the following metrics:
(i) Availability (A)
(ii) Available Processing Power (P)
(iii) Installation Seniority (S)

Availability, A, is a figure of merit that depends on at least (1) the amount of time the CD 10 is connected to the network when the system 1 is running, (2) the number of active services on the CD 10 and (3) the number of subscribers to all active services. Other such variables may be included in this metric. The metric may be constructed such that A will be small when (1) is small, (2) is large, (3) is large. These parameters may be determined automatically by the system 1 based on the contents stored in the five tables described previously.

Available Processing Power, P, is a metric which may be computed based on the values of parameters representative of the utilization of the CD 10 including, for example, (1) the number of network transactions per second averaged over time T, (2) the % of processor usage, (3) processor speed (4) available Random Access Memory (RAM) and (5) the % memory usage. A suitable application for automatically tracking items (1) and (2) (and others) is the Microsoft System Monitor. The system 1 is active to combine these and other relevant measures using a suitable formula automatically.

Installation Seniority, S, is derived by ranking the date on which the system 1 was first installed on the CD 10 such that, of all currently connected CD's, the CD 10 with the oldest installation date has the greatest seniority.

The overall Score assigned to each CD 10 is preferably computed by averaging each metric over at least one Long Time scale, and one Short Time scale, such that the two averages give respectively a measure of the score over a period of several days (i.e., reflective of the usage of the system 1 under varied conditions), and close to (i.e., within several minutes) the actual time. By denoting the scores by S(long) and S(short), the formulation of S(long) and S(short) may use A, P and S (or related variants) in different ways so as to optimize the performance of the network in terms of its ability to provide services continuously and in large numbers.

As a simple example, one implementation uses a scoring method to determine the hierarchy based on the following method. Further, let all three variables lie in the range [0 to 100] with the following definitions.

A=0 for the CD 10 with lowest relative A, and 100 for the CD 10 with the highest relative A, with all others linearly scaled relative to these.

P=0 for the CD 10 with the lowest processing power, and 100 for the CD 10 with the highest processing power, with all other scaled linearly relative to these. Preferably, the processing power of each CD 10 is calculated using a consistent and common method.

S=0 for the CD 10 installed most recently on the network, and 100 for the CD 10 that is longest installed, with all others scaled linearly relative to these.

In one example of a scoring formula for determining the hierarchy, the formula Score=A+P+S may be used. Application of such a formula, using the long or short-term averages of the parameters A, P, S, gives two separate scores. In the presently preferred embodiment, the Long-term Score is added to the local CDT and thereupon automatically propagated to all other CD's (e.g., weekly). The Short-term Score is computed immediately after a service becomes active on a CD 10 (either because it was just created, or because the prior host has become unavailable causing the subject CD 10 to become the active backup service provider). The Short-term Score need not be stored, but rather is used as a measure of the present suitability of the subject CD 10 as a provider of the service. The possible consequences of this are considered further below.

With regard to the CD 10 hierarchy, the Long-term Score is used by the system 1 to compute the Hierarchical Rank of each connected device 10, with the CD 10 with the highest score being assigned a rank of 1, and that having the lowest score being assigned a rank of N, where N is the number of CDs 10 in the CD Table 12.

Now with regard to the automatic selection of backup CDs 10 based on scoring, in order to ensure that service provision will continue when the primary provider of a service becomes unavailable, the system 1 automatically designates one or more CDs 10 as backup service providers. This designation is made immediately after a service is created.

Unless a publisher specifies that a specific CD 10 is to be used to provide backup for a service, the backup CD 10 is (or CD's 10 are, depending on the GAT parameter "Number of backups required per publisher") determined automatically by the system 1 based on the Score information in the local CDT. There are various possible modes of automatic operation.

For example, in a "One to One" mode every publisher's system automatically selects a backup CD 10 for each of the services that are published based on the Rank information available in publisher's local CD Table. The publisher assigns one service to one backup CD 10, beginning with the CD with Rank=1, and then continues the assignment with one service per CD of successively lower rank. This method has the benefit of avoiding a situation in which all services are backed up by a single CD 10, but may tend to concentrate the backup services among a small number of CD's 10, since all services providers begin their selection with the Rank=1 system.

In a presently preferred "Even Assignment" mode, each publisher refers to the GAT parameter "Max number of services to be backed up per Connected Device", and the CDT parameter "Number of services currently backed up". The publisher then assigns backup CDs 10 to each of the publisher's services, observing the requirement that for the selection to be valid, the latter must be less than the former. If the "Number of backups required per publisher" parameter is greater than one, then the publishers' systems cycle through this assignment process, taking into account the updated values which are obtained from the publisher's previous assignments.

A backup CD 10 is automatically provided with necessary information, such as files and tables, and/or timely updates to the files and tables, that are required to operate the service that it is backing up.

It is also within the scope of these teachings for there to be one or more "persistent CDs" connected to the network (identified by Persistent CD=TRUE in the local CDT). Either of the modes previously cited may therefore be modified to require the inclusion of a Persistent CD among the backup CDs for each service. If this modification is put into effect, then the GAT parameter "Use Persistent CDs"= TRUE. This forces the condition that the final backup CD 10 specified for each service (i.e., if the number specified is greater than 1), must also have Persistent CD=TRUE. It is a property of Persistent CDs that they are agreed to be ON and connected at all times. The effect of this modification is to ensure that backup is always available. It is a further attribute of Persistent CDs that, irrespective of the backup assignment mode (One to One or Even Assignment), publishers may assign any number of services to each persistent CD 10, but provided that they make each assignment by choosing the persistent CD having the currently smallest number of backup services assigned to it. This ensures that the distribution of services among persistent CDs is approximately uniform.

These teachings also encompass methods of limiting the load on back up publishers by considering load balancing. The method of assignment of backup CDs 10 for services was described above. What is now described are methods used within the system 1 to ensure that backup CD's 10 do not become inequitably or excessively loaded in terms of the computation and messaging tasks they must carry out as backup publishers.

Use is made of the Short-term Score described previously. For a specified interval (previously described as the short term interval) beginning when any new or transferred service becomes active on a connected device 10, the local system computes the Short-term score. If this score falls below the threshold value specified by the GAT parameter "Min Short term score to host backup service" then beginning with the last received service, the backup CD 10 transfers backup services to the next backup device listed in the service's LPT entry (in the backup CD's local version of this table). The Short-term Score is then re-computed over a suitable interval, and the backup CD 10 continues transferring services it is actively backing up to other designated backup CDs, until it achieves a satisfactory Short-term score, whereupon it stops offloading services.

The above does not apply to creators of services. A publisher may overload his own system to any extent he may find acceptable, and the publisher's system does not off load the publisher's services. That is, a service will not be unloaded if the Current Publisher of Service and Original Publisher parameters (LPT) are equal. However, by making the new service active, the publisher automatically triggers a Short term score to be calculated, which may have the effect of causing the service for which he is an active backup publisher to be offloaded in the manner described above.

The teachings also provide a mechanism to return services to the original service provider. The publisher of a service may specify that when his CD 10 is reconnected after a period of inactivity, some or all of his services return to his system from their current backup CD 10 locations. The publisher may make this designation for any service by specifying the LPT parameter "Locked to Original Publisher=TRUE". For each service specified as Locked to the publisher, when the publishers CD 10 is reconnected to the network, the publisher's CD 10 automatically sends a message to the list of backup CDs specified in the List of Backups in the publisher's LPT requesting the transfer of the service back to the publisher's CD 10. The receivers of this message then make a comparison of the Original Publisher to the identity of the sender of the message, and if they are equal, then each checks his LPT to determine if he is currently the active backup CD 10 for the service and, if so, the backup CD 10 then transfers all associated records and files to the requestor, and relinquishes control of the service. When the transfer is complete the Publisher and the service-returning CD 10 each automatically update their LAT, LPT and LST tables.

Certain actions are undertaken for Service Transfer on shutdown of a publisher. With regard to synchronisation, the current service provider automatically transfers to the backup provider(s) all files and database table contents which may be required by the backup service provider to continue providing the service as though the backup CD 10 were the original provider. All such records are removed from the backup provider's system automatically if in the future the second system becomes no longer designated as a backup. While the backup CD 10 retains its backup designation, the system of the present service provider CD 10 is active to immediately update any and all records on the backup system when and if they may be modified.

Associated with all services are the following:
(i) files (including spreadsheet service workbooks and script files); and
(ii) service database tables.

All attributes of a service, including what it delivers, which subscribers it delivers to, etc., are contained in one or both of the above. Backup of services is therefore implemented as a synchronisation of (i) files and (ii) database table contents between CDs 10. The synchronisation of the contents of database tables is also known as replication. One suitable, but not limiting, component for use in this application is the Asta PosBusJ database replication component. A suitable, but not limiting, function for synchronizing files between CDs 10 is the Asta SendGetCodedParamList function that allows a file to be transferred within an AstaParamList (the features of AstaParamLists are described elsewhere).

With regard to mutual availability, the current service provider and its backup CD(s) 10 maintain a constant Monitor Connection to each other to ensure that each is still available. Although one can detect when the primary service provider CD 10 is closed down (when carried out through the standard shutdown procedure), and so notify the backup CD 10, the constant connection is used in order to protect against the possibility of a catastrophic shutdown of either CD 10, caused by machine failure or power failure (including a machine being switched off). The presently preferred implementation of the Monitor Connections is to provide an AstaClientSocket on the backup CD 10 to maintain a connection with an AstaServerSocket on the primary CD 10. If the primary CD 10 terminates a server disconnect event is generated on the AstaClientSocket of the backup CD 10. If instead the backup CD 10 terminates, then this generates a client disconnect event on the AstaServerSocket of the primary CD 10. This method has the advantage of eliminating the need for constant polling of one CD 10 by the other, thereby reducing network loading, and ensures that a termination event is notified immediately.

As the CD 10 hosting the current service provider closes down, the CD 10 detects this using the "system event monitor" that is present on each CD 10. One way of implementing this system event monitor uses the TsystemEvents Delphi component, which detects a WM_QUERYENDSESSION message generated by Windows. When the "closedown" event is detected the current service provider CD 10 signals this to the backup CD 10. In order to provide as much redundancy as possible, more than one signal is sent, each by a different method. First, an Asta message is sent (e.g. using SendCodedMessage) and then a Mailslot is used, both notifying the backup CD 10 to assume responsibilities for running services, file sharing etc.

It should be apparent at this point that the system 1 provides a number of valuable and novel features that enhance the efficiency and effectiveness of an organization within which the system 1 is installed and operated. As an example of the benefits bestowed by the practice of these teachings, a description will now be made of various data entry services.

Within the system 1 an example of a Report Service is one that exploits the ability of the system 1 to define output ranges of cells on a spreadsheet (the Report Service outputs), as well as trigger ranges of cells which initiate the delivery of those service outputs. One preferred implementation of the Report Service involves overlap of the output and trigger ranges, as shown in the exemplary spreadsheet grid of FIG. 3. In general, cell ranges and trigger events are preferably specified in a file that the system 1 is able to parse.

A COM-compliant spreadsheet service is one that provides a RAR application entirely within a spreadsheet application by using COM events, and may be considered as a form of a COM Application Service, as the use of COM events underlies the operation of such services. Exemplary, but not limiting, COM compliant applications include Microsoft Excel™, PowerPoint™, Word™ and Outlook™.

Figures 3, 4:
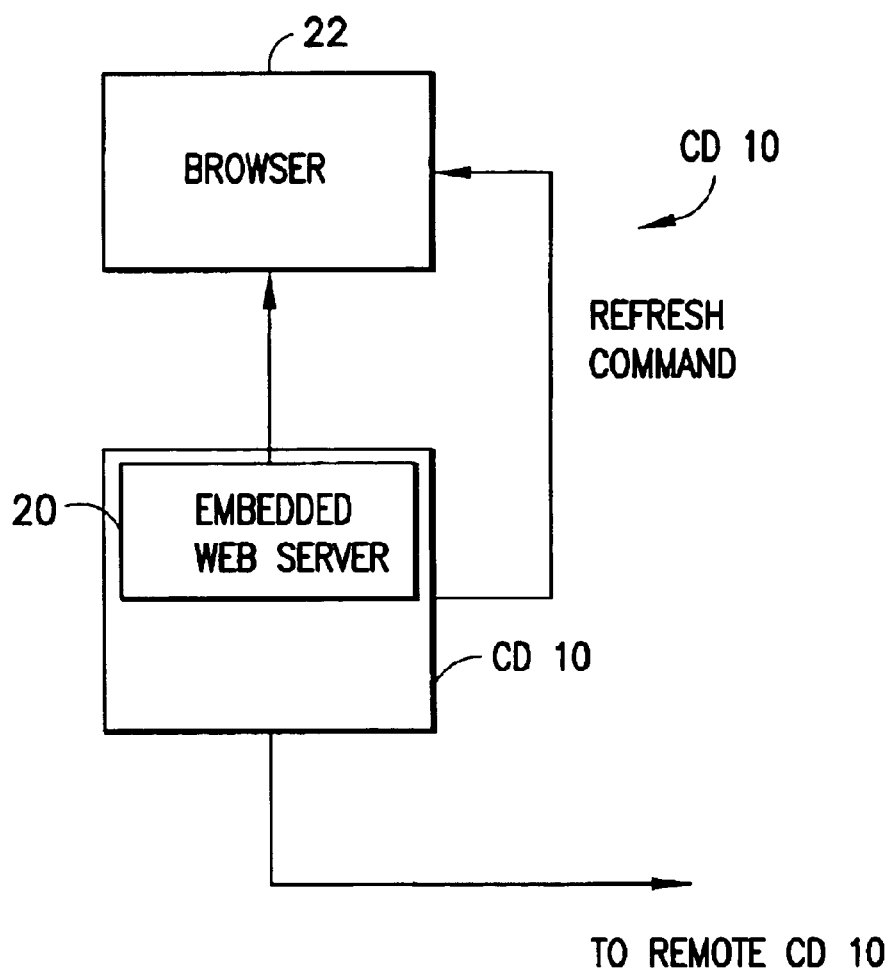
FIG. 3 is an example of a data entry service showing an overlap of output and trigger ranges.
FIG. 4 shows a connected device having an embedded web server and an associated browser.

In the exemplary Report Service illustrated by FIG. 3, a user enters a value in a spreadsheet (which is designated as the output of the Report Service), which then triggers the report to be sent to whoever subscribes to it. The trigger event may be a change in a report file itself (in this case one or more cells in a spreadsheet), rather than simply a change that occurs in a database. The output may be the entire workbook, the individual spreadsheet, or a range of cells, or graphics, depending on the named range selection.

In this example, the output range is defined to be the range of cells A1:D4. That is, the delivery of the service involves sending the contents of these cells to all subscribed users. The trigger range is defined to be the highlighted cell D4, and the trigger event is specified as being any change that occurs in the D4 cell. Therefore, when the user enters a new number into cell D4 this event is detected by the CD 10 (using COM events) and the delivery of the service output (in this case all the values in cells A1:D4) is initiated by the service provider CD 10.

Delivery of the service output may also be manually initiated by clicking a button that has been placed on the worksheet. In this case the spreadsheet is designed such that clicking the button changes the value of a number in the specified cell. This cell is also defined to be the service trigger cell and thus the service output is delivered whenever the button is clicked.

There may be situations where the data entry involves multiple sets of data from, for example, different features of an item being measured. There may also be a requirement to deliver all values simultaneously. In this case the different data entry ranges may be on different worksheets within a spreadsheet workbook, or in different regions of a single worksheet.

In this case the trigger range is the last cell in the last data entry range. The user may design the spreadsheet such that the first cell in each data entry range is selected after the last cell in the previous range has been updated. The spreadsheet workbook could also be configured to activate a different worksheet for continuation of data entry. The ability to transmit multiple data ranges simultaneously is a standard feature of the system 1 Excel™ services.

As well as delivering data, system 1 services may also deliver "data about the data", otherwise known as metadata. This metadata is stored in a separate part of the delivered service output and can be used to define how the service data should be displayed.

Referring to FIG. 4, one feature of a CD 10 is the ability to provide an embedded web server 20. The web server 20 allows the CD 10 to deliver web pages to remote web browsers, i.e., to cause the CD 10 to function as a web server, thereby providing multiple web sites. A feature of the web server is that it is embedded onto the main subject application and therefore has direct access to all data handled by it. The web server can deliver web pages to any other CD 10 on the network.

The web server also provides an alternative means of communication between CDs 10, where messages are packaged as HTTP requests. The use of the HTTP protocol for communicating on a network is known in the art.

One important use of the embedded web server 20 is to deliver web pages to a local web browser 22. Here, the communication between CDs 10 is via the normal system 1, but the outputs are displayed in a web page in the browser 22. The browser 22 and the embedded web server 20 shown in FIG. 4 may reside on a single PC or workstation, i.e., may reside in a single CD 10.

This configuration assumes that the applicable software is installed on the CD 10, and is not the same as a general browser interface that can be used from any PC. This configuration provides a number of advantages, including the following.

First, browser interfaces are often preferred by users due to their familiarity. Second, the CD 10 can force the browser 22 to refresh when new data is received (e.g. using COM), hence providing a form of "push" architecture for the browser 22. This is in contrast to the more usual "pull" scenario where the user manually requests a refresh of the page. Because the web server 20 is on the same physical machine as the browser 22, security restrictions are removed that make the use of ActiveX components and some Java applets problematic with remote servers. By exploiting the metadata of CD 10 services, and the ability of the embedded web server 20 to deliver database information, the browser 22 can be employed as a general viewing interface for CD 10 service outputs.

The architecture and operation of the system 1 also provides a powerful platform for performing distributed word and phrase searching. That is, the architecture of system 1 provides a powerful approach to distributed knowledge management by allowing users to efficiently search files, including emails, on other CDs 10 for specified words and/or phrases. The basis of this is the fact that details of user's project files are stored in the local CD 10 database tables. This means that the CD 10 need only open and search files for keywords/phrases: (i) when the file is registered in the database and (ii) when the file is updated. Words and phrases are indexed and the index information is then stored in other database tables. Subsequent searches for keywords then only involve a search of the index database, rather than re-opening and closing each file on the CD 10. A presently preferred, but not limiting, software component for implementing this feature is the Rubicon search engine.

In general, the CD 10 acts as database middleware, providing a route for users to access the indexing information held on other CDs 10, and the index files may be stored in a cache on the CDs 10, thereby providing very fast search capabilities. The searches can be dispatched as a set of asynchronous search requests.

A further utility realized by the practice of these teachings is an ability to obtain data from multiple databases and combine this data into a data warehouse, as shown in FIGS. 5A–5D.

Figure 5A:
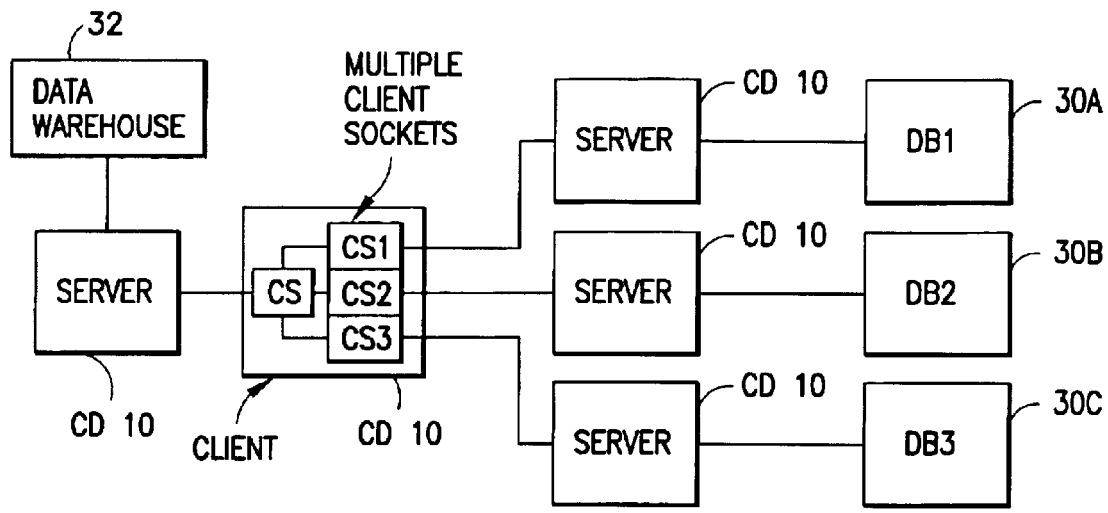
FIGS. 5A–5D show various data warehouse service embodiments.

For example, FIG. 5A shows a "straight-through" configuration that provides a means of channeling data from each of a plurality of databases 30A, 30B, 30C database directly through to a corresponding table in the data warehouse 32. Note that while three CDs 10 are shown for connecting to databases 30A–30C, one CD 10 may be a publisher of data from each of the three databases. The CD 10 client creates separate client sockets, each in a separate thread. Each client socket therefore behaves as a separate application and each can connect to a separate CD 10 server. When data is received it is copied from the receiving client socket (e.g. CS 1) to the client socket that transmits to the data warehouse 32. As an example, a cached update mode provided by Asta can be employed to send the data to the warehouse 32. In order to take account of data arriving from a database 30 before the last batch has been completely updated, one may employ the Asta Scheduler to queue the updates as they arrive.

Figure 5B:
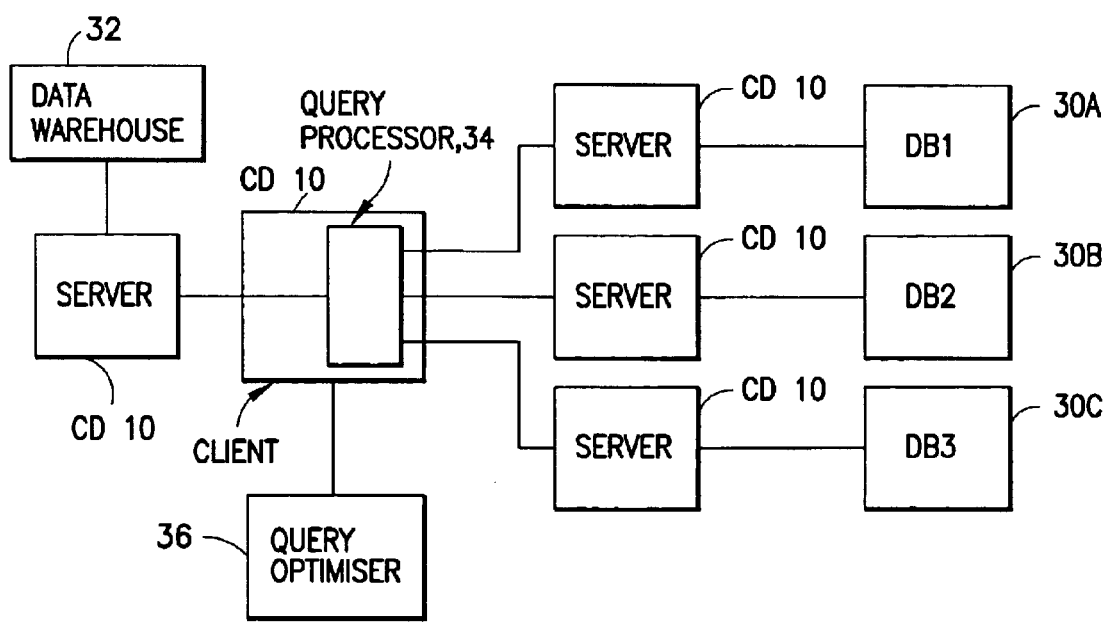

FIG. 5B shows an embodiment where a Query Processor 34 resides on a client CD 10. In this configuration the three client sockets feed into client datasets that are incorporated into the TxQuery query processor 34. A TxQuery allows the CD 10 to carry out any SQL processing appropriate to the data warehouse 32. As with the previous example, the incoming data is copied to a client socket attached to the data warehouse CD 10 server. An optional query optimizer 36 may be provided.

Figure 5C:
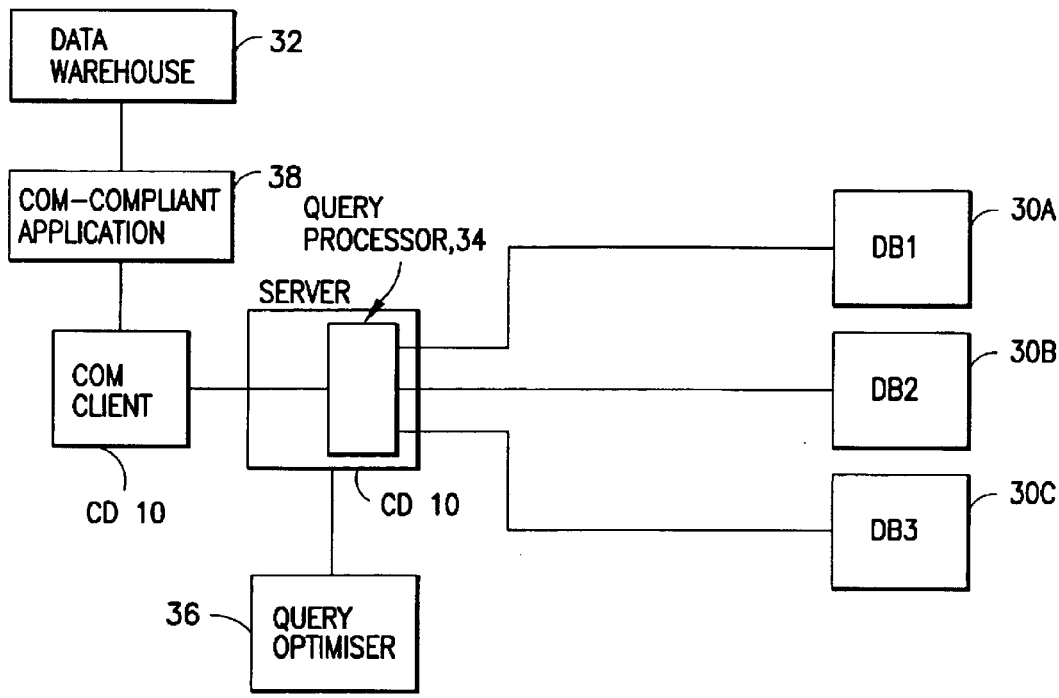

FIG. 5C shows a data warehouse embodiment wherein the query processor 34 is installed on a CD 10 functioning as the server for databases 30A–30C. This embodiment is thus similar to the embodiment of FIG. 5B, except that the TxQuery query processor 34 resides on the CD 10 server. This embodiment also differs from the previous embodiment in that a COM-compliant 3rd-party application 38 controls a COM-compliant CD 10 client.

Figure 5D:
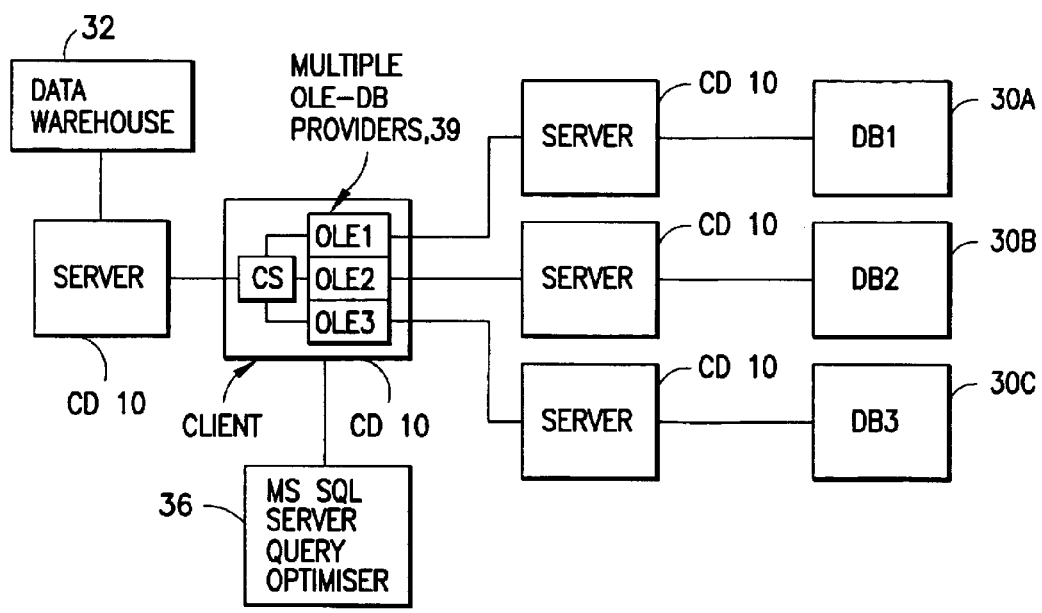

FIG. 5D illustrates an embodiment that uses an OLE-DB and MS SQL server. The Microsoft SQL server is recognized as having an excellent query processor, even for distributed queries across multiple databases. This embodiment thus uses the SQL Server solely as a query processor, and combines it with, by example, an Asta OLE-DB provider 39 to yield a powerful system for responding to heterogeneous queries.

The system 1 and methods of the present teachings thus can be seen to relate to data management. Data management encompasses the sharing, updating, creating, copying, transporting, formatting, storing, queuing, and other manipulating actions involving data. While specific types of data management have been and will be discussed in relation to certain aspects of the teachings herein, it should be appreciated that the system 1 can be used to control a number of types of data management.

As should be apparent, in the system 1 connected devices 10 can operate as both a client and a server. The term client as used herein refers to a computer or data processor connected to a network that is able to download and upload files, receive email and other messages and communicate with other computers on the network using a protocol such as TCP-IP or NetBUI. The term server as used herein refers to a primary repository for related data records, the processing location for computationally intensive services, and (if relevant) the point of origination of messages, warnings related to such services, etc.

The software for controlling the operation of the system 1 is installed on the computers, i.e., the CDs 10 of the system 1 by a number of methods, though preferably from a CD-ROM or via a download from an application server or web site. The system 1 software uses a middle tier server architecture such as, but not limited to, one provided by Asta Corporation.

Figure 6:
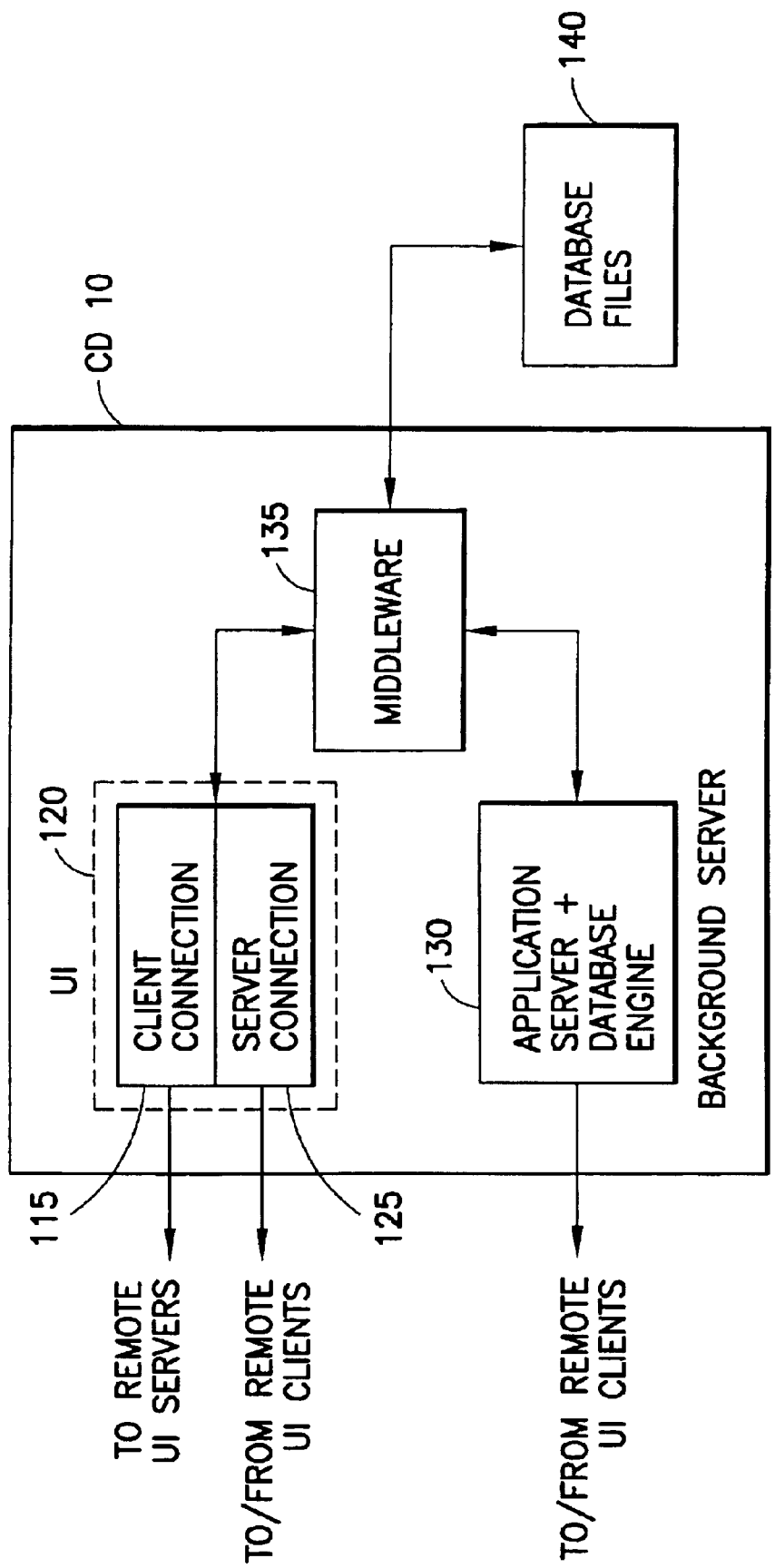
FIG. 6 is a block diagram of a connected device of the system of FIG. 1.

A presently preferred embodiment of a CD 10 configured in accordance with the teachings herein is shown in FIG. 6. The CD 10 comprises two separate but coupled applications, with the communication between them taking place through a local configuration database. A network comprising CDs 10 provides a computer network that is highly flexible, adaptable, and scalable. CD 10 can be configured as a service consumer and service provider, a service consumer only, and as a service provider only.

The CD 10 shown in FIG. 6 is configured to be operative as both a service consumer (client) and as a service provider (publisher). CD 10 includes a user interface (UI) 120 including a client connection 115 and a server connection 125. User interface 120 is interfaced with a background server 130. The background server 130 includes an application server and database engine. The software installed on CD 10 includes middleware 135 that enables communication between user interface 120, background server 130 and a database 140. The middleware aspect of the software installed on each CD 10 also enables the communication between CDs 10 interconnected to form the network 1.

The CD 10 can be configured as a service consumer only. Operating solely as a service consumer, CD 10 only needs to have the user interface 120. The background server 130 is not essential for operation solely as a service consumer. Since user interface 120 includes both the client connection 115 and server connection 125, these facilitate direct communication between CDs 10 only having user interfaces 120 using, for example, instant messaging.

The middleware capability means that a CD 10 can publish services even if the data is stored remotely, perhaps on an optional central server. In this case the CD 10 either retrieves the data from the remote database and passes it on, or informs the subscriber CD 10 where to find the data.

A CD 10 configured solely as a service provider or publisher may only have the background server 130, since the CD 10 need only provide service(s) to others. Thus, a benefit of the configuration depicted in FIG. 6 is that it can operate as both a service publisher and as a service client.

Each CD 10 has access to memory. The accessible memory may be a local permanent storage device (e.g., a static RAM hard disk) or a storage area on a mapped disk drive (e.g., a private storage area on a secure, remotely located storage device). In accord with the present teachings, a CD 10 may store and grant access to files it maintains in memory to other CDs 10 on the network. Access may be granted to other CDs 10 collectively as a whole or to a subset grouping of the CDs10. Files may further be shared based on the context of a project or service with which the files are associated. Each CD 10 preferably maintains a list of the other CDs 10 having read/read privileges to files under its control either on a file, folder or some other basis. Possible attributes that can be used to determine file access privileges include, but are not limited to, file author, a date created/edited range, file type, or a previously defined association with one or more other records. When a CD 10 operating as a client makes a request to view a particular file accessible via the network then the requesting CD 10 privileges for the requested file are verified before access is granted to view, download, or modify the file.

There are a plurality of types or categories of CDs 10, such as owners, cluster members, publishers, subscribers, non-subscribers, TLCDs and persistent CDs, and a given CD 10 may at any given time operate within one or more of the categories. While each CD 10 in the network may be the equal of others, each may perform different functions. For example, CDs 10 acting as data providers or publishers could be measuring machines providing measurement datasets to the client CDs 10.

A publisher may create services and control subscriptions to services. A publisher provides access to the data associated with its service. CDs 10 may perform multiple functions for different services. Thus, a CD 10 may operate as a server for one service, a subscriber for three others, and be a persistent CD 10 for another service. The service owner, or a system administrator may change the ownership designation for a service. The commonality of certain functions by the CDs 10 facilitates the transfer of ownership. Thus, and as was described above, a service provided by one CD 10 can be controlled to be provided by a different CD 10 by the system administrator, or automatically by the system 1, thereby changing the owner of the service.

Each service has an associated group of backup CDs 10 having one or more members. The members are the set of CD 10 machines designated as backup providers for the service with which they are associated. The group is preferably formed from a subset of the network CDs 10. The backup group is preferably created automatically by the system 1 using information about the CDs 10 on the network, such as, for example, processor speed, available memory, physical location, load capacity, CD 10 machine type (desktop, portable PC, PDA, etc.). Each backup preferably retains a copy of the service records and files required to deliver the service in the event that the current publisher goes off-line. There is preferably at least one backup CD 10 for each service.

Subscribers are CDs 10 having the requisite "client" software enabling them to at least receive a registered service. The types of service outputs include, for example, all datasets associated with a service or project, filtered data from a generated report, requested file downloads, pushed content such as images or warning messages, etc. Subscribers subscribe to a service for the purpose of receiving desired information, be it in the form of static file records, executable files, warning or notification messages or signals, etc. Subscribers can request to receive datasets in a prescribed format. Subscribers may also receive the service output in the form presented by a service. A subscriber may receive a service output and use it as is, or further process the received dataset into a different format.

A subscriber CD 10 may also have server software enabling the CD 10 to concomitantly provide services. In some cases, such as when the CD 10 is a handheld computing device such as a PDA, the subscriber CD 10 may have only a client capability, thereby enabling the CD 10 to subscribe to one or more services and receive service records.

A non-subscriber, relative to a particular service, is a CD 10 known to other CDs 10 in the network, but is not subscribed to the particular service. Although not subscribing to a particular service, non-subscriber CDs 10, like other CD 10 machines, preferably retain access to a list of the services available on the network. Being aware of the available network CDs 10 and provided services allows the non-subscriber to register with a service without first having to determine what services are available.

The persistent CD 10 is one that guarantees to provide backup for one or more service providers or publishers. The persistent CD 10 should have both server and client capability. A persistent CD 10 may be a computer (e.g., a desktop PC) functionally equivalent to other CDs 10 and used like other CDs 10, or the persistent CD 10 may be a dedicated computer configured to function only as a persistent backup device. The dedicated persistent CD 10 machine may include access to a high capacity memory, a powerful processor, and an uninterruptible power supply (UPS). In terms of the cluster 11 backup hierarchy, the persistent CD 10 is usually designated to be at the bottom of the hierarchy. That is, starting at the top of the backup hierarchy and progressing downward, the persistent CD 10 is the last CD turned to in order to provide backup coverage for a service.

The persistent CD 10 ensures continuous service provisioning when all other CDs 10 are unavailable to provide the service, e.g., the active service provider and other backup CDs 10 are powered off or busy performing tasks that otherwise prevent them from providing the service. This aspect of these teachings may be important when at least one CD 10 is operative to publish a service, for example, a data analysis service for a manufacturing line that operates at night when most CDs 10 on the network are powered off.

There may be more than one persistent CD 10 in the network. The system 1 (via an administrator) may specify that there be one persistent CD 10 per 20 machines on the network. This is an example, and the number can vary depending on the services offered, the capacity of the backup CDs 10, the number of subscribers to the services that have to be backed up, etc. A persistent CD 10 may be a fixed persistent CD 10, meaning that the particular persistent CD 10 is assured of always being available. Alternatively, the persistent CD 10 can be a floating persistent CD. A floating persistent CD 10 is the last available backup CD 10 in a cluster 11 and is, by default, designated as the persistent CD. Thus, the floating persistent CD 10 is prevented by the system 1 from being made unavailable once it is designated as the persistent CD 10 for a particular service. In the floating persistent CD 10 case, a message can be presented on the persistent CD 10's display warning a user of the computer's status as a floating persistent CD 10 with a message that states, "DO NOT SWITCH OFF".

The types of data management services provided by the CDs 10 comprising the network of the system 1 include, but are not limited to, data retrieval, data analysis, data reporting, searching, data mining, file sharing, conferencing, scheduling and project management.

Many services provided by the system 1 are implemented by "scripts" that are run by the middleware server 135. A script is a sequence of instructions that are executed in a predetermined order. A service may be constructed such that a service remains at a particular scripted step until a particular "trigger event" occurs. As an example, each time a specified field in a database is updated, the data contents of the field are retrieved, added to a spreadsheet, and a spreadsheet macro operative to update a chart is executed wherein the resulting chart is presented to subscribers of the service. Services may also be executed on a schedule. The running of the service can be specified by the service owner, or it can be triggered to run in response to a subscriber's request for the service or some event. The triggering event may be generated from within the system 1 or it may be an external event such as, for example, an electrical signal on a port operative to change the state of a certain memory location or interrupt Scripted applications need not be COM-compliant.

In all of these services it is important to keep in mind that each is provided by a publisher CD 10, and the service may migrate to another CD 10 when the publisher CD 10 goes off-line or becomes unavailable to provide the service for any reason.

A data retrieval service is a scripted service that includes at least one database query. The database query can be made using a stand-alone querying program such as, but not limited to, Microsoft Access™. A scripting tool is preferably included in the system 1. The system 1 may also include a database query tool that is operative to create and save queries that may be executed at a later time. The scripting tool, whether included in the system 1 or not, is preferably capable of loading the query program and a query and then executing the query. The output of the query may be delivered to an external program for presentation, storage or further processing, such as, but not limited to, Microsoft Excel™, or the output of the query can be presented, stored or further processed by the CD 10.

There are two basic modes of operation of Retrieval services. In mode one, the principle is that one individual who has privileges to read to or from a particular database may use a standard query tool to compose a query, and then store that query for later reuse. The subject system 1 enables that user to create a data retrieval service which puts this query at the disposal of other users (subscribers to the service) who do not themselves have access to the database. The subscribers may create "pull triggers" and the publisher may create "push triggers" to effectuate the transfer of records returned by the query. The provider or publisher of the service preferably retrieves more records than any one subscriber may request, so that the publisher receives a superset of commonly sought data via a single query. The publisher then also accumulates for a period of time a substantial number of queried records on the publisher's local CD 10 (or other storage under his control). After a specified amount of data has been accumulated, data are erased beginning with the oldest data in order to accommodate more recent data. There are several benefits following from this mode. First, considerably more access to data is made available to CDs 10 throughout the network, without increasing the processing burden on the database server, i.e., this burden is transferred instead to the service publisher. This publisher typically provides several "super queries" such that CD users may elect to subscribe to one or more such queries, and then cull the data from these queries as may be required for their individual purposes. In mode 2, a subscriber creates his own query using a query creation tool included in the system 1 (these tools are well-known in the art of database technology), and submits this query to the service provider (publisher) who then effects the query and returns the result, as though the subscriber himself had the database access privileges enjoyed by the publisher. An important benefit of this second mode is that is allows anyone with modest database skills, who makes only occasional use of a certain database, to obtain data stored in such a database without being required to first obtain the permission to do so from a central database administrator (which permission may not be granted due to the controlled nature of database access).

Another scripted service is data analysis function that invokes one or more programs that act on data input thereto to derive a desired result such as, for example, a number, chart, table, graph, warning or message. The result output by the data analysis publisher is presented to the subscribing CD(s) 10.

Data mining is yet another possible scripted service. Data mining involves a publisher running a program that employs multivariate statistics to search for statistical correlations between certain types of data. An analysis of the data correlations is preferably sent to the subscribers of the data mining service, or the correlations could be performed by the subscribers themselves. Data mining services may use database scripts or query commands to obtain data from external sources, such as measurement databases, and use the results of those queries in the data mining analysis.

File sharing is generally a non-scripted service. A file sharing service provider provides access to files to requesting CDs 10 subscriber. Files having a common association may be designated for access to all or a subset of CDs 10 on the network. This functionality is used to provide access to files related to a project (e.g., a work project to build a bridge) in a project management aspect of the system 1.

An important aspect of the system 1 file sharing capability is that an individual (publisher) serves as the repository for all shared files. The publisher controls the read/write permissions on a file-by-file and on a subscriber-by-subscriber basis. When the publisher's CD 10 switches off, the file sharing service migrates on the network to a backup CD 10, just as any other RAR service.

Another important aspect of the system 1 file sharing is that the storage may be on a mapped drive. Those skilled in the art will appreciate that it is not a simple task to provide shared access to files on such a mapped drive using conventional "private folders", which are accessible only to the owner who connects to the mapped drive using a password. The subject system 1 allows publishers to specify files in private, mapped folders and to give subscribers access to these files by relaying their requests to obtain them to the file server, as though the owner were himself making the request. This procedure is carried out invisibly to the subscriber and publisher.

Project management is a specialized type of file sharing wherein all actions associated with a project are maintained in a collective and synchronized manner such that any user working with a file or dataset associated with the project has the benefit of the latest changes. Project management services incorporate communication applications that are used by project workers in order to work through a project. These communication applications include, but not limited to, email, instant messaging services, collaborative document applications, etc. The file sharing service is also operative to allow subscribers to send emails, schedule events, action items, etc., in regard to a common attribute. The emails, scheduled events, action items, etc., are preferably stored and presented for viewing based on the common attribute as used in the file sharing service. For example, a request to view all files related to a project (e.g., the bridge project mentioned earlier) by a subscribing CD 10 may return files, as well as a list of emails, action items, scheduled events, memos, etc., generated by the CDs 10 and related to the project. Depending on the permissions granted to each subscriber by the service owner, each CD 10 may be entitled to add to or modify the shared records.

It should be noted in the system 1 that synchronization is mediated by the publisher, whose system is locally operative to derive a current version of each record based on a set of rules. The publisher then disseminates any changes to the subscribers (e.g., in a star or fanout mode). The files may be shared in the same manner as any other file sharing service—i.e., the files are stored by the publisher, checked out by subscribers, and they may be checked in in a modified form under control of the publisher. Those skilled in the art will recognize that this approach differs significantly from other modes of synchronization practiced in conventional peer-to-peer systems.

Figures 13, 13A:
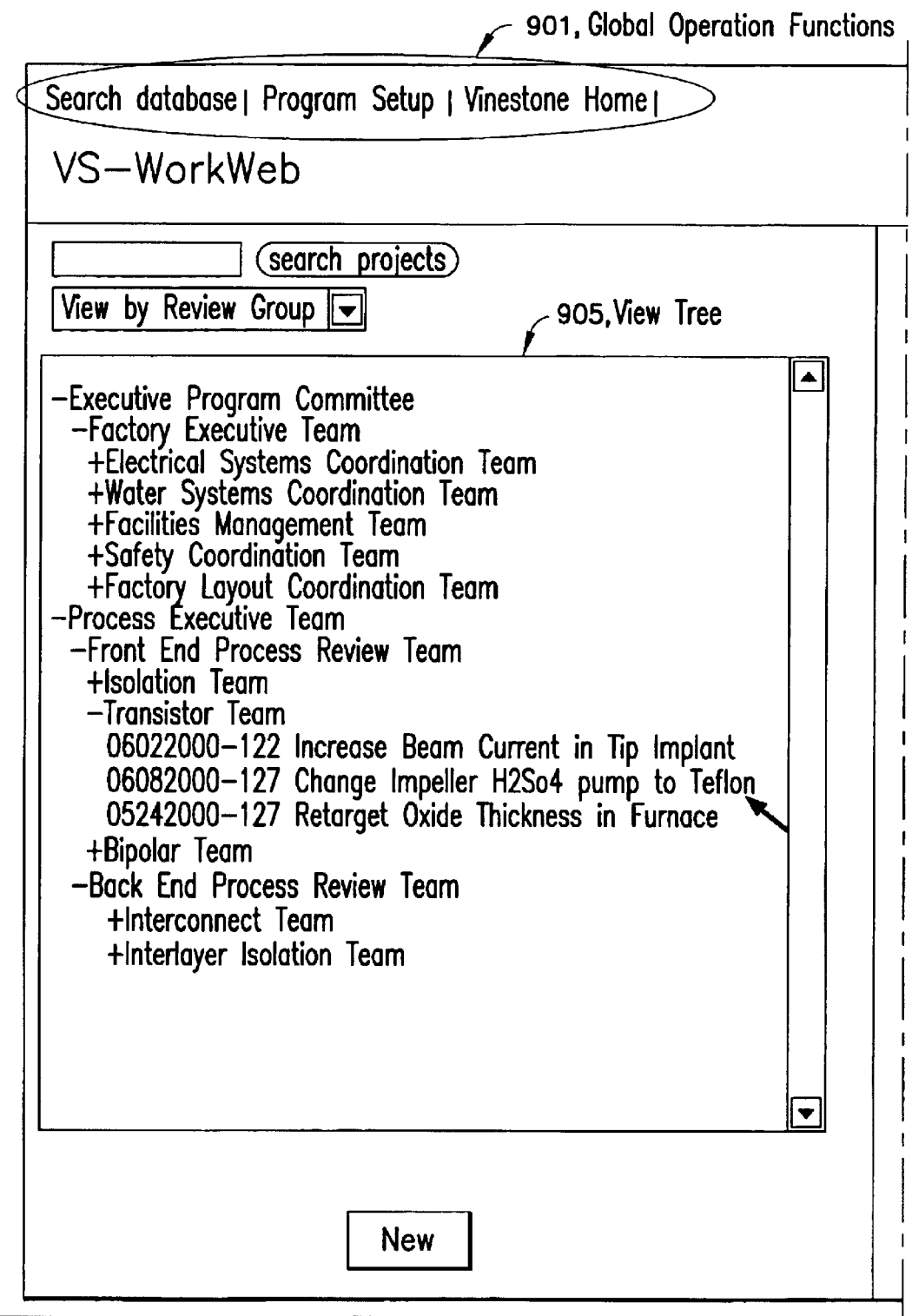
FIG. 13 is an example of a user interface screen of a connected device in the system of FIG. 1.

FIG. 13 is an example of a user interface screen of a connected device 10 when employed in the project management application. The screen is partitioned into a number of windows and other areas, including a Global Operation Functions area 901, an Application Tabs area 902, a Communication Tools area 903, a Content Area or window 904 and a View Tree window 905. In the illustrated example the user of a subscriber CD 10 has selected one file from the hierarchy of files displayed in the View Tree under Process Executive Team>Front End Process Review Team>Transistor Team, specifically a file entitled "Change Impeller H2SO4 Pump to Teflon". In response, the selected file appears in the Content Area 904. As has been described, in this manner the subscriber may gain access to a wide variety of project-related files and documents, including project-related emails and the like.

It should be noted that a Project service may subscribe to any number of Report services, thereby automatically directing the outputs of those Report services to the Project service subscribers.

A further service that may be provided is a conference service similar to an on-line chat room, preferably having a central theme and membership moderated by the service owner/publisher.

It should be appreciated that services provided by the system 1, including but not limited to those discussed above, may be combined using the scripting capability of the system 1 to create new, compound services. Compound services may be offered to other CDs 10 on a subscription basis or on a public broadcast basis.

A CD 10, acting as a client, subscribes to a service by applying to the service publisher. The service publisher then determines whether to subscribe the requesting CD 10 to the service. Upon the publisher granting the subscription request, the identify of the subscribing CD 10 is added to the list containing valid subscribers to the particular service. Upon granting a subscription, the service provider may further, depending upon the nature of the service, download certain records to the subscriber CD 10.

Some services may be provided to any of the CDs 10 upon their request, and are thus considered to be "public services". That is, public services are those to which a requesting CD 10 is automatically registered as a subscriber, without requiring that the publisher of that service explicitly granting the requesting CD 10 a subscription.

Under certain circumstances, it is possible that a service, particularly a public service, may become oversubscribed. That is, the service provider exhibits symptoms of being overloaded, such as operating slowly. The system may handle this problem by copying the service to at least one other CD 10, a service support CD 10, and thereafter certain subscribers of the service can be re-directed to the service support CD 10 to ease the load on the initial service publisher. In this manner the service provision load is divided in proportion to the number of support service provider(s) created and used.

It is further within the scope of the teachings herein to provide email, scheduling and action item assignment functions, and to synchronize the records associated with these functions, for example in a project management context, so that all CDs 10 see the synchronized, updated files, messages, notes, approvals, etc., that are related to a project.

It is also within the scope of these teachings to synchronize email, scheduling and action items with corresponding related records. For example, user A may send an email message to user B using an email function of the system 1 that transmits the email message directly from A to B without passing through an external server-based email program or exchange server. A and B might also use server-based email programs to communicate with email correspondents not connected to their serverless network. As such, A and B may each have two email programs. The email synchronization aspect of the system 1 is operative to synchronize the email inbox, outbox and sent items folders on the CDs 10 of both A and B when a message is sent, received or drafted on either system.

Project backup servers provide backup storage for, preferably, all records related to a project held by an active project publisher server, including records of files, correspondence, schedules, action items, record histories, hierarchies and subscribers. These are exemplary, as many other types of records may also be associated with a project which are also backed up on the backup server.

A CD 10 with a number of subscribers to its service(s) can possibly become overloaded if the number of subscribers is too large and/or the computing resources required to carry out a service action, such as a publish operation, becomes excessive. In such cases, the fanout strategy can be used to reduce the load on a given CD 10, while at the same time ensuring that all subscribers receive the desired information.

An example based on a file change notification service illustrates this aspect of the system 1. In a file notification service, the CD 10 receiving the service, i.e., the service subscriber or client, can choose to receive different types of data. For example, the subscriber CD 10 can request notification that a file has been created and/or changed. The subscriber CD 10 may request that a copy of the created/modified file be sent, or that certain data from the file be sent to the client, preferably as a message.

With respect to the case where the service subscribing client requests that a copy of the file be sent when a file change event occurs, the service provider CD 10 preferably packages the file into a message. The delivery destination for the message is selected from the service provider's list of service subscribers. Rather than scanning down the list of subscribers and sending the file to each subscriber in turn, the service provider CD 10 may attach a list containing the addresses of the other service subscribers to the message. Thus, when the first subscriber receives the file and the attached subscriber list it forwards the file and subscriber list, minus its own address, to the next subscriber on the service subscriber list. This process repeats until all subscribers in the list have been notified. Thus, a sequential file distribution process can be accomplished.

The degree of parallel distribution in the foregoing example can be varied depending on the workload associated with each service event and the number of subscribers. The message may contain a value that specifies how many subscribers are served by each subscriber CD 10 in the file distribution process. If the value is equal to one then the foregoing, purely sequential example prevails. If the value is equal to, say three, then the file is forwarded to three subscribers at each stage of the distribution process and the subscriber address list is split into three sections wherein a different section is sent to each of the three subscribers receiving the message. The lists may then be split again, etc., until the file is delivered to all of the subscribers. In this manner, a large number of subscribers can be provided data management services in an efficient and readily scalable manner.

This aspect of the system 1 is enabled by, in part, the nature of the system 1, wherein each CD 10 can operate as both a client and a server.

The degree of connectivity can vary in the system 1. Although a fixed connection topology as shown in FIG. 2A is preferred for event notification, CDs 10 may be connected in groups of pure peer-to-peer CDs, while other CDs 10 may be selectively connected in groups of client-server clusters 11. Note that the connection status in reference to the teachings herein refers to connections created and maintained by the system 1, or users of the system 1, not the general LAN/WAN connection status. In an alternative embodiment the system 1 is self-routing. That is, messages between CDs 10 are not routed along a predetermined route.

If there is a change in the system 1, for example a new service comes on-line, then a mechanism is needed to notify all users, irrespective of their connection status. The preferred approach is through the topology shown in FIG. 2A. Two alternative implementations to accomplish CD 10 event notification are (i) temporary connections and (ii) operating-system functionality, such as mailslots.

The following discussion assumes that each CD 10 has an updated CD 10 list containing the addresses of all other network CDs 10. When a new service is created the service provider scans its local CD 10 list of currently connected CDs 10 and sends a new service notification message to the first computer on the list. As well as the notification, it also sends a list of the other CDs 10 that are currently connected. When the first CD 10 receives the message it compares the received list with its list of connected CDs 10. The CD 10 then forwards the notification to all of the CDs 10 on its list who are not on the original list, and replies to the service provider with the list of those CDs 10 not on the original list as well.

The service provider then appends the returned list to its original list (after checking to ensure that its original list is still valid), and checks this received list against the current list of CDs 10. If there are still un-notified CDs 10, the service provider CD 10 sends the appended list to the second CD 10 on its original list. The second CD 10 carries out the same actions as the first CD 10 and sends back yet another list to the service provider of newly updated CDs 10, if any. This process repeats until (i) all CDs 10 have been informed of the new service, or (ii) unit; all CDs 10 connected to the service provider have been notified. If all of the connected CDs 10 have been notified, yet there are still CDs 10 that have not been reached, then the service provider can notify them using a temporary connection to each of theses CDs 10, or by using system 1 functionality such as mailslots to send a message to them directly.

In another mode of operation, that is well-suited but not limited to broadcast services, a "fanout" approach may be employed. In this mode of operation, the original service owner provides the service to a subset of the subscribing CDs 10 (i.e., fanout CD servers) together with a list of the other subscribers not yet served. Note, each list excludes the names of the subscribers submitted to other CDs 10. Each of the fanout servers then provides a similar subset list to other CDs 10 not yet served. This continues until all of the subscribed CD 10 clients have been served. In this manner, a very large number of clients can be served without unduly loading the system 1, or any one service publisher thereof.

A subscription to a service may be for an indefinite or definite period of time. It is preferred if the subscribing CD 10 specifies the term of its subscription in its application, and can change it later if so desired. The subscription can thus change from permanent to temporary or vice versa.

The system 1 of the present teachings preferably incorporates a plurality of default or built-in services. These services can either be hard-coded into the CDs 10 operating as servers, or attached to the servers, preferably using a component technology such as, for example Microsoft's COM (Component Object Model). The COM technology enables software developers to build libraries of functionality (e.g., applications, objects, controls) that can be accessed by any COM-compliant application. In addition to the built-in "standard" services provided, users can define custom services.

Two examples of built-in services are SPC services and a Gauge Repeatability and Reproducibility (GRR) service. The former may be used as the basis for any Statistical Process Control operation. The SPC service has three parts: A machine operator is prompted to enter the values of certain measured parameters into certain cells in a spreadsheet (Retrieval). These values then serve as inputs to certain statistical calculations within the spreadsheet, and a message is provided within another cell within the spreadsheet indicative of the outcome of a statistical test (Analysis). The contents of this cell are then published to any subscribers whenever a data value is entered in the spreadsheet by the operator (Report). The use of statistical test methods is widespread and well-known in the art of process and quality control. As a second example, a built in GRR service also features a spreadsheet in which a machine operator enters his or her name, the identity of a certain measuring machine of interest, and values for several measured values on a certain workpiece. These values are then compared by means of well-known statistical tests to data previously acquired by the operator for measurements of the same part, also stored in the spreadsheet. A "Pass or Fail" result is returned by the spreadsheet to a particular cell indicative of the outcome of the test. If the cell value is "Fail", then subscribers to the GRR service are automatically sent an instant message advising them of the machine identity and operator name.

The use of component technology enables users to create component-servers that provide custom objects. The custom objects may be used in the system applications and system macros to provide services. For example, two possible objects could be a Histogram object and a Dataset object. A service can be created that takes data from a specified source using the Dataset object, and that is in turn added to the Histogram object. The service publisher CD 10 may then send this histogram to subscriber CDs 10 in response to an alarm, or a scheduled event, or any other suitable push or pull trigger (or both).

Services can be divided into two broad categories, synchronous and asynchronous. Synchronous services are those that are delivered as they occur, while the outputs of asynchronous services are added to a local queue, either for immediate delivery or when the subscriber is next on-line. Asynchronous services communicate using a messaging mechanism functionality provided by the system 1. Messages are self-contained and can include a variety of types of data, including files, charts, reports, spread sheets, etc. The combination of the system messaging functionality and local queuing provides a powerful mechanism for creating distributed asynchronous services.

As was discussed previously, services may be defined to run on a scheduled basis or in response to an event stimulus (i.e., a trigger) such as, but not limited to, the presence of updated data from measuring equipment, or a change in state of a variable (e.g., a spread sheet cell).

An exemplary type of custom service is one based on a single query to a database. The query result data may be presented directly to subscribers of the service or embedded in a report before being passed to the subscribers. The system 1 includes a report generator and makes the creation of reporting services straightforward.

Those CDs 10 operating as servers or publishers employ the functionality of the database middleware 135 which facilitates the exchange of various database services with CD 10 clients. As an example, a service comprising a trigger attached to a maintenance database that informs an engineer when a particular part is booked to stock can be provided by the system 1. In this example, the database middleware 135 links the maintenance database, the triggering event and those client CDs 10 who are subscribed to receive the service.

Figure 7:
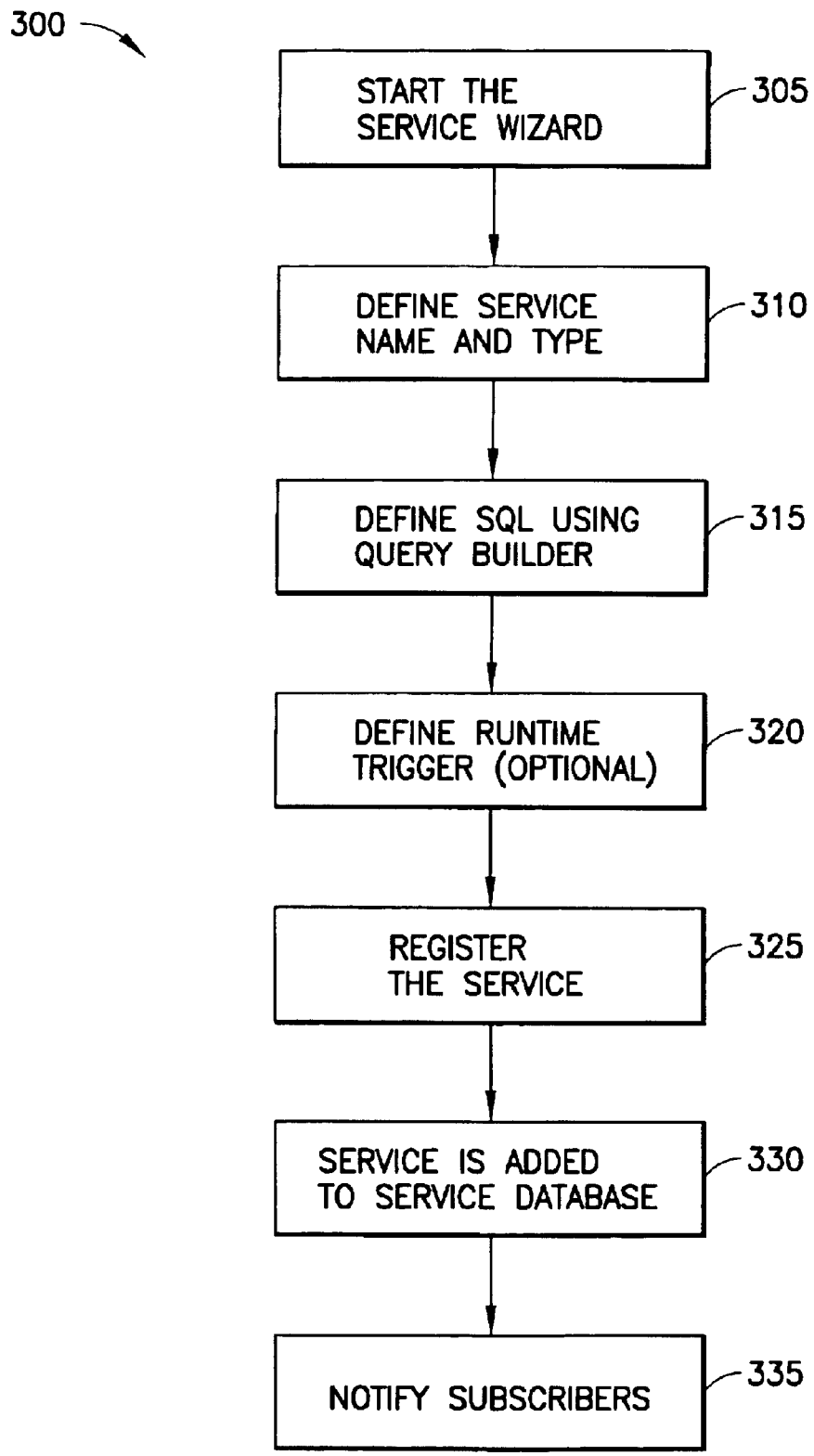
FIG. 7 is a flow diagram showing a method for creating a query-based service.

This and other services can be built using, for example SQL (Structured Query Language) and/or other database query language statements. FIG. 7 depicts a flow diagram including the steps in creating a query-based service.

A primary step is defining the type of service that will be created (step 310). Three examples of possible service types include (i) a simple query-based service such as the type being considered here; (ii) services involving multiple queries, scripting and/or other data management, and (iii) services based on spreadsheet macros.

The system 1 preferably includes an intuitive, visual tool for building queries (step 315). The output from the query builder, that is, the resulting query language string, is automatically added to the service definition.

In the maintenance database example introduce above, the engineer may define an SQL statement such as "SELECT Parts.PartID FROM Parts WHERE Parts.PartID= XXXXXX$^1$ AND Parts.InStock=TRUE".

This is an example of a service that could be delivered either synchronously or asynchronously, i.e., the engineer's CD 10 may monitor the field value as updates are generated, or a message can be queued and delivered informing the engineer of the updated field value.

The runtime trigger implementation is optional (step 320). If used however, the runtime trigger specifies the event that will prompt the provisioning of the service. For example, a CD 10 may be a measuring machine that monitors a particular piece of equipment and issues an alarm fault message upon the detection of an out-of-tolerance measurement. The alarm message in turn triggers the query of a parts database to determine if the required part is available. The step of defining a trigger event is thus a powerful tool in creating automated services.

The information defining custom services is preferably stored in the local database associated with each publisher CD 10 of the system 1. Registration of the service (step 325) involves storing all relevant service information in the database. The service-related information is then stored in a "Services" table in the local database (step 330). Once created, the other CDs 10 on the network are notified of the newly created service (step 335).

In an aspect of the system 1, the registration process also generates the above-mentioned Global Unique Identifier (GUID) that uniquely identifies the service. The GUID can be referenced by CDs 10 to invoke services provided by a particular CD 10.

The server CDs 10 of the system 1 provide information about their configuration database, and this leads to the concept of an embedded service referred to as "New Custom Service Notification". Users can subscribe to other CDs 10 for information on new services when they become available (i.e. when a new record is added to the system's Services table).

The actual execution of a service can be implemented in a number of ways. In one implementation, the system 1 provides a set of hard-coded core functions that are selected to run the service. For example, if the user defines an Alarm service, then the registration of the service automatically assigns the RunAlarmService internal routine to the service.

If the user creates a simple query service then the system 1 executes the RunQueryService, wherein RunXXXXService is a core service that is used to run a custom service.

Another approach is to have every service run by a single routine, such as RunService, wherein a call to the RunService function passes the name of the service to be executed to RunService. This in turn runs a script associated with the service. Alternatively, the GUID of the service to be executed can be passed to RunService to initiate the execution of the thus identified scripted service.

Accordingly, the system 1 provides a set of basic or core scripts for providing services, and users can define other scripts and associated services. Execution of the user-defined scripts can be initiated using a core routine, e.g., the single RunService routine.

Note that a service can be defined, yet have no current subscribers. Therefore the system 1 incorporates a means of disabling the service until the subscriber count is greater than zero.

The services provided within the scope of the present teachings can provide a great variety of outputs. Possible service outputs include, but are not limited to, alarms delivered to mobile phones, datasets delivered to a spreadsheet, reports delivered to a manager's CD 10, etc. The system 1 allows users to specify the details of the application to be used on the subscribing client for viewing the output. That is, the processing needed to present the service in the desired format can optionally be accomplished in the client aspect of the CD 10, not solely by the publisher of the service. Thus, the load on the service provider can be further managed.

The viewing application should preferably be compatible with the service output, and this can be defined when the user subscribes to a service. For example, if the user subscribes to an alarm service the user may be provided with a choice of delivery options, e.g., mobile phone, PDA, email, etc.

The system 1 also includes the capability to include the service type and end destination information in the output of the service. For example, a service can be specified as being suitable for viewing in a spreadsheet. The subscribing CD 10 is able to obtain this information from the service output itself. Specific details of the viewing application can also be specified, for example, a spreadsheet application may be specified as the compatible viewing application. Based on the viewing information specified in the service output, the specified viewing application or instructions for viewing can be automatically started (i.e., launched) by the subscribing CD 10 upon receipt of the service output.

The system 1 preferably provides a service inbox on each CD 10 for queuing received service outputs. Instances where this functionality would be useful include where the automatic application launch functionality of a CD 10 has been disabled; the viewing information for a service has been omitted; or the specified viewing application is not present or accessible to the subscribing CD 10, thus requiring the user to select an alternative application. The inbox preferably has an associated viewer, thus allowing the user to view the properties of queued services.

The system 1 also provides a means of creating custom reports. A report can be generated either at the publisher CD 10 (i.e., the service provider) or at the subscribing CD 10. If the latter, then the subscribing CD 10 need only subscribe to a data service. Complex reports can be built by a CD 10 subscribing to data services from a number of publisher CDs 10, and incorporating the delivered datasets into a composite report.

The system 1 also provides a means of using XML as the data interchange format.

The system 1 provides a wide range of pre-defined services. The pre-defined services can be combined to create composite services using the service wizard, as discussed above. An example of a composite service is the combination of a shop-floor gauge service that publishes obtained measurements, a service that calculates the statistical variation in a dataset of the obtained measurements, and an alarm service that provides an alarm signal in response to the calculated values being outside of a predetermined range.

Figure 8:
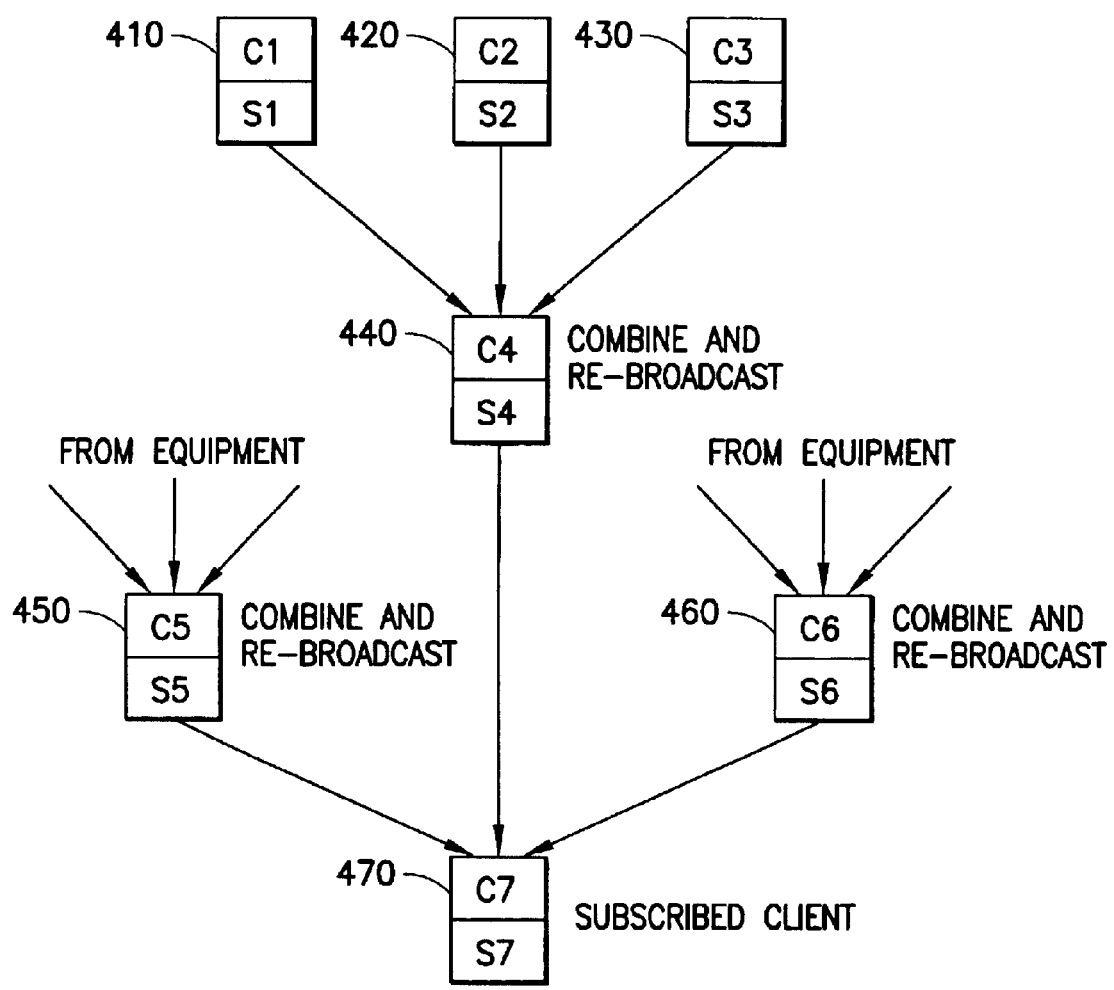
FIG. 8 illustrates a technique for providing a composite service in accordance with the teachings herein.

With reference to FIG. 8, as each service dataset is received from the publisher it is combined with other datasets and re-broadcast until the destination subscriber 470 receives the subscribed-to datasets. Thus, servers 410, 420, and 430 each broadcast datasets to server 440 that combines the received datasets into a larger package. When the package is complete, it is then broadcast to the next level down. At the bottom of the hierarchy is the subscribed client 470, which unpacks the datasets as they are received.

Depending on the number of layers there will be a hierarchy in the storage format of the datasets. The unpacking function can either detect the number of layers automatically, or make use of information added at each re-broadcast indicating the number of levels.

The step of combining may include calculating a result based on data from more than one broadcasting source. For example, the receiving CD 10 may compute a figure of merit comparing the performance of two similar machines in production lines. The CD 10 may then become a publisher for a new service whose function is to make this comparison, and then broadcast the result to one or more subscribers. The broadcast may be on a demand basis (i.e., requested by the subscriber for immediate delivery), on a scheduled basis (i.e., updated versions delivered periodically to the subscriber based on current data), or on an actuated basis (i.e., computed and sent each time new data are received by the publisher CD 10). It is also within the scope of this type of service to provide warnings and other types of notifications to subscribers based on the result of the comparative calculation, and for the broadcast to be triggered by comparative calculation yielding a value exceeding some threshold.

Since the services of the system 1 are defined in a database table associated with the system 1, the services can be made available through a number of CD 10 servers by using a database replication engine. The replication engine ensures that multiple copies of a database table can be distributed at different locations in the system 1 in a synchronized fashion.

For example, in accordance with the teachings herein the service replication aspects of the system 1 can replicate a service associated with a project to all of the CD 10 servers associated with a project or a subset thereof Furthermore, synchronized versions of the database table and files associated with the project are maintained on the replicating CD 10 servers by distributing changes from the original publisher to the replicating CD 10 servers.

The servers of the CDs 10 of the system 1 include a local database query engine. In a preferred embodiment, the query engine is, though not limited to being, a SQL query engine. The local database query engine allows powerful multi-query services to be defined at the CD 10. The local database query engine located in CD 10 communicates with the server under the control of system 1 middleware 135. In this manner, query data can be recovered from a server (e.g., measuring equipment) and processed at the point of acquisition. Alternatively, query data can be distributed to CDs 10 wherein the query results can be further processed. Thus, the processing load can be distributed between the database server and the CDs 10.

The network of interconnected CDs 10 provides advantages for general database querying and reporting. Two approaches used for reporting are batch processing and online queries. With batch processing, the information can easily be out of date by the time it reaches the recipient. Online queries, on the other hand, provide up-to-date information but tend to impose a high load on the network.

Figure 9:
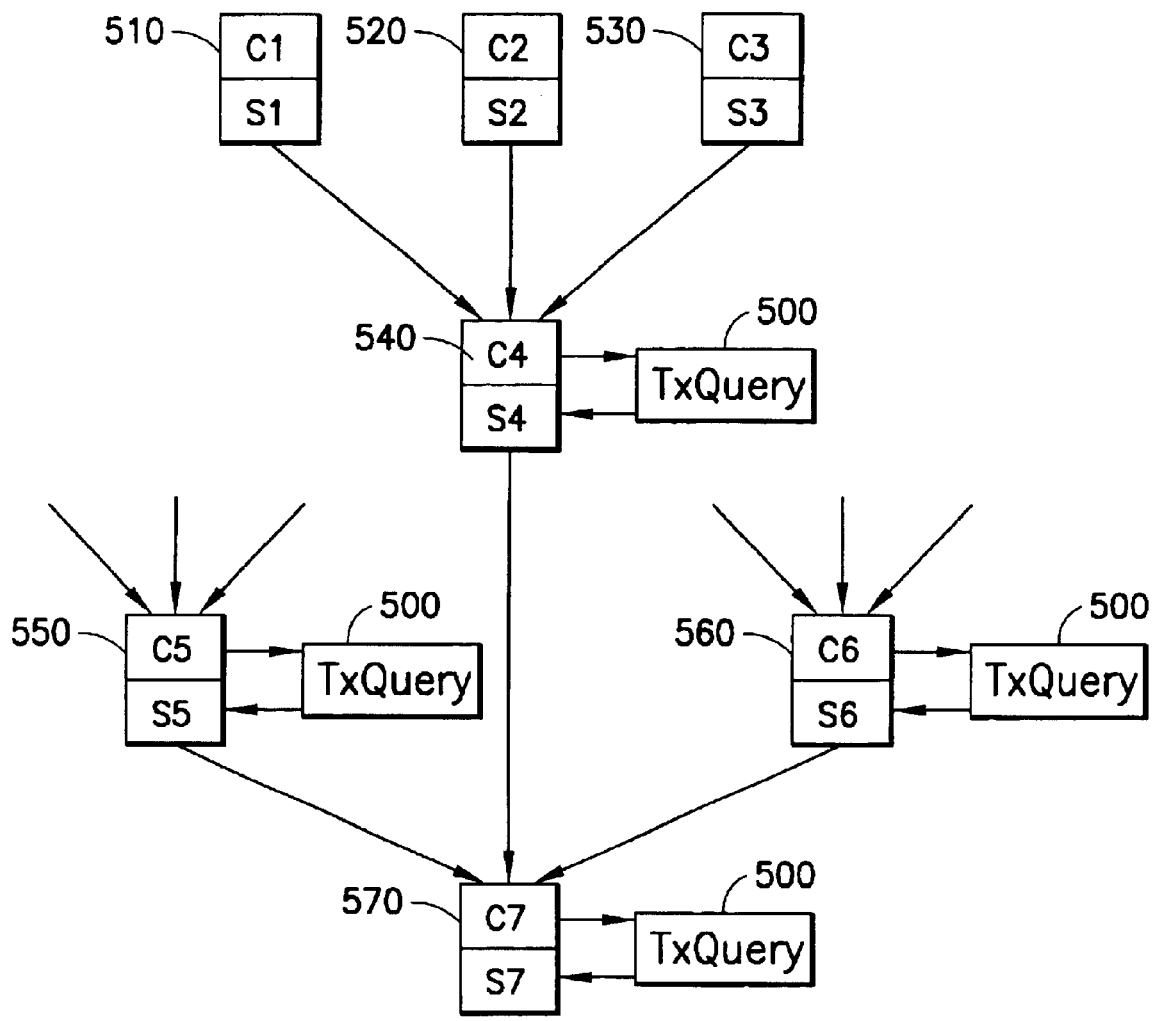
FIG. 9 illustrates a technique for performing a distributed query in accordance with the teachings herein.

As shown in FIG. 9 (as well as FIGS. 5B, 5C and 5D), each CD 10 may have a database query engine which allows it to accept query inputs and result sets for processing.

FIG. 9 shows an implementation of distributed query processing. TxQuery 500 is the local query processor incorporated into the server/client CDs 540, 550, 560, and 570. Before a distributed query is run, a decision is made regarding which CDs will function as query processing units. Each active unit preferably creates a client socket (CS) on-the-fly, each of which attaches to a server on another workstation. The result sets from each client socket/client dataset are then combined using the TxQuery 500, and this is in turn attached to the local server. This local server is then queried by another client socket/dataset.

For example, a query could involve a SELECT command from a database table of unit 550 followed by a SELECT command from a unit 560 database table, followed by a JOIN command on the returned datasets by unit 570. The system 1 allows the final JOIN to take place on the local CD 10, rather than a remote CD 10 or a central server. Thus, it is within the scope of the present teachings to distribute database queries throughout the system 1.

The system 1 may include the query optimizer 36 (see FIGS. 5B, 5C, 5D) on at least some of the CDs 10 to determine the relative efficiency of running parts of the query on the remote server against the cost of bringing the data across the network for processing on the local CD 10.

Another mode of operation involves passing a query from the CD 10 generating the query through another CD 10 or CDs 10 and processing the query at a remote CD 10, other than the CD 10 originally specified to process the query. The data is retrieved to the remote CD 10 where it is processed and the result set is then passed back to the original requesting CD 10. This mode of operation can be usefully employed in situations where another CD 10 has a low workload at the time a query request is sent and thus may be used to more efficiently use the distributed processing resources of the system 1. Any of a number of suitable load-balancing algorithms can be used in determining which CDs 10 will process the query, or parts thereof.

The system 1 also includes functionality for performing resource tracking, wherein the processor load on the CDs 10 is tracked over time. The system 1 can then use the resource tracking history data to predict the workload on the network CDs 10 when a query request is made in an effort to better distribute the query processing. The system 1 preferably verifies that the CDs 10 predicted as most suitable are in fact not truly loaded at the time the query is to be processed.

Because of the system's use of distributed servers, the system 1 provides a means of securing data without the use of a central server. The level of backup implemented can be varied and is determined by the internal business requirements. The minimum level of backup involves a single backup CD 10.

The present teachings also provide for centralized backup of all projects on a central server. As well as increased data security, an advantage of centralized backup is that the server can be used for data-intensive data-mining operations without having to pull large amounts of data across the network from distributed CD 10 servers, and loading the distributed CDs 10 that may be involved in current project activities. However, the exact configuration used is dependent on the properties of the network, servers, etc and a wholly distributed knowledge-base is a secure alternative.

For a data service, for example measuring machine services connected to a production line producing data at times when all CDs 10 are offline for an extended period of time, the service output delivery may be delayed with data accumulating locally, or the data may be automatically directed to a temporary client location in the centralized backup database. When the primary publisher CD 10 for the service is turned on the system 1 is active to synchronize any files in the network which may have been modified or created while the primary publisher was offline, and thereafter it resumes its role as the primary server.

The centralized backup (acting as a gateway) server may also function as a point of access for users lacking access to the network to retrieve or modify service data. This situation commonly arises when a company wishes to control access to its computer network by outsiders. It is within the scope of these teachings to provide a network that provides secure control of service data such that access to read or write data to or from the centralized backup server is restricted to outside users not directly connected to the network. Restrictions may include the following:

(i) permission to read or write to services on a service by service basis;
(ii) data modified or created by outsiders is not synchronized with the corresponding CD 10 publisher without permission by at least one CD 10 administrator with defined authority to do so; and/or
(iii) the publisher may be configured to overwrite or delete records added to or modified in the centralized backup database by an outsider.

It is within the scope of these teachings to create user login and other authentication procedures that allow the system 1 to identify outside users and authorized member users (who may be accessing the system 1 from an outside computer), and to provide different synchronization and read-write authorities to such users. For example, the system 1 may be configured to allow member CDs 10 to make modifications to records in the centralized database, which will be subsequently automatically synchronized with the corresponding CD 10 server without any further action. However, modifications made by an outside non-member user may require special action to be taken by an administrator user prior to synchronization occurring.

In another aspect of the system 1, the database containing data to be queried is distributed to a plurality of network CDs 10, as opposed to being stored in a central database that may or may not be located on a CD 10. The database can therefore be replicated on the CDs 10, with each CD 10 holding different sections of the data. Various portions of the query can then be processed by the CD 10 having the needed portion of the database. The distributed query processing approaches discussed above can also be used in instances where the database itself is distributed throughout the network.

The query optimizer 36 may be used to check the efficiency of a query-based service. The query optimizer 36 can also be used to determine how to best distribute the query processing load between the database server(s) and the various CDs 10 receiving the service.

The above descriptions of service notification and service replication illustrate how the functionality of the system 1 can be used to extend the capabilities of the system 1 and to synchronize the operations thereof.

A user requires a way of determining which services are available from the other CDs 10 on the network. Each CD 10 has a set of attributes describing their profile on the network.

The CDs 10 have a local database used for storing details of remote services on the network. On a large network there could be a very large number of services and the local table could become very large. A preferred approach for populating this table is to add remote service details only when the user needs them.

In practice, a CD 10 will tend to use services from a subset of other users in the network. Therefore, the list can be kept to a reasonable size. A service explorer can be used to view and manage the local database table. The service explorer may comprise two panes displayed on a computer display. On the left is a list of the network CDs 10 and their attributes. This list can be set up to contain all users on the network and their attributes, or the listing can be a filtered list. The listing can be filtered using a variety of criteria including, but not limited to, a common association to a project, application, service provider, service consumer, etc.

In a presently preferred embodiment the service explorer first launches with the complete listing of users associated with, for example, a particular department within a company using the system 1. A means of selecting different CD 10 service providers based on different criteria is provided. When the user selects a particular department, then the system 1 retrieves the list of user attributes from the network server. In this manner, the local database table need not be populated with user attributes until the attributes are specifically requested.

In the case where users have defined custom profiles within the system 1 then each CD 10 may store a list of all user names and their attributes. Other attributes can be obtained from the organization's servers.

When a particular CD 10 is selected on the left pane of the service explorer, preferably using point and click techniques, a check is made of the local database for any services associated with the selected CD 10. The database holds a field that indicates when this user was last queried. If the user has never been queried for its associated service list, then the system 1 automatically obtains the selected CD 10 location details from the local CD 10 list and, assuming the selected CD 10 is on-line, establishes a connection with the CD 10 at its designated location. A request for a current service list is then sent to the CD 10. This request is asynchronous in that the user can continue working within the service explorer, and even close it down, without waiting for a reply from the selected CD 10.

If the CD 10 has been queried in the past then the service explorer can display the list of services previously obtained, including a date stamp of the last query. A state of having never been queried is indicated by the absence of a date stamp.

If the last query date is outside some predetermined time limit as specified by the system administrator or by the user, then the system 1 can query the remote CD 10. Optionally, a refresh function can be used to ensure that the service listing associated with a CD 10 is current, not withstanding the age of the last query. Thus, the system 1 can be configured to always re-query the CD 10 when the CD 10 is selected.

If a user has been browsing widely on the network then it is possible that their local table holding the details of the services could still grow very large. The system 1 therefore includes a function for purging services from the database table for service provider CDs 10 based on, for example, the length of time elapsed since the service was last queried or viewed.

CDs 10 operating as clients have the capability for scripting services. In a presently preferred embodiment, a Visual Basic compatible scripting engine (such as SAX Basic) is used to generate the scripts, although other scripting engines such as Javascript, VBScript, tcl, PERL, etc. may be used. The scripting capability enables users to create stand-alone macros within the system 1 that can be used to provide complex services. The scripted macros can run within the system 1 application itself, and can operate to respond directly to incoming data, alarms, etc. Users can also create their own software component servers that provide custom objects, as was described above.

The system 1 preferably provides functionality for creating composite services built from multiple distributed services provided by the CDs 10 as shown in FIG. 9. Composite services are implemented using the messaging functionality of the system 1 for communicating between CDs 10.

In assembling composite services, CDs 510, 520, and 530 each provide a service to CD 540 for further processing and incorporation into the service provided by CD 540, which combines the data management service outputs fed thereto and broadcasts its service to CD 570. The system 1 therefore includes a mechanism for ensuring that the constituent services comprising a composite service are executed in the correct order. One way of achieving this objective is to include the instructions for providing the composite service into a single message, and for this message to be self-routing. Hence, after completing each processing step as directed by the instructions included in the message, the message automatically knows where to go for the next processing step. The composite service instruction message preferably includes a list of alternative CDs 10 that can be used to provide the services used to build the composite service in the instance that the CD(s) 10 initially referenced in the composite service instruction message are turned off or otherwise unavailable. In the event that all of the referenced CDs 10 are unavailable, the composite service instruction message is preferably queued on the CD 10 at its last point of processing. If processing of the composite service instruction message is unable to proceed to completion, then the message may also be queued on the persistent CD.

As an example of a project service, consider a project concerned with developing a machine. In the system 1 the project service may be initiated by user A by creating a new service. User A adds several files to this project and then subscribes users B, C and D to the project since he collaborates with them frequently on similar projects, and also notifies them of the new service and subscription. The system 1 provides functionality to allow a publisher CD 10 to subscribe another remote CD 10 to any service, with no intervention being required on the part of the remote CD 10. Other CDs 10 in the network may also subscribe to user A's new project.

If the primary or controlling CD 10 is off-line or otherwise unavailable for any reason, then control passes down to the next available backup CD 10, and project records are transferred for backup to the next available backup CD 10 in order to preserve project synchronization and the required number of backups, as was discussed previously.

Control as used in this instance means that a server CD 10 holds the primary copy of a particular file or other dataset and has functionality for resolving version disputes arising among users attempting to modify a certain record simultaneously. The controlling CD 10 also informs other CDs 10 in the network of modifications of project attributes such as, but not limited to, project workspace contents, membership, backup server hierarchy and location.

In order to minimize network traffic and CD 10 activity, updates are preferably synchronized according to delta-patch techniques. For example, only the changes to a file are transmitted rather than the entire file.

It is within the scope of these teachings for the determination of the order of the backup hierarchy to be made by the system 1 automatically and unknown to the system 1 users. It is also within the scope of these teachings for the backup hierarchy to include at least one centralized backup server or database. Control and primary storage may revert to the original owner/publisher (or not) when the original CD 10 becomes available.

The CD 10 associated with the creation of a project or distributed service preferably initially self-configures as the primary server for the project service, with other CDs 10 acting as clients.

Figure 11:
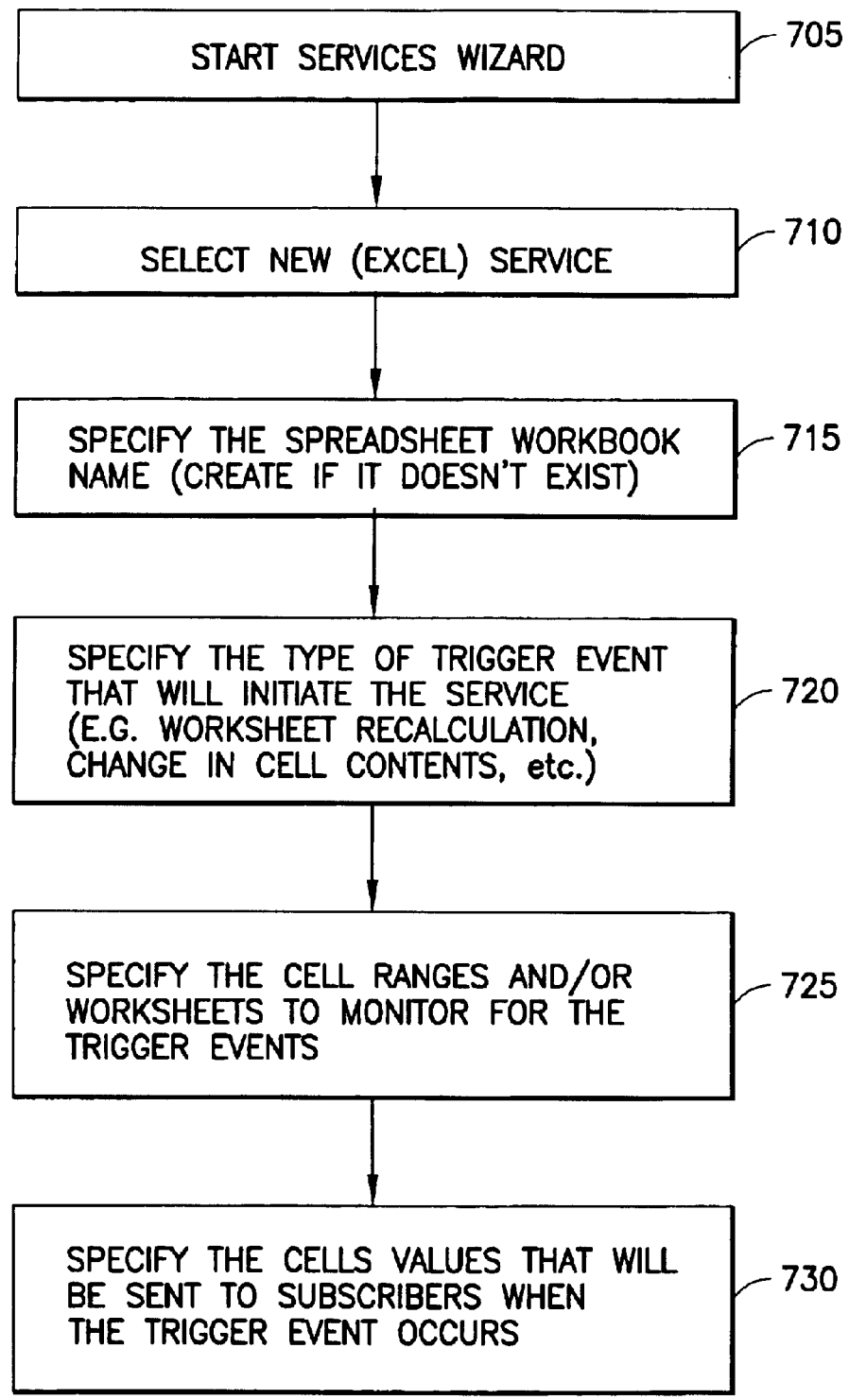
FIG. 11 is a flow diagram showing a method for creating a spreadsheet-based service.

A range of possible services can be provided by the system 1 using COM-compliant controls, objects and applications, such as Excel™. Services based on Excel™ or other COM-compliant applications are possible based on the interaction between a server of the system and execution of spreadsheet operations. The steps involved in creating an Excel™ service are shown in FIG. 11.

The service creation wizard is started in step 705. From the choices presented a selection is made to create a "new" spreadsheet service (step 710). The name of the workbook that will be used to build and reference the workbook is then specified. (step 715). The trigger event is then specified at step 720. The trigger event may be a worksheet recalculation, a change in a range of cells, execution of another workbook, a request for the workbooks data, etc. The trigger designation tool can be used creatively to design automatic executing spreadsheets. The spreadsheet being created can be triggered by other events, and spreadsheet cells and/or ranges are specified for monitoring purposes (step 725). In step 730, the outputs that will be sent to subscribers of the service being created are specified.

A spreadsheet service may be triggered by a specified event occurring in another spreadsheet, and can further trigger other spreadsheets to execute macros. Thus spreadsheets, with their familiar interface and powerful programming engine, can be used to create complex, automated nested services that consider a number of variables.

The system 1 uses COM-compliant objects to allow the service creation tool, the Service Wizard, to attach to a spreadsheet workbook. Hence, when the user selects a range of cells to be monitored for trigger events, the system 1 can obtain data from the referenced cells directly, since the CDs 10 of the system 1 can recognize and process COM-compliant inputs and outputs. All of the trigger information and output information such as the information describing which cell contents should be forwarded to a subscribing CD 10, is stored in the local services database table of the CD 10 that publishes the service.

When a worksheet updates its cells (i.e., recalculates), the action of doing so is detected by the publisher CD 10. The publisher checks the updated workbook's name against the list it maintains containing the workbooks associated with the spreadsheet service. If the updated workbook is on the list, the publisher then checks the trigger event source with the list of trigger events specified for its identified spreadsheet-based service(s). If a trigger event associated with a subscribed to service has occurred then the publisher retrieves the required service output datasets from the workbook. The datasets are then packaged into a message and sent to the currently connected subscribers.

If a subscriber to the provided service is not connected on the network at the time the service message is delivered to subscribed CDs 10, then an option exists whereby the service output message is stored in a local message queue associated with each subscribed CD 10 for delivery when the subscriber comes back on-line.

A confirmation reply may be returned upon receipt of a message. The message recipient then records that the message has been received. If the confirmation does arrive, and the message sender re-sends the message, then the recipient subscriber simply re-sends the confirmation, and ignores the latest re-send. At the sender's location, the message is held in the queue and continuously re-sent until the confirmation is received from the receiver.

Upon receiving the spreadsheet service message, the subscriber CD 10 can either process the service output dataset in the default format designated by the publisher, or the subscriber CD 10 may employ custom handling as specified by the subscriber. For instance, a case of handling the service in the specified default manner includes the situation where the service provider normally sends all updated datasets to subscribers. In this case, a subscriber receives a copy of the service workbook and all updates of the data as provided by the remote service provider computer.

An example of custom handling includes the case where the subscriber only requires, for example, a single number from the service output dataset. Through custom handling of the service output, the subscriber can specify that specific output data be received, and also how the output is to be formatted. Thus, a subscriber can create sophisticated, custom reports using data obtained from a number of distributed services in the format(s) of the subscriber's choice.

Figure 10:
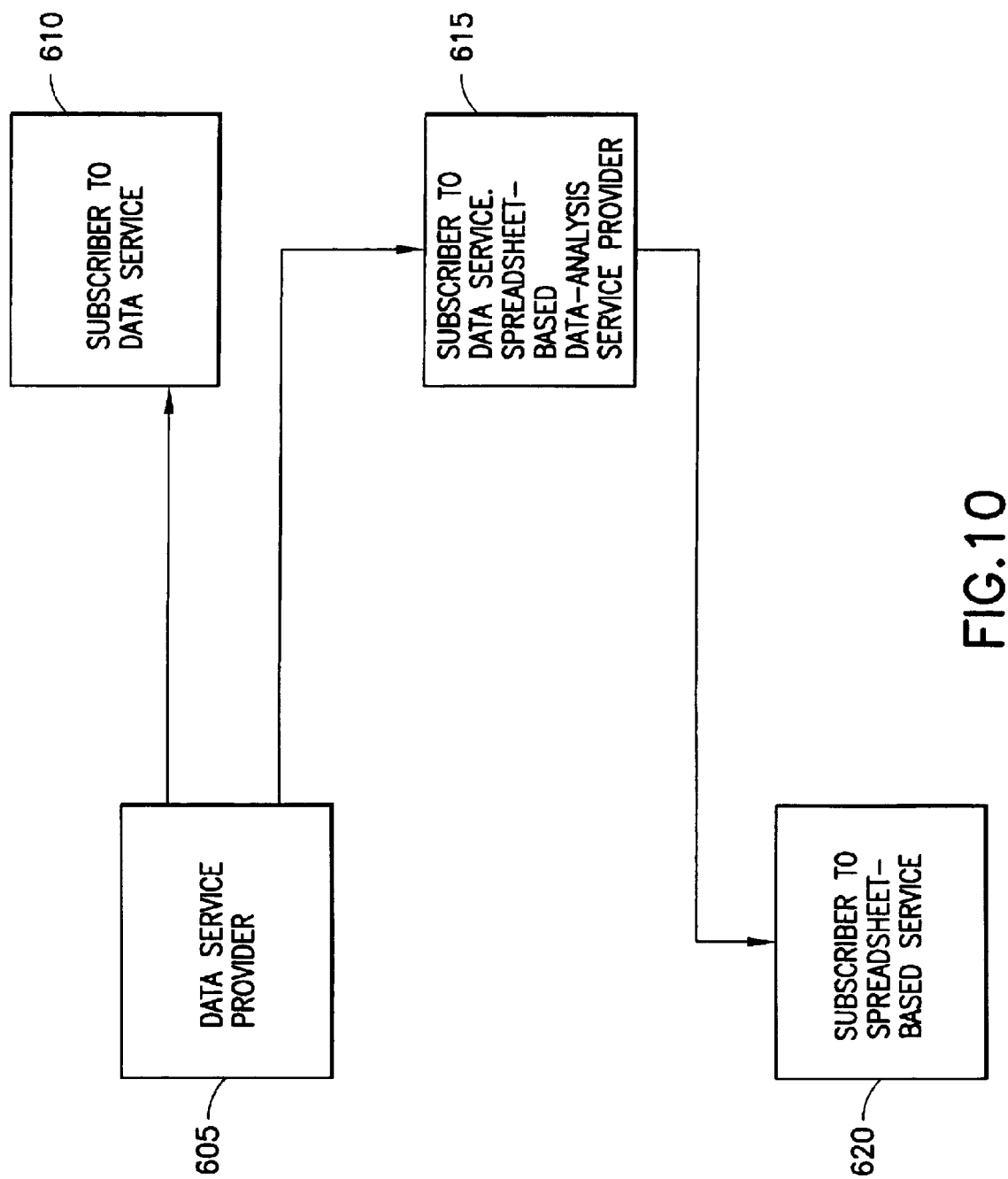
FIG. 10 depicts a spreadsheet service delivery triggered by a data service.

An exemplary event-driven spreadsheet service is shown in FIG. 10. A data service, such as measurements from manufacturing shop floor equipment, is acquired by CD 605. CD 605 provides a data service for the acquired data to subscribers 610 and 615. Subscriber 615 receives the service and processes it locally for presentation to the user of CD 620 (e.g., an engineer). CD 615 thus provides a spreadsheet-based data analysis service to subscriber CD 620. Receipt of the data service from CD 605 at CD 615 triggers execution of the spreadsheet-based service that is generated by CD 615 and provided to CD 620.

As shown in the example implementation of FIG. 10, the spreadsheet-based service from CD 615 is a composite service containing the output of another service. The spreadsheet-based functionality included in the system 1 allows for the efficient and useful manipulation of the acquired data. That is, the system 1 adds a level of functionality not present in data acquisition or data analysis alone. In accordance with an aspect of these teachings, the system 1 enables the automatic processing, gathering, storing, distribution, analysis, and presentation of data in a manner useful for users of the data.

The creation and delivery of the spreadsheet-based service can be triggered according to a system scheduler or an event, such as the data service delivery event of FIG. 10. The system scheduler can be maintained on CDs 10 providing the scheduled services, on designated backup CDs 10, or on a combination of these and other embodiments.

The data service delivery can be handled in a number of ways. For example, the system 1, particularly the system interface of the dataset receiving CD 615 can receive the data delivery service and, in response, start the spreadsheet application. The spreadsheet application can then open the relevant spreadsheet workbook and run the service in order to provide service to CD 620. It should be noted that the database keeps a record of which ranges should be monitored for new data.

The data service delivery can also be handled by the spreadsheet application itself. In this case, the spreadsheet workbook containing the service is already open upon delivery of the data. Receipt of the data into the workbook triggers a spreadsheet event, for example execution of a macro. By using COM-compliant objects and triggering events, the system 1 can provide services based on the changes within a worksheet while minimizing service architecture complexity. This situation exploits the ability of the subscriber to specify the destination for any data provided by a data service. In another example, the data from the data service is written to a file on the CD 10 hard disk.

The data service delivery can comprise a file dump. In accordance with the teachings herein, file notification aspects of the system 1 can be used to trigger the spreadsheet-based service provided by the CD 615. That is, notification that a particular file has been updated and/or changed triggers the spreadsheet event. In the example of FIG. 10, the spreadsheet-based service includes a macro that processes the data in the file received (via the file dump). However, the triggered event can, depending on the nature of the service provided, use a data file other than the file delivered in the triggering data delivery.

Spreadsheet service outputs are preferably viewed within a spreadsheet workbook, but not necessarily. Another option is to deliver a report in another format such as, but not limited to, MS Word™ or FastReport™. In this case, the spreadsheet application would be used solely as a processing engine.

Another possible format is as a simple "system" report that may be a data grid or a chart displayed in the user interface 120 system viewer. Use of a system chart server in the spreadsheet facilitates easy transport of a chart object, possibly as SVG or simply as a "system" formatted chart object.

Although an Excel™ application was used in the illustrative example depicted and described above in relation to FIG. 10, this is neither a limitation nor necessity of the present teachings. COM-compliant applications, of which Excel™ is an example, are preferred due to the standardization of COM-compliant objects, applications and controls.

A native output format for a spreadsheet macro is a range of cells. The CDs 10 can be configured to monitor for spreadsheet events such a change in a range of cells in a manner similar to the approach used to monitor other types of triggered events.

As such, spreadsheet macros can be run in response to a manual directive from a user; an event from within the spreadsheet, most likely a worksheet event; and a scheduled running of the macro. The output of the macro is preferably placed in a worksheet cell, as opposed to working with macro variables, since the spreadsheet interface is available.

Macros used in providing services can be created automatically through the use of a worksheet OnChange event. The Target range (i.e. the range where the change occurred) is passed to the event handler. A simple wizard can be provided that generates the required stub code and inserts it into the VBE (i.e., the OnChange handler). In particular, a function that tests whether the Target range passed to the handler is within the range on the worksheet where a data feed is expected is employed. Accordingly, the wizard executes steps such as the following:
(i) Select/specify the worksheet that receives new data and will trigger the macro;
(ii) Select/specify the range of cells where the trigger data will be entered; and
(iii) Select/specify the macro to be run when the new data is received.

A spreadsheet application can be used as a general service delivery interface by adding additional functionality thereto. For example, a DataLink function can be used to add functionality to a spreadsheet application. This functionality can be added using a lightweight, ActiveX control embedded in a spreadsheet worksheet, where the ActiveX control includes the required functionality to allow it to operate as a service subscriber. In this mode the spreadsheet application receives the data directly from the publisher. This mode is not limited to spreadsheets, and can be implemented using other COM-compliant applications.

There are two preferred options for linking to a data service for the purpose of using a dataset therefrom in a spreadsheet-based service. The data service provider (i.e., the publisher) may be connected directly from a worksheet within the running spreadsheet application using the approach described above. Alternatively, the dataset can be connected from a system subscriber CD 10 and the data can be passed through the system 1 to the spreadsheet.

The preferred option is to have the data service output handled by the subscriber CD 10. Each data service includes associated metadata, and data elements described by the metadata can be assigned to particular cell ranges in the spreadsheet.

Additional processing functionality can be added to the spreadsheet application for processing the data that is used therein. For example, a column of values can be converted to an average or standard deviation before being inserted into the worksheet, where a default operation simply inserts the raw data into the worksheet.

This added processing functionality can be used to generate values for use within the worksheet other than those received from a data service. For example, a user may wish to compare a calculated value with a threshold. Another example is the calculation of capability indices, wherein values of the specification limits need to be stored. A function can be added to store these values as named cells in the workbook, and to link them to the processing engine in an embedded formula. Note that an Asta ODBC Driver or an Asta OLEDB driver may be used to provide a direct data feed into Excel™.

As an alternative to using an external spreadsheet application such as Excel™, a lightweight spreadsheet engine can be provided within the system 1 for providing spreadsheet functionality and running, for example, spreadsheet-based services. Accordingly, it may be desirable to run these services in the background. Preferred characteristics for the spreadsheet engine include being compatible with common spreadsheet formats, COM-compliance, having accessible source code, and having the capability to handle multiple sheets, cell formulae, named ranges, and macros, including the creation of macros.

A spreadsheet-based threshold service can be implemented wherein a data input value is compared to a predetermined threshold value and the result of the comparison is provided to subscribers of the service using a notification function in the event the input value exceeds the threshold value. Multiple processing steps can be implemented between the data input and the notification step, wherein complex threshold conditions are used. In a presently preferred embodiment, a standard cell content may be used for signifying an alarm notification.

If a CD 10 publisher supplies a service with, for example, calculated values on a spreadsheet, then it may be desirable to allow a user to apply an additional layer to the output (i.e., customize the output). For example, the user may not be interested in the actual calculated value on an on-going basis. Instead the user may only be interested in whether the value exceeds a certain threshold. Accordingly, services provided by a CD 10 can be processed locally. In an effort not to increase the load on the service provider, the output is further processed and/or filtered at the service subscriber (i.e., consumer) location. Thus, the data is transported and then filtered at the service consumer site. Furthermore, the user can browse the metadata of a service and assign different notifications to different data elements.

The system 1 can be linked to an external spreadsheet application (or other external applications) in the instance that local spreadsheet-based (or other external application) services have been defined. The system 1 default may be to run the spreadsheet hidden, for service delivery purposes only. In the event that a CD 10 subscriber wishes to use the external spreadsheet application, the spreadsheet application running in the background may be brought forward (i.e., "un-hide" the background application), or alternatively another instance of the spreadsheet application can be launched. A preferred implementation un-hides the spreadsheet application but keeps the service workbooks hidden in the background, out of sight and possible corruption by the user. If the spreadsheet application is shut down or otherwise unavailable the system 1 automatically detects this condition and marks all external spreadsheet-based services as unavailable.

By separating the spreadsheet engine from the GUI, collaborative spreadsheet services can be constructed. Given the distributed aspect of the system 1, the system 1 is well suited for generating collaborative spreadsheet-based services.

Spreadsheet-based services provided by the system 1 are preferably managed using service database tables. The database tables associated with spreadsheet services include, but are not limited to, the following (for Excel services):

---

TABLE "ExcelServices.DAT"
(
    "ServiceID" INTEGER NOT NULL,
    "WorkbookID" INTEGER NOT NULL,
    "WorkbookName" CHARACTER(50) NOT NULL,
    "WBLocation" CHARACTER(50) NOT NULL,
    primary key (ServiceID, WorkbookID)
LANGUAGE "ANSI Standard" SORT "Default Order"
USER MAJOR VERSION 1
);

---

TABLE "ExcelOutputs.DAT"
(
    "OutputID" AUTOINC,
    "ServiceID" INTEGER NOT NULL,
    "WorkbookID" INTEGER NOT NULL, -continued

```
"OutputTypeID" INTEGER NOT NULL,
"Worksheet" CHARACTER(50) NOT NULL,
"Descriptor" CHARACTER(50) NOT NULL,
"IsFormula" BOOLEAN,
"IsArray" BOOLEAN,
primary key (OutputID)
LANGUAGE "ANSI Standard" SORT "Default Order"
USER MAJOR VERSION 1
);
```

TABLE "ExcelTriggers.DAT"
(

-continued

```
"TriggerID" AUTOINC,
"ServiceID" INTEGER NOT NULL,
"TriggerType" INTEGER NOT NULL,
"WorkbookID" INTEGER NOT NULL,
"Worksheet" CHARACTER(50) NOT NULL,
"Descriptor" CHARACTER(50),
primary key (TriggerID)
LANGUAGE "ANSI Standard" SORT "Default Order"
USER MAJOR VERSION 1
);
```

In the Excel™ embodiment the Output Types include a Named Range, a Cell Range (e.g., A1 or R1C1 format) and a Chart.

When creating the service output description, the level of specificity may vary. For example, if the output is to be copied to a Tdataset-type then the user is expected to specify integer, float, etc. A check can be made to determine if the outputs of a spreadsheet selected for reporting or further processing are calculated cells. This can be accomplished by checking for an "=" in the cell text.

The value of a spreadsheet cell may depend on another cell or range of cells. Therefore, when output cells are selected, either by a user or automatically by the system 1 (e.g., as a result of a macro), it is desirable to ensure that all relevant, linked cells are also updated on the client receiving the output cells. The system 1 is therefore preferably enabled to include the selected output cells and any precedent cells that may affect the value of the output cells.

Subscribers may subscribe to parts of a spreadsheet-based service, since the system 1 can obtain the desired outputs and can also ensure that the relevant values relied upon to generate the desired outputs are also updated.

Workbook outputs can be generated using the messaging aspects of the system 1. The contents of a message can be scanned for the pertinent data and the detected data from the message can be inserted into the appropriate cells of a spreadsheet workbook. Workbook outputs can also be generated using a spreadsheet reporting component that receives datasets extracted from the message delivered data. Messages for generating outputs, as a minimum, preferably contain the source of the data and the desired display format.

One suitable message format is as follows:

Param[0] - Service type

Param[1] -

Each Param in the primary paramlist can contain another paramlist. For Excel™ services the following is a possible format:

OutParam[0]—Descriptor Type (e.g. Excel named range, cell range etc.)
OutParam[1]—Data Type (e.g. Data value, process descriptor etc.)
OutParam[2]—Delivery format (e.g. Excel workbook, CD 10 report, Instant message)
OutParam[3]—Workbook name
OutParam[4]—Sheet name
OutParam[5]—Descriptor (e.g."$A$1:$B$3")
OutParam[6]—Data A more efficient formatting scheme is shown in FIG. 12 when there is more than one dataset to transmit. In column A (805) a single item is shown, which may be an element in another paramlist. In column B (810) there is shown a two-element paramlist. The first item is the workbook name and the second item is a container for a next-level paramlist. In column C (820) the paramlist contains an item for each workbook in the service. In the example shown, there are three worksheets included in the service. Thus, there are three items in the paramlist 820. In the column 830, each item in the worksheet paramlist contains a two-item paramlist for each of the three worksheets of the service. Param[0] holds the worksheet name, while param[1] acts as a container for the next-level paramlist. In column E (840) it can be seen that the next-level paramlist has three items for each worksheet in the service. Each item is itself another paramlist. The first list specifies the type of information (e.g., a cell, a range, a chart, etc.) The second item holds a description of the item (e.g., a range description). The third item contains the data contents for the item for worksheet [0]. Columns G and H hold the type, description and data fro the second and third worksheets, respectively.

The spreadsheet workbook itself will preferably contain the information concerning the spreadsheet processing, etc. Therefore, there is no need to transport this information if the output is a viewed in the spreadsheet application. There are two viewing options wherein the information about the process should be transported. One is when the system 1 service viewer is used, and the other is when the Instant Messaging is used. Therefore, a format that is sufficiently general to handle both situations (i.e. with and without process information) is preferred.

The system 1 preferably includes a service viewer that can be used to generate reports for viewing service outputs. Therefore, data generated in a spreadsheet service and transported as a dataset to a CD 10 can be viewed using the system's (optional) report generator.

The system 1 preferably includes a spreadsheet viewer distinct from any external spreadsheet application. This enables viewing sections of a larger spreadsheet workbook service incorporating numerous workbooks.

An Instant Messaging (IM) window preferably displays the process details, as opposed to the information about the workbook, etc. that is not relevant. The process information becomes the user name. For example, "Machine 23: Line 1" is a typical identifier. A process-descriptor output is defined and, therefore, upon receiving a new message the system 1 searches the paramlist for outputs of this type and concatenates them to form the process identifier.

Spreadsheet-based services can also incorporate data obtained from a database query. Therefore, functionality is provided to make a call to a database service from within a macro script for carrying out database queries. For example, a CallDatabaseService object, implemented as a COM server and available to Excel's VBA macro language, can be employed to invoke database queries.

Examples of spreadsheet-based services include, but are not limited to, the following:
(i) A Retrieve and Report Service.
(ii) A Repeatability and Reproducibility Service.
(iii) A Spreadsheet-based File Service. When a new file is created or an existing file is updated, then either the file itself or the data alone is acted on. If the new file is a spreadsheet file then the data can be read from the spreadsheet file and converted to an AstaParamList. In this way the new data can be appended to an existing file. If the new file is in a format other than a spreadsheet, then the file can be converted to a spreadsheet file or to paramlists on the CD 10 where the file is created, and then sent to subscribers. The files and messages carry a flag indicating the content type, e.g. data only, spreadsheet file, etc.
(iv) Spreadsheet Data Feed Service. This is not a spreadsheet service per se but is instead a built-in service of the system 1 for providing data feeds to a spreadsheet. The implementation is essentially the same as for the data transport part of a standard spreadsheet service. CDs 10 may subscribe to data feed services, but they can also be sent a data feed without explicitly subscribing. This non-subscribed mode can be used, for example, to send data to the distributed optimizers as described in the next item. Each data feed message contains information describing the source of the data, its destination on the receiving CD 10 (e.g., workbook name, worksheet name, cell ranges, etc) and the data itself The destinations described in the preceding example are specific to be spreadsheet-based services, but in general a data feed destination may be specified as, for example, a text file.
(v) Distributed Optimization. A number of distributed optimizer services can be provided for optimizing a service while distributing the load as discussed earlier. As related to spreadsheet-based optimizers, the subscriber is responsible for specifying the start values for the optimization. Therefore, in spreadsheet-based services the trigger event comes from the subscriber. As implemented, this is a trigger range, i.e. a range of cells that the system servers monitor for changes. The subscriber CD 10 sends the start values to the spreadsheet publisher by acting as a data feed for the spreadsheet service. That is, the subscriber feeds the trigger range data to the spreadsheet publisher. The system 1 includes an event scheduler that may be used to schedule optimizations, preferably when many CDs 10 are not in use.
(vi) The methodology architecture applied to the spreadsheet-based solver optimizer can also be applied to a "What-If" analysis on a spreadsheet.
(vii) Distributed Optimal Design Generation. In a Design of Experiments, DOE, there is a design type referred to as an Optimal Design. This type of design is created to be as small as possible while losing as little information as possible, as measured against some optimality criterion. The generation of optimal designs can often involve searches through millions of possible configurations before the best design is settled upon. The system 1 provides a means of distributing the optimal design searches over a plurality of CDs 10. This feature is not necessarily limited to a spreadsheet service.

An example of a service applicable in a manufacturing environment includes a grid of numbers displaying the current capabilities for a range of processes. A Capability object can be provided by the system 1 having characteristics similar to a numeric label and thus can be embedded into an Excel™ spreadsheet. The Capability object has the following properties that can be modified using a simple properties dialog. The properties include capability type (Cp, Cpk, Pp, etc.), datasource, specification limits, and thresholds (e.g., cell turns red if Cpk<1). A Capability object can be implemented as a formula in a spreadsheet cell.

A user can embed an array of these Capability objects into a spreadsheet to create a dynamic custom report that updates continuously as new data is delivered, and that is also immediately broadcast to other subscribers. The exemplary Capability object can also be attached to a spreadsheet to provide alarm events, change worksheet headings, etc. Accordingly, it is seen that spreadsheet macros can be used to provide a wide variety of functions that can be implemented on a distributed basis throughout the system 1.

Spreadsheet macros can be attached to servers in the system 1 to provide spreadsheet-based services. During the attachment phase the publisher CD 10 checks the list of registered services it maintains against the currently open spreadsheet workbooks. If a workbook is open and the necessary macro(s) exist to provide the registered service, then the service is enabled in the list.

Distribution of client applets and custom clients not intended for global distribution may also be accomplished by the system 1. It may be the case that the system software is not updated, but a specialized software component such as a Java Applet, Active X client, or thin client is loaded onto one or more CDs 10 requiring the new software to, for example, participate in a particular service. In this situation, the publisher CD 10 providing the particular service is preferably used to distribute the requisite software component(s) to the service subscribers when they subscribe and/or request service. This alleviates the need to make unnecessary software updates.

An optional method for the creation of services incorporates the use the journal recording method., which records low-level operating system calls invoked during the use of a software application, and which may be used to automate applications that are not COM-compliant. An example of an existing program which performs journal recording is the Borland Delphi™ component "Journal Hook". A feature of the services creation aspect of the system 1 is to allow users to automate complex sequences of procedures they currently perform manually to effectuate, for example, data analysis, product tracking, status checking operations, and other data management services.

A user can perform the following steps to create a service. In a first step, the service is named from within the system interface. The journal recorder is then turned ON. All subsequent keyboard and mouse strokes are recorded and added sequentially to a list of executable steps. The display of the recorded steps may include cues to identify the nature of the step. For example, a mouse click may be shown as a "click" icon suggesting a mouse click. The steps can include any operation which can be input from the CD 10, based on the software installed thereon or available via such external platforms as application servers and/or web servers. Exemplary steps include, (1) run a previously created spreadsheet macro, (2) log into a computer system, (3) run a database query, (4) open a web browser to a particular web page, (5) launch an ActiveX control, (6) launch a statistical control program, and (7) copy text from a file into a spreadsheet worksheet.

Once all of the necessary steps have been performed, the journal recorder is turned OFF and the list of instructions is saved. The saved list of steps may then be retrieved for executing the recorded sequence to produce the desired service.

A trigger event may be optionally added. The system 1 provides a means for the service creator to define an event that will be used by the service to execute the script (and Output Descriptor event). Preferably, the service creator selects this instruction from a list of Trigger Types. The service creator may be prompted to provide certain additional information. For example, Trigger Types may include a scheduled occurrence or a database message. The message can be sent by either a messaging database program, or by the middle tier aspect of the system 1 whose functionality includes detecting a change in at least one database field, and providing a signal in the event of such a change.

An output descriptor describes the format of the service provided for the service subscribers. The output may be a simple application file; part of a file; a status indicator based on an output; a text message based on an output, for example, specifying that a service has run and a result is available (e.g., a test quality failed, and the results are summarized in an available file). In some cases the service may create output files such as MS-Excel workbooks that contain many separate items that may themselves be specified as service outputs alone. On specifying such a file, the service creator is preferably presented with a list of objects such as tables, worksheets, charts, message boxes, etc. from which outputs may be selected.

As an example, the service creator is prompted to provide input for the following fields: a Client (Subscriber) Request is a request from a subscriber to execute the service once; Other Service is a termination flag that is sent out by another service and is used to trigger the new service (to specify which service is to provide the trigger, the creator is provided with a list of available services); and File Change Event, i.e., the file, or several files (e.g., which can be accessed on local or mapped storage) in which a change will trigger the service to run once.

Once the steps for carrying out the service have been recorded using the journal, certain other aspects of the service may be specified. A termination descriptor is a description of the event (if any) which will stop the service. By default, the service creator stops the service by selecting the "terminate" option from a context sensitive window in the Available Services List. The system 1 presents the creator with a list of alternatives, such as "terminate after N repeats", or "terminate if idle for more than N days". The newly specified service is then registered with the system 1, as described previously.

The access rights for the service are then described. The creator is prompted to specify either a list of user names authorized to use the service, to keep the service private, or to make it available to all CDs 10 on the network for subscription.

Scripts created in this manner are preferably editable and debuggable like any other program, and the services so created have the capability to run on the system 1.

These teachings have been described in the context of presently preferred embodiments thereof However, it should be appreciated that these teachings should not be construed to be limited to only these presently preferred embodiments. For example, other types of operating systems besides Windows™ and Unix™ may be employed, as can other types of middleware software systems besides Asta™, and other types of spreadsheet programs besides Excel™. Further, in some circumstances a wireless connected device 10 may function as a publisher of a service, and reports may be provided to a wireless connected device 10 using any suitable technique, including email or instant messaging, as well as Short Message Service (SMS) and Unstructured Data Service (UDS) techniques, depending on the capabilities of the wireless device and the network operator through which the wireless device is reached.

These teachings are furthermore not to be construed to be limited in any way to only the exemplary applications thereof described above, such as data warehousing and project management applications, as those skilled in the art may readily derive other applications for these teachings when guided by the foregoing description.

For example, and as was discussed above, it should be appreciated that an element of these teachings provides the capability to perform a remote query to a database that the querying CD 10 may not have access rights to. In this case the publisher CD 10, who is assumed to have access rights to the database, makes the query on behalf of the subscriber CD 10, and may be considered as a proxy for the subscriber CD 10. Also in this case the registration process for the subscriber CD 10 may involve gaining at least temporary database access rights for the user of the subscriber CD 10, and the publisher CD 10 may then locally administer the access to the database in response to receiving queries from the subscriber CDs 10. Passwords and other security features may be employed as desired to prevent unauthorized users from gaining access to the database.

It should further be appreciated that at least some subscriptions may require that some type of accounting be performed for recording a subscriber CD's use of a particular published service. For example, the accounting may be based on a flat fee amount and/or on a per usage amount, or on any suitable criterion, such as per packet, per query, etc. It is also within the scope of these teachings for the accounting to encompass some type of barter procedure for subscriptions to services between those CDs 10 that function both as subscribers and as publishers. The details of the accounting may be implemented at the time a CD 10 registers for a subscription to a particular service, and can entail providing an account number, such as inter-organization account number, and other suitable information.

As such, it should be apparent that various variations and modifications may be made to these teachings, and that such variations and modifications will still fall within the scope and ambit of these teachings.

What is claimed is:

1. A data processing system that comprises a network comprised of a set of connected devices, individual ones of said connected devices of said set of connected devices comprising a data processor that executes a program for connecting to and disconnecting from said network and for maintaining a first list descriptive of other connected devices and a second list descriptive of at least some user-defined services published by individual ones of publisher connected devices that are members of a first sub-set of the connected devices, individual ones of said publisher connected devices maintaining a third list descriptive of an individual one or individual ones of registered service subscriber connected devices that are members of a second sub-set of connected devices, said publisher connected devices providing a service output to registered service subscriber connected devices upon an occurrence of at least one predetermined triggering event, wherein a given one of said connected devices is one of a member of only said first sub-set of connected devices, a member of only said second sub-set of connected devices, or a member of both said first sub-set of connected devices and said second sub-set of connected devices, wherein individual ones of said publisher connected devices of said first sub-set of connected devices have at least one back-up connected device to publish the service upon the unavailability of said publisher connected device, said at least one back-up connected device storing data and procedures required to publish the service should the publisher connected device become unavailable.

2. A data processing system as in claim 1, wherein said triggering event is comprised of an occurrence of a push trigger defined by said publisher connected device.

3. A data processing system as in claim 1, wherein said triggering event is comprised of an occurrence of a pull trigger defined by said subscriber connected device.

4. A data processing system as in claim 1, wherein said triggering event is comprised of an occurrence of a push trigger defined by said publisher connected device and by an occurrence of a pull trigger defined by said subscriber connected device.

5. A data processing system as in claim 1, wherein a content of said first list is changed automatically as connected devices connect to and disconnect from said network.

6. A data processing system as in claim 1, wherein at least one of said published services is based on the operation of a spreadsheet engine operated by one of said publisher connected devices.

7. A data processing system as in claim 1, wherein said network is comprised of a Local Area Network (LAN), and wherein said connected devices self-register on the LAN when connecting to the LAN using Mailslots.

8. A data processing system as in claim 1, wherein said network is comprised of a Wide Area Network (WAN), and wherein said connected devices self-register on the WAN when connecting to the WAN using Named Pipes.

9. A data processing system as in claim 1, wherein at least one of said published services retrieves data in response to a database query originated by a subscriber connected device, wherein the data is retrieved from a database where the publisher connected device has access rights.

10. A data processing system as in claim 1, wherein at least one of said published services is offered by a first publisher connected device that subscribes to at least one second publisher connected device, wherein a report generated by said first publisher connected device comprises a portion of a report received from the second publisher connected device.

11. A data processing system as in claim 1, wherein at least one of said published services is offered by a first publisher connected device that subscribes to at least one second publisher connected device, wherein a report generated by said first publisher connected device comprises a processed portion of a report received from the second publisher connected device.

12. A data processing system as in claim 1, wherein at least, some of the set of connected devices communicate over said network using TCP/IP.

13. A data processing system as in claim 1, wherein at one of said set of connected devices is coupled to said network through a wireless link.

14. A data processing system as in claim 1, wherein at least one of said connected devices comprises a measuring machine that generates data and publishes the data in a report service to which at least one publisher connected device subscribes, said subscribing publisher connected device offering a service that reports all or a portion of the data generated by said measuring machine.

15. A data processing system that comprises a network comprised of a set of connected devices, individual ones of said connected devices of said set of connected devices comprising a data processor that executes a program for connecting to and disconnecting from said network and for maintaining a first list descriptive of other connected devices and a second list descriptive of at least some user-defined services published by individual ones of publisher connected devices that are members of a first sub-set of the connected devices, individual ones of said publisher connected devices maintaining a third list descriptive of an individual one or individual ones of registered service subscriber connected devices that are members of a second sub-set of connected devices, said publisher connected devices providing a service output to registered service subscriber connected devices upon an occurrence of at least one predetermined triggering event, wherein a given one of said connected devices is one of a member of only said first sub-set of connected devices, a member of only said second sub-set of connected devices, or a member of both said first sub-set of connected devices and said second sub-set of connected devices, wherein at least one of said connected devices comprises a measuring machine that generates data and publishes the data in a report service comprising a spreadsheet to which at least one publisher connected device subscribes, said subscribing publisher connected device executing a spreadsheet engine that treats at leas some of said data as spreadsheet variables and offers a service that reports a result of a processing of said spreadsheet variables by said spreadsheet engine.

16. A data processing system as in claim 15, wherein a triggering event comprises a change in state in at least one of said spreadsheet variables.

17. A data processing system as in claim 1, wherein a database is stored in a distributed manner by a plurality of said connected devices, and wherein subscribers to said database issue queries that are responded to in a distributed manner by said plurality of connected devices.

18. A data processing system as in claim 1, wherein a publisher connected device maintains a data warehouse by subscribing to at least one publisher connected device that is coupled to a database, and responds to a query from a connected device for data stored in said data warehouse.

19. A data processing system as in claim 1, wherein at least one database is accessible to a publisher connected device to which a subscriber connected device issues queries, said publisher connected device issuing a database query on behalf of the subscriber connected device and returns a result of the query to the subscriber connected device.

20. A data processing system as in claim 1, wherein a database is maintained by at least one publisher connected device, said database storing data related to a project, and wherein a subscriber connected device has access to at least a portion of said project-related data regardless of its storage location, so long as said publisher connected device has access to the project-related data.

21. A data processing system that comprises a network comprised of a set of connected devices, individual ones of said connected devices of said set of connected devices comprising a data processor that executes a program for connecting to and disconnecting from said network and for maintaining a first list descriptive of other connected devices and a second list descriptive of at least some user-defined services published by individual ones of publisher connected devices that are members of a first sub-set of the connected devices, individual ones of said publisher connected devices maintaining a third list descriptive of an individual one or individual ones of registered service subscriber connected devices that are members of a second sub-set of connected devices, said publisher connected devices providing a service output to registered service subscriber connected devices upon an occurrence of at least one predetermined triggering event, wherein a given one of said connected devices is one of a member of only said first sub-set of connected devices, a member of only said second sub-set of connected devices, or a member of both said first sub-set of connected devices and said second sub-set of connected devices, wherein a service offered by a publisher connected device migrates to at least one backup connected device that forms a part of a hierarchy of backup connected devices.

22. A data processing system as in claim 21, wherein one of said connected devices of said hierarchy of backup connected devices is designated as a persistent backup connected device.

23. A data processing system as in claim 21, wherein a connected device's location within the hierarchy of backup connected devices is determined based on a plurality of criteria, including the availability and available processing power of each connected device being considered for placement into the hierarchy of backup connected devices.

24. A data processing system as in claim 23, wherein both long term and short term scores are derived using said criteria.

25. A data processing system as in claim 22, wherein said persistent backup connected device is comprised of a mainframe computer.

26. A data processing system as in claim 1, wherein a database is maintained by at least one publisher connected device, said database storing data related to a project, and wherein a subscriber connected device has access to at least a portion of said project-related data, including project-related data stored in private folders, so long as said publisher connected device has access to the project-related data.

27. A data processing system as in claim 1, wherein a publisher defines a service through the use of a scripting engine.

28. A data processing system as in claim 1, wherein a reporting of services to subscriber connected devices is conducted through a user interface that comprises a browser in the subscriber connected device that views web pages provided by a server of the publisher connected device.

29. A data processing system as in claim 1, wherein said system is COM-compliant.

30. A data processing system as in claim 1, wherein at least one service is provisioned, at least in part, by interoperability with a COM-compliant application program.

31. A data processing system as in claim 1, wherein individual ones of said connected devices comprise middleware software and function as middleware servers.

32. A data processing system as in claim 1, wherein said set of connected devices are logically organized into a plurality of clusters each having a top level connected device (TLCD), and wherein TLCDs are coupled together in a ring for propagating system administration information between said plurality of clusters.

33. A data processing system as in claim 32, wherein said system administration information is used at least in part for changing a content of said first list as connected devices connect to and disconnect from said network.

34. A data processing system as in claim 1, wherein at least one of said published services is a data retrieval service wherein a connected device having privileges to access a database employs a query tool to compose a query, wherein and said query is placed at the disposal of a subscriber connected device who does not have privileges to access the database.

35. A data processing system as in claim 1, wherein at least one of said published services is a data retrieval service wherein a connected device having privileges to access a database is responsive to a query composed by a subscriber connected device, who does not have privileges to access the database, to access the database using the query and to return the results of the query to the subscriber connected device.

36. A data processing system that comprises a network comprised of a set of connected devices, individual ones of said connected devices of said set of connected devices comprising a data processor that executes a program for connecting to and disconnecting from said network and for maintaining a first list descriptive of other connected devices and a second list descriptive of at least some user-defined services published by individual ones of publisher connected devices that are members of a first sub-set of the connected devices, individual ones of said publisher connected devices maintaining a third list descriptive of an individual one or individual ones of registered service subscriber connected devices that are members of a second sub-set of connected devices, said publisher connected devices providing a service output to registered service subscriber connected devices upon an occurrence of at least one predetermined triggering event, wherein a given one of said connected devices is one of a member of only said first sub-set of connected devices, a member of only said second sub-set of connected devices, or a member of both said first sub-set of connected devices and said second sub-set of connected devices, wherein a service offered by a publisher connected device migrates to at least one backup connected device that forms a part of a hierarchy of backup connected devices, wherein a determination of the hierarchy of appropriate backup connected devices is based at least in part on a score derived from long term loads, and wherein balancing of the load on backup connected devices is accomplished at least in part by limiting the number of services that may become active based on a score derived from short term loads.

37. A data processing system that comprises a network comprised of a set of connected devices, individual ones of said connected devices of said set of connected devices comprising a data processor that executes a program for connecting to and disconnecting from said network and for maintaining a first list descriptive of other connected devices and a second list descriptive of at least some user-defined services published by individual ones of publisher connected devices that are members of a first sub-set of the connected devices, individual ones of said publisher connected devices maintaining a third list descriptive of an individual one or individual ones of registered service subscriber connected devices that are members of a second sub-set of connected devices, said publisher connected devices providing a service output to registered service subscriber connected devices upon an occurrence of at least one predetermined triggering event, wherein a given one of said connected devices is one of a member of only said first sub-set of connected devices, a member of only said second sub-set of connected devices, or a member of both said first sub-set of connected devices and said second sub-set of connected devices, wherein said set of connected devices are logically organized into a plurality of clusters each having a to level connected device (TLCD), and wherein TLCDs are coupled together in a ring for propagating system administration information between said plurality of clusters, wherein a service offered by a publisher connected device migrates to at least one backup connected device, wherein the backup connected device is constrained to reside within the cluster of the publisher connected device.

38. A data processing system as in claim 1, wherein a reporting service is implemented by a fanout mechanism so as to reduce the load on a publisher connected device.

39. A data processing system as in claim 1, wherein said set of connected devices are logically organized into a plurality of clusters each having a top level connected device (TLCD), and wherein a connected device is enabled to locate a service with certain attributes by a drill down procedure through information about a service provided by a publisher connected device.

40. A data processing system as in claim 1, wherein said set of connected devices are logically organized into a plurality of clusters each having a top level connected device (TLCD), and wherein a connected device is enabled to locate a service with certain attributes by issuing a query that is passed all TLCDs, and TLCDs pass the query to all cluster member connected devices, and those cluster member connected devices that return an output do so to the connected device that issues the query in a manner that is unmediated by said TLCDs.

41. A data processing system as in claim 1, wherein in response to a connected device applying to a publisher connected device for a subscription, said publisher connected device one of selectively grants the subscription or grants the subscription automatically.

42. A data processing system as in claim 1, wherein at least one publisher connected device provides a service that is responsive to commands native to at least one of an Enterprise Resource Planning (ERP) system, a Material Requirements Planning (MRP) system, or a Manufacturing Execution System (MES).

43. A data processing system as in claim 32, wherein said clusters are constructed in parallel as connected devices request connection to the system so as to add connected devices in turn to individual ones of N clusters.

44. A data processing system that comprises a network comprised of a set of connected devices, individual ones of said connected devices of said set of connected device comprising a data processor that executes a program for connecting to and disconnecting from said network and for maintaining a first list descriptive of other connected devices and a second list descriptive of at least some user-defined services published by individual ones of publisher connected devices that are members of a first sub-set of th connected devices, individual ones of said publisher connected devices maintaining a third list descriptive of an individual one or individual ones of registered service subscriber connected devices that are members of a second sub-set of connected devices, said publisher connected devices providing a service output to registered service subscriber connected devices upon an occurrence of at least one predetermined triggering event, wherein a given one of said connected devices is one of a member of only said first sub-set of connected devices, a member of only said second sub-set of connected devices, or a member of both said first sub-set of connected devices and said second sub-set of connected devices, wherein said set of connected devices are logically organized into a plurality of clusters each having a top level connected device (TLCD), and wherein TLCDs are coupled together in a ring for propagating system administration information between said plurality of clusters, wherein said clusters are constructed sequentially so as to add connected devices to one cluster until the cluster reaches a predetermined size, and to then add the next connected device to a next cluster.

45. A data processing system as in claim 22, wherein said persistent backup connected device is comprised of a central server.

46. A data processing system as in claim 1, wherein a reporting of services to subscriber connected devices is conducted by a web server of the publisher connected device that hosts a report in the form of a web page.

47. A data processing system that includes a network comprised of a set of connected devices, individual ones of said connected devices of said set of connected devices comprising a data processor that executes a program for connecting to and disconnecting from said network and for maintaining a first list descriptive of other connected devices and a second list descriptive of at least some user-defined services published by individual ones of publisher connected devices that are members of a first sub-set of the connected devices, individual ones of said publisher connected devices maintaining a third list descriptive of an individual one or individual ones of registered service subscriber connected devices that are members of a second sub-set of connected devices, wherein at least one publisher connected device offers a data retrieval service from at least one database, and wherein at least one service subscriber connected device is registered to receive said data retrieval service, wherein said data retrieval service automatically moves to at least one backup connected device at least upon an occurrence of the publisher connected device becoming unable to provide the data retrieval service.

48. A data processing system as in claim 47, wherein said at least one publisher connected device provides retrieved data to a registered service subscriber connected device upon an occurrence of at least one predetermined triggering event.

49. A data processing system as in claim 47, said at least one backup connected device is one of a hierarchy of backup connected devices, one of which is designated as a persistent backup connected device.

50. A data processing system as in claim 47, wherein said publisher connected device makes a database query on behalf of the subscriber connected device who does not have privileges to access the database.

51. A data processing system as in claim 47, wherein said set of connected devices are logically organized into a plurality of clusters each having a top level connected device (TLCD), and wherein said plurality of TLCDs are coupled together in a ring for propagating system administration information between said plurality of clusters.

52. A data processing system as in claim 47, wherein said publisher connected device makes a database query on behalf of the subscriber connected device, where the subscriber connected device is coupled to said network through a wireless link.

53. A data processing system as in claim 47, wherein said database stores data related to a project, and wherein said subscriber connected device has access to at least a portion of said project-related data regardless of its storage location, so long as said publisher connected device has access to the project-related data.

54. A data processing system that includes a network comprised of a set of connected devices, individual ones of said connected devices of said set of connected devices comprising a data processor that executes a program for connecting to and disconnecting from said network and for maintaining a first list descriptive of other connected devices and a second list descriptive of at least some user-defined services published by individual ones of publisher connected devices that are members of a first sub-set of the connected devices, individual ones of said publisher connected devices maintaining a third list descriptive of an individual one or individual ones of registered service subscriber connected devices that are members of a second sub-set of connected devices, wherein at least one publisher connected device offers a project data management retrieval service providing access to project management data that comprises project-related files and communications, and wherein at least one service subscriber connected device is registered to use said project management data retrieval service and to have access to at least a portion of said project management data regardless of its storage location, so long as said at least one publisher connected device has access to the project-related data, wherein said project data management retrieval service automatically moves to at least one backup connected device at least upon an occurrence of the publisher connected device becoming unable to provide the project data management retrieval service.

55. A data processing system as in claim 54, wherein said at least one publisher connected device provides the project management data to a registered service subscriber connected device upon an occurrence of at least one predetermined triggering event.

56. A data processing system as in claim 54, wherein said at least one backup connected device is one of a hierarchy of backup connected devices, one of which is designated as a persistent backup connected device.

57. A data processing system as in claim 54, wherein said set of connected devices are logically organized into a plurality of clusters each having a top level connected device (TLCD), and wherein said plurality of TLCDs are coupled together in a ring for propagating system administration information between said plurality of clusters.

58. A data processing system as in claim 54, wherein said publisher connected device retrieves project management data for the subscriber connected device, and sends the retrieved project management data to the subscriber connected device through a wireless link.

59. A method for operating a network comprised of a plurality of connected devices, comprising:
    in each connected device, maintaining a first list descriptive of other connected devices and a second list descriptive of at least some user-defined services published by individual ones of publisher connected devices;
    in each publisher connected device, maintaining a third list descriptive of an individual one or individual ones of service subscriber connected devices that are registered to receive the service published by said publisher connected device upon an occurrence of at least one predetermined triggering event;
    logically organizing the plurality of connected devices into a plurality of clusters each having a top level connected device, wherein said plurality of top level connected devices are coupled together in a ring structure for propagating system administration information between said plurality of clusters; and
    automatically moving the service published by said publisher connected device to at least one backup connected device at least upon an occurrence of the publisher connected device becoming unable to provide the service.

60. A method as in claim 59, wherein said at least one backup connected device is one of a hierarchy of backup connected devices, and further comprising designating one of said hierarchy of backup connected devices to be a persistent backup connected device.

61. A method as in claim 59, wherein said publisher connected device offers a project data management retrieval service providing access to project management data that comprises project-related files and communications, and wherein at least one service subscriber connected device is registered to use said project management data retrieval service and to have access to at least a portion of said project management data regardless of its storage location, so long as said at least one publisher connected device has access to the project-related data.

62. A method as in claim 61, wherein said publisher connected device retrieves project management data for the subscriber connected device, and further comprising sending the retrieved project management data to the subscriber connected device through a wireless link.

63. A method as in claim 59, wherein said publisher connected device offers a data retrieval service from at least one database, and wherein at least one service subscriber connected device is registered to receive said data retrieval service.

64. A method as in claim 63, wherein said publisher connected device makes a database query on behalf of the subscriber connected device who does not have privileges to access the database.

65. A method as in claim 63, wherein said publisher connected device makes a database query on behalf of the subscriber connected device, and further comprising sending a result of query to the subscriber connected device through a wireless link.

66. A method as in claim 63, wherein said database stores data related to a project, and wherein said subscriber connected device has access to at least a portion of said project-related data regardless of its storage location, so long as said publisher connected device has access to the project-related data.

67. A method as in claim 59, wherein said publisher connected device offers a data mining service for data stored in at least one database, and wherein at least one service subscriber connected device is registered to use said data mining service.

68. A method as in claim 59, wherein said publisher connected device offers a data warehouse service for data obtained from at least one database, and wherein at least one service subscriber connected device is registered to use said data warehouse service.

69. A method as in claim 59, wherein said publisher connected device offers a service based on a spreadsheet engine, and wherein at least one service subscriber connected device receives a report upon an occurrence of a change of state of at least one spreadsheet variable.

70. A method as in claim 59, wherein said publisher connected device provides a data retrieval service from at least one database, wherein at least one service subscriber connected device is registered for generating queries to said data retrieval service, and wherein said publisher connected device functions as a proxy to make a database query on behalf of the subscriber connected device.

71. A method as in claim 59, and further comprising accounting for use of a service provided by said publisher connected device.

72. A computer program embodied on at least computer-readable medium the execution of which in a network comprised of a plurality of connected devices results in computer-implemented actions comprising:

in each connected device, maintaining a first list descriptive of other connected devices and a second list descriptive of at least some user-defined services published by individual ones of publisher connected devices;

in each publisher connected device, maintaining a third list descriptive of an individual one or individual ones of service subscriber connected devices that are registered to receive the service published by said publisher connected device upon an occurrence of at least one predetermined triggering event; and automatically moving the service published by said publisher connected device to at least one backup connected device at least upon an occurrence of the publisher connected device becoming unable to provide the service.

73. A computer program as in claim 72, where the plurality of connected devices are logically organized into a plurality of clusters each having a top level connected device, wherein said plurality of top level connected devices are coupled together for propagating at least system administration information between said plurality of clusters.

74. A computer program as in claim 72, where said at least one backup connected device is one of a hierarchy of backup connected devices, where at least one member of said hierarchy of backup connected devices is a persistent backup connected device.

75. A computer program as in claim 72, where said publisher connected device offers a project data management retrieval service providing access to project management data that comprises project-related files and communications, and where at least one service subscriber connected device is registered to use said project management data retrieval service and to have access to at least a portion of said project management data regardless of its storage location, so long as said one publisher connected device has access to the project-related data.

76. A device comprising a data processor and an interface for coupling to a network for communication with other devices coupled to the network, comprising:

means for maintaining a first list descriptive of other devices coupled to the network and a second list descriptive of at least some user-defined services published by individual ones of publisher devices;

where as a publisher device said device further comprises means for maintaining a third list descriptive of an individual one or individual ones of service subscriber at are registered to receive the service published by said publisher device upon an occurrence of at least one predetermined triggering event; and means for automatically moving the published service to at least one backup device at least upon an occurrence of becoming unable to provide the service.

77. A device as in claim 76, where the plurality of devices are logically organized into a plurality of clusters each having a top level connected device, wherein top level connected devices are coupled together for propagating at least system administration information between said plurality of clusters.

78. A device as in claim 76, where said at least one backup device is one of a hierarchy of backup devices, where at least one member of said hierarchy of backup devices is a persistent backup device.

79. A device as in claim 76, where said publisher device comprises means to offer a project data management retrieval service to provide access to project management data that comprises project-related files and communications, and where at least one service subscriber device comprises means to register to use said project management data retrieval service and to have access to at least a portion of said project management data regardless of its storage location, so long as said publisher device has access to the project-related data.

* * * * *

UNITED STATES PATENT AND TRADEMARK OFFICE
CERTIFICATE OF CORRECTION

PATENT NO. : 6,944,662 B2
DATED : September 13, 2005
INVENTOR(S) : Devine et al.

It is certified that error appears in the above-identified patent and that said Letters Patent is hereby corrected as shown below:

Column 66,
Line 37, delete "leas" and replace with -- least --.

Column 69,
Line 7, delete "to" and replace with -- top --.
Line 58, delete "th" and replace with -- the --.

Signed and Sealed this

Sixth Day of December, 2005

JON W. DUDAS
*Director of the United States Patent and Trademark Office*